US012571701B2

(12) United States Patent
Zhu et al.

(10) Patent No.: US 12,571,701 B2
(45) Date of Patent: *Mar. 10, 2026

(54) TRACKING CONTINUOUSLY SCANNING LASER DOPPLER VIBROMETER SYSTEMS AND METHODS

(71) Applicant: UNIVERSITY OF MARYLAND, BALTIMORE COUNTY, Baltimore, MD (US)

(72) Inventors: Weidong Zhu, Ellicott City, MD (US); Linfeng Lyu, Halethorpe, MD (US)

(73) Assignee: University of Maryland, Baltimore County, Baltimore, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/437,773

(22) Filed: Feb. 9, 2024

(65) Prior Publication Data

US 2024/0295459 A1      Sep. 5, 2024

Related U.S. Application Data

(63) Continuation of application No. 18/048,567, filed on Oct. 21, 2022, now Pat. No. 11,921,013.

(Continued)

(51) Int. Cl.
*G01M 7/02* (2006.01)
*F03D 17/00* (2016.01)
*G01H 9/00* (2006.01)

(52) U.S. Cl.
CPC .............. *G01M 7/025* (2013.01); *F03D 17/00* (2016.05); *G01H 9/00* (2013.01)

(58) Field of Classification Search
CPC .. G01M 7/025; G01M 5/0016; G01M 5/0091; G01M 5/0066; F03D 17/00;

(Continued)

(56) References Cited

U.S. PATENT DOCUMENTS 6,144,181 A      11/2000 Rehm et al.
7,463,363 B2 *   12/2008 Drake, Jr. .............. G01D 5/266
                                                            356/432

(Continued)

OTHER PUBLICATIONS

Kim et al. ("Image-based Tracking System for Rotating Object Vibration Measurement using Laser Scanning Vibrometer," International Journal of Precision Engineering and Manufacturing vol. 16, No. 8, pp. 1717-1721) (Year: 2015).*

(Continued)

*Primary Examiner* — Suman K Nath
(74) *Attorney, Agent, or Firm* — Casimir Jones, S.C.; Brian F. Bradley; Tristan A. Fuierer

(57) ABSTRACT

A one-dimensional (1D) and two-dimensional (2D) scan scheme for a tracking continuously scanning laser Doppler vibrometer (CSLDV) system to scan the whole surface of a rotating structure excited by a random force. A tracking CSLDV system tracks a rotating structure and sweep its laser spot on its surface. The measured response of the structure using the scan scheme of the tracking CSLDV system is considered as the response of the whole surface of the structure subject to random excitation. The measured response can be processed by operational modal analysis (OMA) methods (e.g., an improved lifting method, an improved demodulation method, an improved 2D demodulation method). Damped natural frequencies of the rotating structure are estimated from the fast Fourier transform of the measured response. Undamped full-field mode shapes are estimated by multiplying the measured response using sinusoids whose frequencies are estimated damped natural frequencies.

21 Claims, 37 Drawing Sheets

Related U.S. Application Data

(60) Provisional application No. 63/270,591, filed on Oct. 22, 2021.

(58) Field of Classification Search
CPC ...... G01H 9/00; G01H 1/003; F05B 2260/83; F05B 2270/334; F05B 2270/804; Y02E 10/72
See application file for complete search history.

(56) References Cited

U.S. PATENT DOCUMENTS

| | | | |
|---|---|---|---|
| 11,411,474 | B1 | 8/2022 | White et al. |
| 11,921,013 | B2 | 3/2024 | Zhu et al. |
| 2013/0061677 | A1* | 3/2013 | Wang ................. G01N 29/2418 73/584 |
| 2015/0300995 | A1 | 10/2015 | Flynn et al. |

OTHER PUBLICATIONS

Acar et al., Bend-bend-twist Vibrations of a Wind Turbine Blade. Wind Energy, 2017, 21(1), 1-14.

Allen et al., A new method for processing impact excited continuous-scan laser Doppler vibrometer measurements. Mechanical Systems and Signal Processing, 2010, 24 (3), 721-735.

Ashley et al., Report from the Bethany Wind Turbine Study Committee Report, 2007. www.townofbethany.com. Retrieved from the internet Aug. 16, 2023. 1-68.

Bell et al., Laser Vibrometers and Contacting Transducers, Target Rotation and Six Degree-of-freedom Vibration: What Do We Really Measure? Journal of Sound Vibration, 2000, 237 (2), 245-261.

Bucher et al., Laser-based Measurement System for Measuring the Vibration on Rotating Discs, in First International Conference on Vibration Measurements by Laser Techniques: Advances and Applications, 1994, 2358, 398-408.

Castellini et al., Image-based tracking laser Doppler vibrometer. Review of Scientific Instruments, 2004, 75(1), 222-232.

Castellini et al., Vibration Analysis of Tyre Treads: a In-plane Laser Vibrometry Approach. The International Society for Optical Engineering. 1998, 1732-1738.

Chen et al., Experimental and numerical study of high-order complex curvature mode shape and mode coupling on a three-bladed wind turbine assembly. Mechanical Systems and Signal Processing, 2021, 160(3) 107873. 34 pages.

Chen et al., Underwater Dynamic Response at Limited Points Expanded to Full-Field Strain Response. J. Vib. Acoust. 2018, 140(5): 051016, 9 pages.

Chen et al., Damage Identification of Beams Using a Continuously Scanning laser Doppler Vibrometer System. J. Vib. Acoust. 2016, 138(5): 051011. 16 pages.

Chen et al., Experimental Investigation of Notch-type Damage Identification with a Curvature-based Method by Using a Continuously Scanning Laser Doppler Vibrometer System. J Nondestruct Eval, 2017, 36(2), 38. 1-17.

Chen et al., Identification of Damage in Plates Using Full-field Measurement with a Continuously Scanning Laser Doppler Vibrometer System. Journal of Sound and Vibration, 2018, 422, 542-567.

Chen et al., Non-Model-Based Identification of Delamination in Laminated Composite Plates Using a Continuously Scanning Laser Doppler Vibrometer System. J. Vib. Acoust., 2018, 140(4), 041001. 1-11.

Chen et al., A Comprehensive Study on Detection of Hidden Delamination Damage in a Composite Plate Using Curvatures of Operating Deflection Shapes. Journal of Nondestructive Evaluation, 2019, 38(2), 1-18.

Chen et al., Damage identification of beams using a continuously scanning laser Doppler vibrometer system. Journal of Vibration and Acoustics, 2016, 138 (5), 05011. 44 pages.

Ciang et al., Structural Health Monitoring for a Wind Turbine System: A Review of Damage Detection Methods. Measurement Science and Technology, 2008, 19(12), 122001. 1-21.

Di Maio et al., Continuous Scan, a Method for Performing Modal Testing Using Meaningful Measurement Parameters; Part I. Mechanical Systems and Signal Processing, 2011, 25(8), 3027-3042.

Di Maio et al., Applications of Continuous Tracking SLDV Measurement Methods to Axially Symmetric Rotating Structures Using Different Excitation Methods. Mechanical Systems and Signal Processing, 2010, 24(8), 3013-3036.

Ewins. Modal Testing: Theory, Practice and Application, 2nd edition, Research Studies Press, Hertfordshire, UK, 2000. TOC only. 6 pages.

Fioretti et al., Deflection Shape Reconstructions of a Rotating Five-blade Helicopter Rotor from TLDV Measurements. AIP Conference Proceedings, 2010, 1253(1), 17-28.

Flemming Moeller Larsen et al., New Lightning Qualification Test Procedure for Large Wind Turbine Blades. International Conference on Lightning and Static Electricity (Blackpool, UK), 2003, 36, 1-10.

Gasparoni et al., Experimental Modal Analysis on a Rotating Fan Using Tracking-CSLDV. AIP Conference Proceedings, 2010, 60. 3-16.

Halkon et al., Vibration Measurements Using Continuous Scanning Laser Doppler Vibrometry: Theoretical Velocity Sensitivity Analysis with Applications. Measurement Science and Technology, 2003, 14(3), 382. 51 pages.

Halkon et al., Vibration Measurements Using Continuous Scanning Laser Vibrometry: Advanced Aspects in Rotor Applications. Mechanical Systems and Signal Processing, 2006, 20(6), 1286-1299.

Halkon et al., Vibration Measurements Using Continuous Scanning Laser Vibrometry: Velocity Sensitivity Model Experimental Validation. Measurement Science and Technology, 2003, 14(6), 773-783.

James et al., The Natural Excitation Technique (NExT) for Modal Parameter Extraction from Operating Structures. Modal Analysis: The International Journal of Analytical and Experimental Modal Analysis, 1995, 10(4), pp. 260-277.

Jamieson et al., Innovation in Wind Turbine Design, Chichester: Wiley, (2018) 7-13.

Jonkman et al., Definition of a 5-MW Reference Wind Turbine for Offshore System Development, (No. NREL/TP-500-38060), National Renewable Energy Lab. (NREL), Golden, CO, 2009. 75 pages.

Khalil et al., Operational deflection shape of rotating object using tracking laser Doppler vibrometer, 2015 IEEE International Conference on Electronics, Circuits, and Systems (ICECS), Cairo, (2015) 693-696.

Lyu et al., Full-field mode shape estimation of a rotating structure subject to random excitation using a tracking continuously scanning laser Doppler vibrometer via a two-dimensional scan scheme. Mechanical Systems and Signal Processing. 2022, 169, 108532. 15 pages.

Lyu et al., Operational modal analysis of a rotating structure subject to random excitation using a tracking continuously scanning laser doppler vibrometer via an improved demodulaiton method. Journal of Vibration and Acoustics. 2022, vol. 144, 1-12.

Lyu et al., Operational modal analysis of a rotating structure under ambient excitation using a tracking continuously scanning laser Doppler vibrometer system. Mechanical Systems and Signal Processing. 2021, 152, 16 pages.

Martarelli et al., Laser Doppler Vibrometry on Rotating Structures in Coast-down: Resonance Frequencies and Operational Deflection Shape Characterization. Measurement Science and Technology, 2011, 22(11), 115106. 17 pages.

Meirovitch, Analytical Methods in Vibrations, Macmillan Co, 1967. TOC only. 12 pages.

Meirovitch, Principles and techniques of vibrations. vol. 1. Upper Saddle River, NJ: Prentice Hall, 1997. TOC only. 6 pages.

Papoulis et al., Probability, random variables, and stochastic processes, Tata McGraw-Hill Education, 2002. TOC only. 5 pages.

Peeters et al., The PolyMAX frequency-domainmethod: a new standard for modal parameter estimationlaser, Shock and Vibration, 2004,11 (3-4), 395-409.

Rosenbloom, A Problem with Wind Power, (2006) www.aweo.org. Retrieved from the internet Aug. 16, 2023. 8 pages.

(56)     References Cited

OTHER PUBLICATIONS

Rostami et al., Vibration characteristics of rotating orthotropic cantilever plates using analytical approaches: a comprehensive parametric study, Archive of Applied Mechanics, 2018, 88(4), 481-502.

Rothberg et al., An international review of laser Doppler vibrometry: Making light work of vibration measurement. Optics and Lasers in Engineering, 2017, 99 (1), 11-22.

Siringoringo et al., Noncontact operational modal analysis of structural members by laser Doppler vibrometer. Computer-Aided Civil and Infrastructure Engineering, 2009,24 (4), 249-265.

Sriram et al., Mode Shape Measurement Using a Scanning Laser Doppler Vibrometer. The International Journal of Analytical and Experimental Modal Analysis, 1992, 7(3), pp. 169-178.

Sriram et al., Scanning Laser Doppler Technique for Velocity Profile Sensing on a Moving Surface. Applied Optics, 1990, 29(16), pp. 2409-2417.

Stanbridge et al., Using a Continuously-Scanning Laser Doppler Vibrometer for Modal Testing. 14th International Modal Analysis Conference (IMAC), Dearborn, MI, Feb. 12-15, 1996, pp. 816-822.

Stanbridge et al., Modal Testing Using a Scanning Laser Doppler Vibrometer. Mechanical Systems and Signal Processing, 1999, 13(2), 255-270.

Stanbridge et al., Modal Testing Using Impact Excitation and a Scanning LDV. Shock and Vibration, 2000, 7(2), 91-100.

Stanbridge et al., Rotating disc vibration analysis with a circular-scanning LDV, in Proceedings of SPIE, the International Society for Optical Engineering, 4359 (2001) 464-469.

Wereley et al., Frequency response of linear time periodic systems, 29th IEEE Conference on Decision and Control, Honolulu, HI, USA, 1990, 6, 3650-3655.

Xu et al., Efficient and accurate calculation of discrete frequency response functions and impulse response functions. J. Vib. Acoust. 2016, 138 (3), 031003. 46 pages.

Xu et al., Damage identification of beam structures using free response shapes obtained by use of a continuously scanning laser Doppler vibrometer system. Mechanical Systems and Signal Processing, 2017, 92, 226-247.

Xu et al., Modal Parameter Estimation Using Free Response Measured by a Continuously Scanning Laser Doppler Vibrometer System with Application to Structural Damage Identification. Journal of Sound and Vibration, 2020, 485, 115536. 39 pages.

Xu et al., Operational modal analysis using lifted continuously scanning laser Doppler vibrometer measurements and its application to baseline-free structural damage identification. Journal of Vibration and Control, 2019, 25 (7), 1341-1364.

Xu et al., Accurate and efficient calculation of discrete correlation functions and power spectra. Journal of Sound and Vibration, 2015, 347, 246-265.

Yang et al., Lifting approach to simplify output-only continuous-scan laser vibrometry. Mechanical Systems and Signal Processing, 2014, 45 (2), 267-282.

Yang et al., Output-only modal analysis using continuous-scan laser Doppler vibrometry and application to a 20kw wind turbine. Mechanical Systems and Signal Processing, 2012, 31, 228-245.

Yuan et al., Estimation of modal parameters of a beam under random excitatin using a novel 3D continuously scanning laser Doppler vibrometer system and an extended demodulation method. Mechanical Systems and Signal Processing. 2021, 155, 107606. 16 pages.

Zhu et al., Dynamic Modeling and Optimal Control of Rotating Euler-Bernoulli Beams. Asme. J. Dyn. Sys., Meas., Control. 119 (4), 1997, 802-808.

* cited by examiner

Scan line on which mode shapes of the rotating fan blade are estimated

Scan path

TRACKING CONTINUOUSLY SCANNING LASER DOPPLER VIBROMETER SYSTEMS AND METHODS

RELATED APPLICATIONS

This application claims priority to U.S. application Ser. No. 18/048,567 filed Oct. 21, 2022, which claims benefit of U.S. Provisional Patent Application No. 63/270,591 filed Oct. 22, 2021 and is incorporated herein by reference in its entirety for all purposes.

GOVERNMENT FUNDING

This invention was made with Government support under Federal Grant No. CMMI-1763024 awarded by the National Science Foundation. The Federal Government has certain rights to the invention.

BACKGROUND

There has been rapid development of renewable energy sources due to the worldwide energy crisis in the 1970s, and the demand for clean energy has become the main research driver. The wind turbine technology has advantages due to its maturity, good infrastructure, and cost competitiveness among renewable energy technology applications. In order to more efficiently harvest wind energy, wind turbines sizes have become larger, and maintenance and repair works have become difficult. Wind turbines should be monitored to ensure that they are in good operating conditions and reduce high maintenance and logistics costs due to sudden failures.

Any component of a wind turbine can be damaged, such as failure in its concrete base and a failure of its blades. There are cases of structural damage in wind turbines from time to time worldwide. Since blades are key elements of a wind turbine, and their cost can account for 15-20% of the total wind turbine cost, structural health of blades has received extensive attention. The damage of blades is the most expensive damage type to repair, and the repair time is the longest. Currently, there is no suitable method for monitoring wind turbine blades in operational conditions. Manual inspection of stationary wind turbine blades is expensive and dangerous; a wind turbine needs to be dismantled for ground inspection or stalled for several days for manual inspection, which means that the turbine needs to stop generating power for several days during manual inspection. Therefore, an efficient and safe monitoring method for wind turbine blades in operational conditions is urgently needed.

A laser Doppler vibrometer measures the surface velocity of a point on a structure, and can be used to monitor the vibration of a linear structure and estimate its modal parameters. A laser Doppler vibrometer is considered to be one of the most accurate and reliable vibration measurement tools can measure the surface velocity of a point on a structure along its laser beam direction. However, the measurement efficiency of a laser vibrometer becomes critical when there is a large and dense measurement grid. A laser vibrometer can be equipped with a scanner that has a set of orthogonal mirrors to increase its measurement efficiency. The laser spot of the vibrometer is able to continuously sweep along a prescribed path on a structure to measure its surface velocity by rotating the mirrors that are controlled by a controller. When rotation angles of the mirrors continuously change, since the path and speed of the laser spot on the structure can be controlled, various scans of the laser spot can be created. The laser vibrometer, scanner, and controller of the scanner constitute a continuous scanning laser Doppler vibrometer (CSLDV) system. In other words, a continuous scanning laser Doppler vibrometer (CSLDV) system monitors the vibration on prescribed trajectories on the surface of a structure. When the sampling frequency of the CSLDV system is high, the system can efficiently perform spatially dense vibration measurement.

Different modal analysis methods process the response of the structure measured by a CSLDV system and estimate its modal parameters.

Modal analysis studies modal parameters of a linear time-invariant structure, including natural frequencies, mode shapes, and modal damping ratios. A modal analysis method can be considered as an experimental modal analysis (EMA) method or an operational modal analysis (OMA) method depending on whether an excitation applied on the structure needs to be measured or not. An EMA method requires excitation measurement while an OMA method does not. Frequency response functions or impulse response functions of a structure are analyzed to estimate its modal parameters in EMA. Correlation functions with non-negative time delays and their power spectra are calculated and analyzed to estimate modal parameters of a structure in OMA based on the natural excitation testing theory. Compared with EMA methods, modal parameters can be accurately estimated in OMA methods when the structure is assumed to be under white noise excitation that is unknown or not measured. Hence EMA methods are more appropriate for analyzing structures in well controlled laboratory environments, but OMA methods are more appropriate for structures in operating conditions or under ambient excitation, such as a wind turbine.

To analyze CSLDV measurements of structures undergoing different vibrations such as sinusoidal vibration, free vibration, and random vibration, various methods have been proposed.

To monitor the vibration of a rotating structure, point tracking methods were developed for laser vibrometer systems to track a single point on it. Point tracking methods were extended to continuous scanning along lines or across areas on rotating structures. Di Maio and Ewins applied continuous tracking scanning laser Doppler vibrometer (SLDV) measurement methods to rotating bladed discs to estimate their ODSs. Gasparoni et al. developed a method to track a rotating fan and measure its full-field ODSs by attaching an encoder to it. Martarelli et al. developed a new method to track rotating structures and estimate their ODSs in coast-down tests. Khalil et al. used a tracking laser Doppler vibrometer to track a rotating object whose angular position was tracked by an encoder attached to the fan shaft.

Encoders are used in the above prior methods to obtain rotation speeds of these structures, and mirrors of tracking SLDV systems should be aligned with rotation axes of the structures to obtain accurate results. However, it can be difficult to attach an encoder to a large rotating structure such as a horizontal-axis wind turbine and align mirrors of a SLDV system with its rotation axis. Castellini and Tomasini developed a point tracking laser vibrometer based on an image processing method to monitor the vibration of a single point on a moving windscreen wiper, but this method cannot estimate its mode shapes or ODSs.

SUMMARY

The Summary is provided to introduce a selection of concepts that are further described below in the Detailed Description. This Summary is not intended to identify key or essential features of the claimed subject matter, nor is it intended to be used as an aid in limiting the scope of the claimed subject matter.

Disclosed herein is a new CSLDV system for tracking the angular position of a rotating structure and a new OMA method for estimating its modal parameters under random excitation.

A new OMA method ("an improved demodulation method") is presented herein based on a rigorous nonuniform rotating beam vibration theory, an image processing method, and an improved demodulation method that can estimate modal parameters of a structure, including damped natural frequencies and end-to-end undamped mode shapes, under random excitation is developed to estimate the rotation speed and modal parameters of a rotating structure. A camera is used to capture images of the rotating structure so that a CSLDV system can track the structure by processing its images. Damped natural frequencies of the rotating structure are obtained from the fast Fourier transform (FFT) of its response measured by the CSLDV system. The improved demodulation method processes the measured response of the rotating structure under random excitation. End-to-end undamped mode shapes of the rotating structure can be obtained by multiplying the measured response by sinusoidal signals with its damped natural frequencies and applying a low-pass filter to the multiplied measured response. The new OMA method can estimate damped natural frequencies and end-to-end undamped mode shapes of the rotating structure with a constant speed and their instantaneous values in a short time duration for a non-constant rotation speed. Estimated end-to-end undamped mode shapes of the rotating structure can be used to detect damage in it in some future study, which can be used for wind turbine blade damage detection.

Experimental investigation of the new OMA method was conducted on a rotating fan blade under random excitation using a new tracking CSLDV (TCSLDV) system that consists of a single-point laser vibrometer, a scanner with its controller, and a camera. The fan was vertically mounted on a stationary frame, which can be considered as a model of a wind turbine. Another fan was used to randomly excite the fan blade that was scanned by the TCSLDV system. Damped natural frequencies and end-to-end undamped mode shapes of the fan blade with a constant rotation speed and their instantaneous values in a short time duration for a non-constant rotation speed were estimated.

Another new OMA method ("an improved lifting method") is disclosed herein based on a rigorous rotating beam vibration theory, an image processing method, and a modal parameter estimation method to estimate the rotation speed, modal parameters, and ODSs of a rotating structure under ambient excitation. A camera is used to capture images of the rotating structure so that a CSLDV system can track the structure by processing its images. Raw CSLDV measurement is transformed into measurements at multiple virtual measurement points using the lifting method. The OMA method can be used to estimate modal parameters of the rotating structure with a constant speed, including damped natural frequencies, undamped mode shapes, and modal damping ratios, by calculating and analyzing correlation functions between lifted measurements at virtual measurement points and a reference measurement point, and their power spectra. It can also be used to estimate ODSs of the rotating structure with a constant or prescribed time-varying speed. Estimated mode shapes and ODSs can be used to detect damage in a rotating structure in some future study.

Experimental investigation of the OMA method was conducted on a rotating fan blade under ambient excitation using a new tracking CSLDV (TCSLDV) system that consists of a laser vibrometer, a scanner with its controller, and a camera. The fan was vertically mounted on a stationary frame, which can be considered as a model of a wind turbine. Modal parameters and the ODS of the fan blade with a constant rotation speed and the ODS of the fan blade with a non-constant rotation speed were estimated.

A 2D scan scheme is presented herein for a tracking CSLDV system that can track a rotating structure by using its camera. However, the lifting method only estimated first modal parameters of the rotating structure since Nyquist frequency of the tracking CSLDV system depends on the frame rate of the camera in the system while its frame rate is not high enough to estimate higher modes of the structure. Other methods use a one-dimensional (1D) scan scheme so that it cannot estimate full-field mode shapes or ODSs of a rotating structure. A new OMA method disclosed herein ("an improved 2D demodulation method") uses a 2D scan scheme to estimate higher full-field mode shapes of a rotating structure subject to random excitation is needed to monitor the vibration of a horizontal-axis wind turbine blade. The new OMA method is based on a rigorous rotating plate model and the improved demodulation method are developed to monitor the vibration and estimate damped natural frequencies and full-field mode shapes of a rotating structure subject to random excitation.

The tracking CSLDV system is used to investigate the 2D scan scheme and OMA method by tracking and scanning a rotating fan blade, which is a model of rotating horizontal-axis wind turbine blade. The fan whose one blade was scanned by the tracking CSLDV system was randomly excited by the air flow of another fan. The improved demodulation method can process the measured response of the tracking CSLDV system to estimate damped natural frequencies and full-field mode shapes of the rotating fan blade. Damped natural frequencies and full-field mode shapes of the rotating fan blade with different constant speeds were estimated by the OMA method. The full-field mode shapes of a rotating wind turbine blade estimated by the OMA method can be used to detect damage in the blade, for example.

One aspect of the present disclosure provides a modal analysis method comprising: measuring a response of a rotating structure subject to random excitation with a system; determining a Fast Fourier Transform (FFT) of the response; applying a bandpass filter to the response with a passband that includes a damped natural frequency of the rotating structure to create a filtered response; determining a time interval between a minimum value and a maximum value of the filtered response; multiplying the filtered response in the time interval by sinusoidal signals to create a plurality of processed responses; and applying a lowpass filter to the plurality of processed responses to obtain an end-to-end undamped mode shape of the rotating structure (e.g., in-plane and quadrature components of an end-to-end undamped mode shape).

In some embodiments, the sinusoidal signals include $\cos(\omega_{d,i}t)$ and $\sin(\omega_{d,i}t)$, where $w_{d,i}$ is the damped natural frequency of the rotating structure.

In some embodiments, the system is a TCSLDV system.

In some embodiments, the system includes a camera, a scanner, and a single-point laser Doppler vibrometer.

In some embodiments, the rotating structure is rotating at a non-constant speed.

In some embodiments, the rotating structure is rotating at a constant speed.

In some embodiments, the time interval is measured by the system from a first end of a scan path to a second end.

In some embodiments, the method further includes determining end-to-end undamped mode shapes of the structure.

In some embodiments, the method further includes determining a first normalized end-to-end undamped mode shape, a second normalized end-to end undamped mode shape, and/or a third normalized end-to-end undamped mode shape of the rotating structure.

In some embodiment, the method further includes determining a first damped natural frequency, a second damped natural frequency, and/or a third damped natural frequency of the rotating structure.

In some embodiments, measuring the response of the rotating structure includes identifying a mark on the rotating structure.

In some embodiments, the mark is a black circular mark.

In some embodiments, measuring includes scanning along a two-dimensional path on the rotating structure.

In some embodiments, the rotating structure is a wind turbine blade.

Another aspect of the present disclosure provides a modal analysis method comprising: measuring a response of a rotating structure subject to random excitation with a system; interpolate positions of the response on a grid to generate a plurality of interpolated positions; rectifying the plurality of interpolated positions to create a plurality of rectified interpolated positions; identifying a plurality of zero-crossings from the plurality of rectified interpolated positions; determine a portion of the plurality of zero-crossings with a time increment; and interpolate and lift measurements at the portion of the plurality of zero-crossings.

In some embodiments, rectifying the plurality of interpolated positions includes determining negative absolute values of differences between the plurality of interpolated positions and a position of a virtual measurement point on a scan path.

In some embodiments, the time increment is equal to the inverse of a scan frequency.

In some embodiments, the system is a TCSLDV system.

In some embodiments, the system includes a camera, a scanner, and a single-point laser Doppler vibrometer.

In some embodiments, the method includes capturing images of the rotating structure.

In some embodiments, the method further includes determining a damped natural frequency, a damping ratio, and/or an undamped mode shape of the rotating structure.

In some embodiments, the rotating structure is a wind turbine blade.

BRIEF DESCRIPTION OF THE DRAWINGS

The accompanying figures are provided by way of illustration and not by way of limitation.

DETAILED DESCRIPTION

Figures 1, 2A:
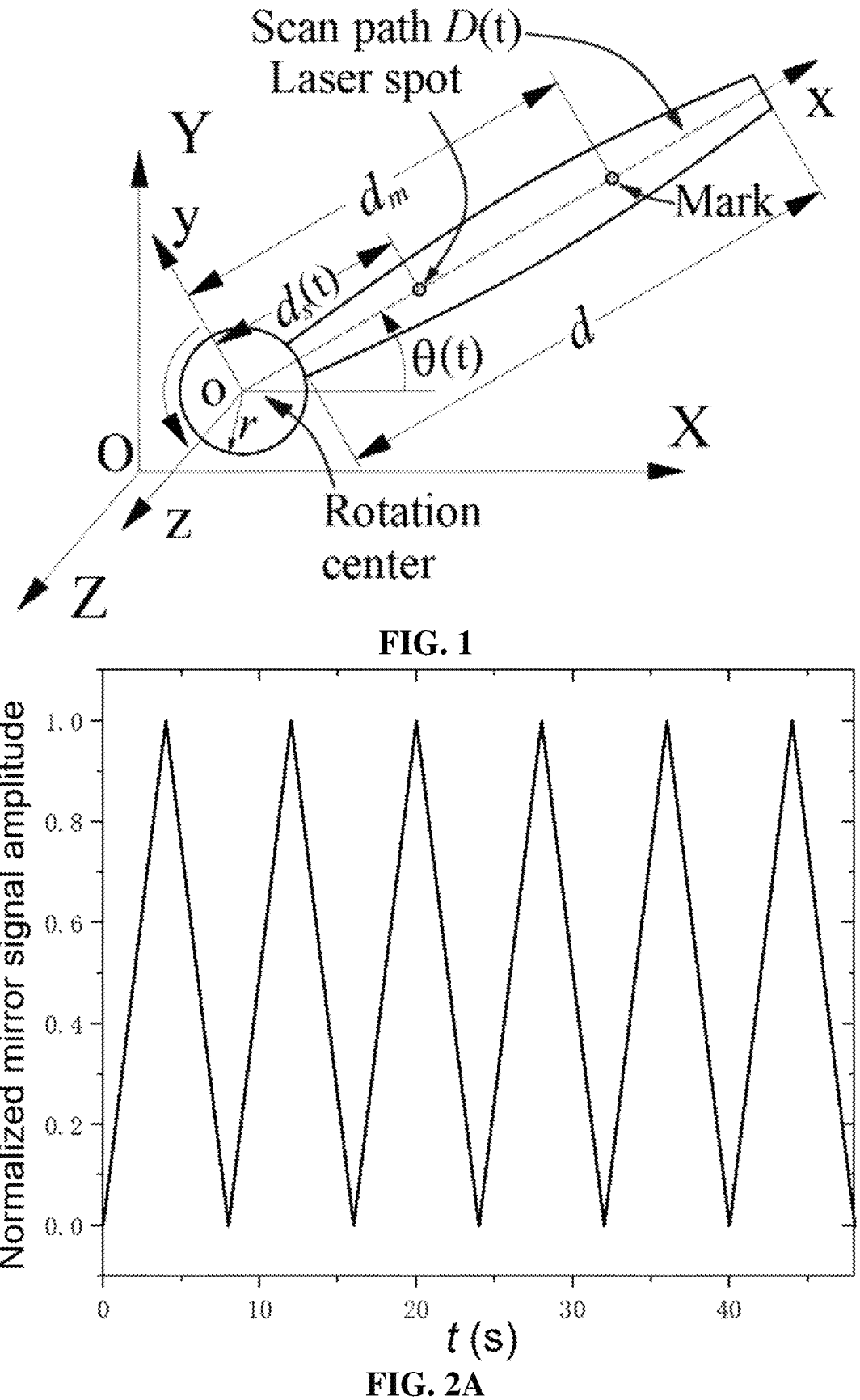
FIG. 1 is a schematic of a rotating fan blade.
FIG. 2A is graph of simulate mirror signals for a TCSLDV system, specifically, the X-mirror signal for scanning a stationary structure.

Section headings as used in this section and the entire disclosure herein are merely for organizational purposes and are not intended to be limiting.

All publications, patent applications, patents and other references mentioned herein are incorporated by reference in their entirety.

1. DEFINITIONS

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated. Recitation of ranges of values herein are merely intended to serve as a shorthand method of referring individually to each separate value falling within the range, unless otherwise-Indicated herein, and each separate value is incorporated into the specification as if it were individually recited herein. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this disclosure.

Unless otherwise defined herein, scientific and technical terms used in connection with the present disclosure shall have the meanings that are commonly understood by those of ordinary skill in the art. The meaning and scope of the terms should be clear; in the event, however of any latent ambiguity, definitions provided herein take precedent over any dictionary or extrinsic definition. Further, unless otherwise required by context, singular terms shall include pluralities and plural terms shall include the singular.

As used herein, the term "damped natural frequency" refers to the frequency at which a system with damping tends to oscillate in the absence of any driving forces.

2. DEMODULATION METHODOLOGY

Stanbridge and Ewins developed a demodulation method and a polynomial method for a CSLDV system to obtain operational deflection shapes (ODSs) of a structure under sinusoidal excitation. The demodulation method can be used to obtain ODSs of the structure by multiplying the response measured by the CSLDV system by sinusoid signals with the excitation frequency and applying a low-pass filter to the measured response multiplied by the sinusoidal signals. The polynomial method can be used to obtain ODSs of the structure by processing the discrete Fourier transform of the measured response. These two methods were applied to measurements of structures under impact and multi-sine excitations. These two methods are considered to be equivalent in measurement of the ODS if the structure is made of materials without mass and stiffness discontinuities and geometrically smooth. However, if the scan path of the laser spot passes over a damage on the structure, local anomaly caused by the damage can be shown in the ODS measured from the demodulation method while the local anomaly cannot be shown in the ODS measured from the polynomial method.

Chen et al. proposed a baseline-free method that combines the two methods to identify damage in beams under sinusoidal excitation, and the demodulation method was later used alone to identify damage in beams and plates. The demodulation method can only obtain ODSs of a structure under sinusoidal excitation. Based on the demodulation method, Xu et al. introduced a free response shape of a structure, which is a new type of vibration shapes. The free response shape corresponding to one mode of the structure can be used for baseline-free damage identification of the structure. A modal estimation method based on the concept of free response shape and demodulation method was developed to estimate modal parameters of the structure under impact excitation.

Nonuniform Rotating Euler-Bernoulli Beam Vibration Theory: With reference to FIG. 1, consider a fan blade that rotates about the z axis, which can be modeled as a nonuniform rotating Euler-Bernoulli beam with a length d attached to a rigid hub with a radius r. Two coordinate systems are considered: an inertial coordinate system O-XYZ, and a rotating coordinate system o-xyz whose origin o is at the center of the rigid hub, which is referred to as the rotation center; the z axis is parallel to the Z axis. The position of the origin O of the inertial coordinate system O-XYZ depends on the position of the camera of the TCSLDV system. Small transverse vibration of the beam along the z axis is considered and vibrations along x and y axes are neglected. The x axis passes through the rotation center and is tangent to the neutral axis of the beam at the point where the beam is attached to the hub.

The governing equation of the nonuniform rotating Euler-Bernoulli beam under a distributed random excitation force f(x, t) in the z direction and its associated boundary conditions are derived using the extended Hamilton's principle:

$$\rho(x)u_{tt}(x, t) + C[u_t(x, t)] + [EI(x)u_{xx}(x, t)]_{xx} - \tag{1}$$

$$u_{xx}(x, t)\dot{\theta}^2(t)\int_x^{r+d}\rho(\zeta)\zeta d\zeta + \rho(x)xu_x(x, t)\dot{\theta}^2(t) =$$

$$f(x, t), r \leq x \leq r+d, t > 0$$

$$u(x, t)|x = r = u_x(x, t)|x = \tag{2}$$

$$r = u_{xx}(x, t)|x = r+d = [EI(x)u_{xx}(x, t)]_x|x = r+d = 0$$

where the subscripts denote partial differentiation, an overdot denotes a time derivative, x is the spatial position along the x axis, t is time, θ(t) is the angle between the x and X axes as shown FIG. 1, u is the transverse displacement of the beam at the position x and time t along the z axis, ρ(x) and EI(x) are the mass per unit length and flexural rigidity of the beam at x, respectively, and C(•) is the spatial damping operator. When θ̇(t)=Ω is a constant, EQN. 1 can be written as $$\rho(x)u_{tt}(x, t) + C[u_t(x, t)] + L[u(x, t)] = f(x, t), r \leq x \leq r+d, t > 0 \tag{3}$$

where L(•) is the spatial stiffness operator:

$$L[u] = [EI(x)u_{xx}(x, t)]_{xx} - u_{xx}(x, t)\Omega^2\int_x^{r+d}\rho(\zeta)\zeta d\zeta + \rho(x)xu_x(x, t)\Omega^2, \tag{4}$$

$$r \leq x \leq r+d, t > 0$$

The term $-u_{xx}(x, t)\Omega^2\int_x^{r+d}\rho(\zeta)\zeta d\zeta + \rho(x)xu_x(x, t)\Omega^2$ in EQN. 4 is referred to as the centrifugal stiffening term due to rotation of the beam. The eigenvalue problem associated with the corresponding undamped rotating beam is $$L[\phi] = \omega^2\rho(x)\phi \tag{5}$$

where ω is the undamped natural frequency of the beam, and φ is the corresponding mode shape or eigenfunction that satisfies boundary conditions corresponding to EQN. 2. Applying the boundary conditions for φ and integration by part, one has $$\int_r^{r+d} v(x)L[w(x)]dx = \int_r^{r+d} v(x)\left\{[EI(x)w_{xx}(x)]_{xx} - w_{xx}(x)\Omega^2\int_x^{r+d}\right. \tag{6}$$

$$\rho(\zeta)\zeta d\zeta + \rho(x)xw_x(x, t)\Omega^2\right\}dx$$

$$= \int_r^{r+d}\left[EI(x)w_{xx}(x)v_{xx}(x) + \Omega^2 w_x(x)v_x(x)\int_x^{r+d}\right.$$

$$\rho(\zeta)\zeta d\zeta\right]dx$$

-continued $$= \int_r^{r+d} w(x)L[v(x)]dx, \ r \le x \le r+d, \ t > 0$$

where $v(x)$ and $w(x)$ are two comparison functions that satisfy the boundary conditions for $\phi$. Hence $L(\cdot)$ is self-adjoint. Let $v(x)=w(x)$ in EQN. 6; one has $$\int_r^{r+d} w(x)L[w(x)]dx = \tag{7}$$

$$\int_r^{r+d} \left[ EI(x)w_{xx}^2(x) + \Omega^2 w_x^2(x) \int_x^{r+d} \rho(\zeta)\zeta d\zeta \right] dx \ge 0, \ r \le x \le r+d, \ t > 0$$

which means that $L(\cdot)$ is positive definite. One also has $$\int_r^{r+d} v(x)\rho(x)w(x)dx = \int_r^{r+d} w(x)\rho(x)v(x)dx, \ r \le x \le r+d, \ t > 0 \tag{8}$$

$$\int_r^{r+d} w(x)\rho(x)w(x)dx = \int_r^{r+d} \rho(x)w^2(x)dx \ge 0, \ r \le x \le r+d, \ t > 0 \tag{9}$$

which mean that the spatial mass operator $\rho(x)$ is self-adjoint and positive definite. By the expansion theorem, the solution to EQN. 3 can be expressed as $$u(x, t) = \sum_{i=1}^{\infty} \phi_i(x)q_i(t) \tag{10}$$

where $\phi_i(x)$ is the i-th eigenfunction of the corresponding undamped nonuniform rotating beam and $q_i(t)$ is the i-th generalized coordinate. Since the undamped nonuniform rotating beam is self-adjoint and $L(\cdot)$ and $\rho(x)$ are positive definite, its eigenfunctions are real and can be normalized to satisfy the following orthonormality relations:

$$\int_r^{r+d} \phi_i(x)\rho(x)\phi_j(x)dx = \delta_{ij} \tag{11}$$

$$\int_r^{r+d} \phi_i(x)L[\phi_j(x)]dx = \omega_i^2 \delta_{ij} \tag{12}$$

where $\omega_i$ is the i-th real undamped natural frequency of the rotating beam and $\delta_{ij}$ is Kronecker delta that satisfies $$\delta_{ij} = \begin{cases} 1, i = j \\ 0, i \ne j \end{cases} \tag{13}$$

It is assumed that the spatial damping operator satisfies $C(\cdot)=k_1L(\cdot)+k_2\rho(x)$, where $k_1$ and $k_2$ are two constants. Substituting EQN. 10 into EQN. 3, multiplying the resulting equation by $\phi_j$, integrating the resulting equation from x=r to x=r+d, and using EQN. 9 and EQN. 10 and the expression $\int_r^{r+d}\phi_i(x)C[\phi_j(x)]dx=c_i\delta_{ij}$, where $c_i=k_1\omega_i^2+k_2$, yields.

$$\ddot{q}_i(t) + c_i\dot{q}_i(t) + \omega_i^2 q_i(t) = \int_x^{r+d} \phi_i(x)f(x, t)dx \tag{14}$$

Considering an underdamped nonuniform rotating beam, one has $c_i=2\zeta_i\omega_i$ with $0<\zeta_i<1$ being the i-th modal damping ratio of the beam. Since $\omega_1 \le \omega_i$ for i=1, 2, . . . , when $0<c_i\le 2\omega_1$, all the modal damping ratios $\zeta_i$ satisfy $0<\zeta_i<1$. Assume that EQN. 1 has zero initial conditions; the solution to EQN. 14 can be expressed as $$q_i(t) = \int_0^t \int_1^{r+d} \phi_i(x)f(x, t-\tau)g_i(\tau)dxd\tau \tag{15}$$

$$g_i(t) = \frac{1}{\omega_{d,i}} e^{-\zeta_i\omega_i t} \sin(\omega_{d,i}t) \tag{16}$$

where
is the unit impulse response function of the beam corresponding to its i-th damped mode and $\omega_{d,i}=\omega_i\sqrt{1-\zeta_i^2}$ is its i-th damped natural frequency. Substituting EQN. 15 into EQN. 10 yields $$u(x, t) = \sum_{i=1}^{\infty} \phi_i(x) \int_0^t \int_r^{r+d} \phi_i(x)f(x, t-\tau)g_i(\tau)dxd\tau \tag{17}$$

concentrated force $f_a(t)$ is applied at a position $x_a$ on the beam, one has $$f(x, t) = \delta(x-x_a)f_a(t) \tag{18}$$

where $\delta$ is Dirac delta function. Substituting EQN. 18 into EQN. 17 yields $$u(x, t) = \sum_{i=1}^{\infty} \phi_i(x)\phi_i(x_a) \int_0^t f_a(t-\tau)g_i(\tau)d\tau \tag{19}$$

Improved Demodulation Method for TCSLDV Measurement of a Rotating Structure: virtual measurement points are assigned on the fan blade in FIG. 1 along a time-varying scan path D(t) when the TCSLDV system is used to periodically measure u by scanning its laser spot along the path D(t). The TCSLDV system registers discrete measurements of u with a finite sampling frequency $F_{sa}$. The measured response of the TCSLDV system can be expressed by EQN. 19 when only one concentrated force acts on the blade. Substituting EQN. 16 into EQN. 19 and applying integration by part yield $$u(x, t) = \tag{21}$$

$$\sum_{i=1}^{\infty} \phi_i(x)\phi_i(x_a) \left\{ -\frac{e^{-\zeta_i\omega_i t}f_a(0)}{\omega_{d,i}\omega_i^2}[\zeta_i\omega_i \sin(\omega_{d,i}t) + \omega_{d,i}\cos(\omega_{d,i}t)] + \frac{f_a(t)}{\omega_i^2} + \int_0^t \frac{e^{-\zeta_i\omega_i t}f_a'(t-\tau)}{\omega_{d,i}\omega_i^2}[\zeta_i\omega_i \sin(\omega_{d,i}\tau) + \omega_{d,i}\cos(\omega_{d,i}\tau)]d\tau \right\}$$

EQN. 21 can be written as $$u(x, t) = \sum_{i=1}^{\infty} \phi_i(x)\phi_i(x_a)[A_i(t)\cos(\omega_{d,i}t) + B_i(t)\sin(\omega_{d,i}t) + C_i(t)] \tag{22}$$

13

14 where $A_i(t)$, $B_i(t)$ and $C_i(t)$ are arbitrary functions of time related to the concentrated force $f_a(t)$ that is assumed to be a white-noise signal. Applying a bandpass filter with a passband that contains only one damped natural frequency of the rotating fan blade $\omega_{d,i}$ to the measured response in EQN. 22, one has $$u_i(x, t) = \Phi_i(x)\cos(\omega_{d,i}t - \alpha) = \Phi_{I,i}(x)\cos(\omega_{d,i}t) + \Phi_{Q,i}(x)\sin(\omega_{d,i}t) \quad (23)$$

where $u_i(x, t)$ is the signal obtained after $u(x, t)$ is band-pass filtered, $\Phi_i(x)=H_i\phi_i(x)$ in which $H_i$ is a scalar factor, $\Phi_{I,i}(x)=\Phi_i(x)\cos(\omega_{d,i}t)$ and $\Phi_{Q,i}(x)=\Phi_i(x)\sin(\omega_{d,i}t)$ are in-plane and quadrature components of $\Phi_i(x)$, respectively, and $\alpha$ is a phase variable. EQN. 23 is multiplied by $\cos(\omega_{d,i}t)$ and $\sin(\omega_{d,i}t)$ to obtain $\Phi_{I,i}(x)$ and $\Phi_{Q,i}(x)$, respectively:

$$u_i(x, t)\cos(\omega_{d,i}t) = \Phi_{I,i}(x)\cos^2(\omega_{d,i}t) + \Phi_{Q,i}(x)\sin(\omega_{d,i}t)\cos(\omega_{d,i}t) = \quad (24)$$
$$\frac{1}{2}\Phi_{I,i}(x) + \frac{1}{2}\Phi_{I,i}(x)\cos(2\omega_{d,i}t) + \frac{1}{2}\Phi_{Q,i}(x)\sin(2\omega_{d,i}t)$$

$$u_i(x, t)\sin(\omega_{d,i}t) = \Phi_{I,i}(x)\sin(\omega_{d,i}t)\cos(\omega_{d,i}t) + \Phi_{Q,i}(x)\sin^2(\omega_{d,i}t) = \quad (25)$$
$$\frac{1}{2}\Phi_{Q,i}(x) + \frac{1}{2}\Phi_{I,i}(x)\sin(2\omega_{d,i}t) - \frac{1}{2}\Phi_{Q,i}(x)\cos(2\omega_{d,i}t)$$

By applying a low-pass filter to $u_i(x, t)\cos(\omega_{d,i}t)$ and $u_i(x, t)\sin(\omega_{d,i}t)$, $\frac{1}{2}\Phi_{I,i}(x)\cos(2\omega_{d,i}t)$, $\frac{1}{2}\Phi_{Q,i}(x)\sin(2\omega_{d,i}t)$, $\frac{1}{2}\Phi_{I,i}(x)\sin(2\omega_{d,i}t)$ and $-\frac{1}{2}\Phi_{Q,i}(x)\cos(2\omega_{d,i}t)$ in EQN. 24 and EQN. 25 can be eliminated so that $\Phi_{I,i}(x)$ and $\Phi_{Q,i}(x)$ can be obtained. When $\Phi_{I,i}(x)$ and $\Phi_{Q,i}(x)$ are obtained, $\Phi_i(x)$ can be determined using the relation in EQN. 23 and the i-th normalized mode shape of the undamped rotating fan blade can be estimated by dividing $\Phi_i(x)$ by its maximum value.

Figures 2B, 2C:
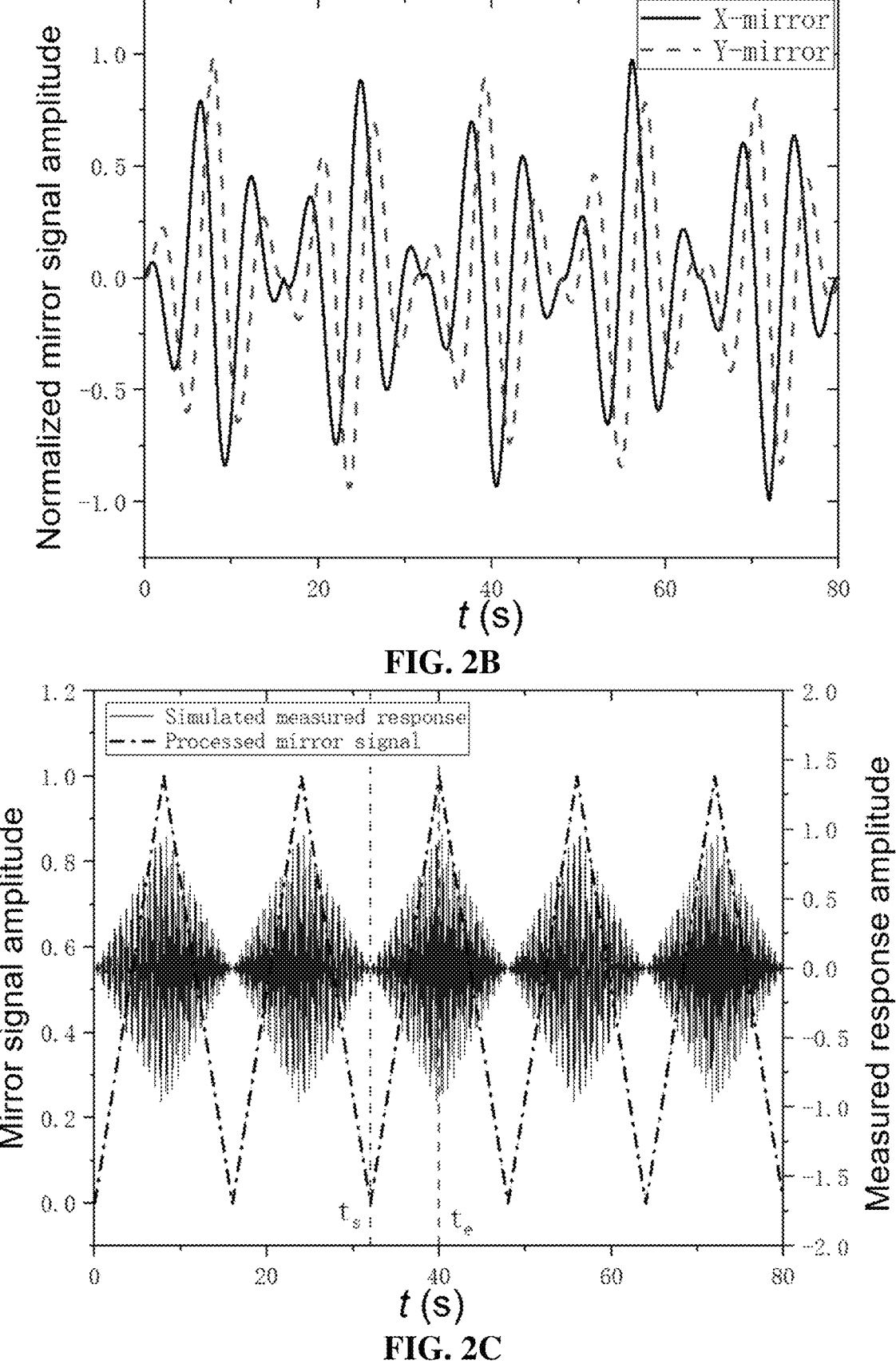
FIG. 2B is X- and Y-mirror signals for scanning rotating structure.
FIG. 2C is the processed mirror signal by combining mirror signals in FIG. 2B with a simulated measured response.

Method for Processing Mirror Signals of the TCSLDV System for Scanning a Rotating Structure: A scan path D(t) is usually a straight line on a rotating structure, which is the case considered here. If a CSLDV system is used to scan along a stationary structure and positions of the laser spot can be considered to be linearly related to the rotation angle of a mirror (e.g., the X-mirror) in the scanner in the CSLDV, only the X-mirror is needed to complete the scan and the mirror signal can be directly used as the position of the laser spot on the scan path D(t). However, both X- and Y-mirrors are needed to scan along a rotating structure such as the fan blade here. Thus use of only one mirror signal is not enough to describe the position of the laser spot on the scan path D(t). A simulated X-mirror signal for scanning a stationary structure is shown in FIG. 2A. Simulated X- and Y-mirror signals for scanning a rotating structure with a constant speed are shown in FIG. 2B. To obtain end-to-end mode shapes of the rotating structure with the constant speed, mirror signals that are similar to the one shown in FIG. 2A are needed to determine the position of the laser spot. A method is developed to combine X- and Y-mirror signals to describe the position of a laser spot on the scan path D(t) on the rotating structure.

In some embodiments, a mark is attached to a structure that rotates with a constant speed to identify positions of the structure and scan path at any time instant FIG. 1. Let the position of the rotation center relative to the inertial coordinate system O-XYZ be $(a_0, b_0)$, the position of the mark be $(a_m(t), b_m(t))$, and the position of the laser spot be $(a_s(t), b_s(t))$; one has $$M(t) = (a_m(t) - a_0, b_m(t) - b_0)^T = (d_m\cos(\Omega t), d_m\sin(\Omega t))^T \quad (26)$$

$$P(t) = (a_s(t) - a_0, b_s(t) - b_0)^T = (d_s(t)\cos(\Omega t), d_s(t)\sin(\Omega t))^T \quad (27)$$

where $M(t)$ and $P(t)$ are position vectors of the mark and laser spot, respectively, $d_m$ and $d_s(t)$ are distances between the rotation center and mark and between the rotation center and laser spot at time t that are shown in FIG. 1, respectively, and the superscript T denotes transpose of a vector. Note that $d_s(t)$ can be used to describe the position of the laser spot on the scan path D(t). Let $M(t_1)$ and $M(t_2)$ be position vectors of the mark at $t=t_1$ and $t=t_2$, respectively; the angle $\gamma$ between $M(t_1)$ and $M(t_2)$ can be obtained by $$\gamma = a\cos\left(\frac{M(t_1)\cdot M(t_2)}{|M(t_1)|\cdot|M(t_2)|}\right) \quad (28)$$

Therefore, the rotation speed of the structure R in revolutions per minute (rpm) can be written as $$R = \frac{30\gamma}{\pi(t_2 - t_1)} \quad (29)$$

The adjusted position vector of the mark is $$M^a = \quad (30)$$
$$((a_m - a_0)\cos(\beta) + (b_m - b_0)\sin(\beta), (a_m - a_0)\sin(\beta) + (b_m - b_0)\cos(\beta))^T$$

where $\beta$ is a phase variable that can be used to adjust the position of the mark in the inertial coordinate system O-XYZ. By changing the value of $\beta$, different positions of the mark can be obtained so that the TCSLDV system can sweep the laser spot along different scan paths. Two end points of the scan path can be obtained by $$\begin{cases} (a_1, b_1) = (a_0 + e_1M_x, b_0 + e_1M_y), & C_1 > 1 \\ (a_2, b_2) = (a_0 + e_2M_x, b_0 + e_2M_y), & 0 < C_2 < 1 \end{cases} \quad (31)$$

where $M_x=(a_m-a_0)\cos(\beta)+(b_m-b_0)\sin(\beta)$, $M_y=(a_m-a_0)\sin(\beta)+(b_m-b_0)\cos(\beta)$, and $e_1$ and $e_2$ are two length factors that can be used to change positions of the two end points and the distance between them. The TCSLDV system can sweep its laser spot between the two end points while tracking the rotating structure. According to EQN. 27, the scan path lies on a straight line through the rotation center, and the distance between the rotation center and laser spot is $$d_s(t) = |P(t)| = \sqrt{(a_s(t) - a_0)^2 + (b_s(t) - b_0)^2} \quad (32)$$

Note that X- and Y-mirror signals obtained in experiment can be used as $a_s(t)$ and $b_s(t)$, respectively. The position of the laser spot on the scan path $d_s(t)$ can be obtained by combining X- and Y-mirror signals using EQN. 32. The processed mirror signal by this method is shown in FIG. 2C, where two dashed lines at $t=t_s$ and $t=t_e$ indicate time instants when the laser spot reaches the two end points of the scan path, respectively. Mirror signals and the measured response between $t=t_s$ and $t=t_e$ can be used to obtain an end-to-end undamped mode shape of the rotating structure. The scan frequency of the TCSLDV system is $F_{sc}=2/(t_e-t_s)$. Therefore, the duration of the time interval $(t_s, t_e)$ is short when $F_{sc}$ is high.

Since the improved demodulation method can be applied to a measured response in a short time duration, the OMA method can also be applied to a structure that rotates with a prescribed time-varying speed to estimate its instantaneous damped natural frequencies and end-to-end undamped mode shapes in the short time duration since the rotation speed of the structure $\dot{\theta}(t)$ can be regarded as a constant in it and there are no other time-dependent coefficients in EQN. 1.

3. LIFTING METHODOLOGY

A lifting method that converts CSLDV measurement of a structure undergoing free vibration into measurements at multiple virtual measurement points as if there were transducers attached to it at these points in EMA. In this method, modal parameters of the structure can be estimated by obtaining and analyzing a set of frequency response functions between lifted measurements and an impact. A prior OMA method for a structure under ambient excitation was developed with use of a CSLDV system, where harmonic transfer functions and harmonic power spectra were employed. An OMA method that combines the lifting method and harmonic transfer functions was proposed, where processing and interpretation of CSLDV measurement become simpler. Since mode shapes of the structure estimated from the prior methods are represented by sums of spatially smooth harmonic functions, a large number of harmonic functions are required to describe the mode shapes if a scan path passes through a discontinuity on the structure. Xu et al. proposed a new OMA method for CSLDV measurement based on the lifting method to estimate modal parameters of a damaged structure and detect its local anomaly caused by damage. This OMA method requires the CSLDV system to scan the structure with a high scan frequency to obtain its modal parameters, which is difficult to achieve when its natural frequencies are high.

Figures 3, 4A:
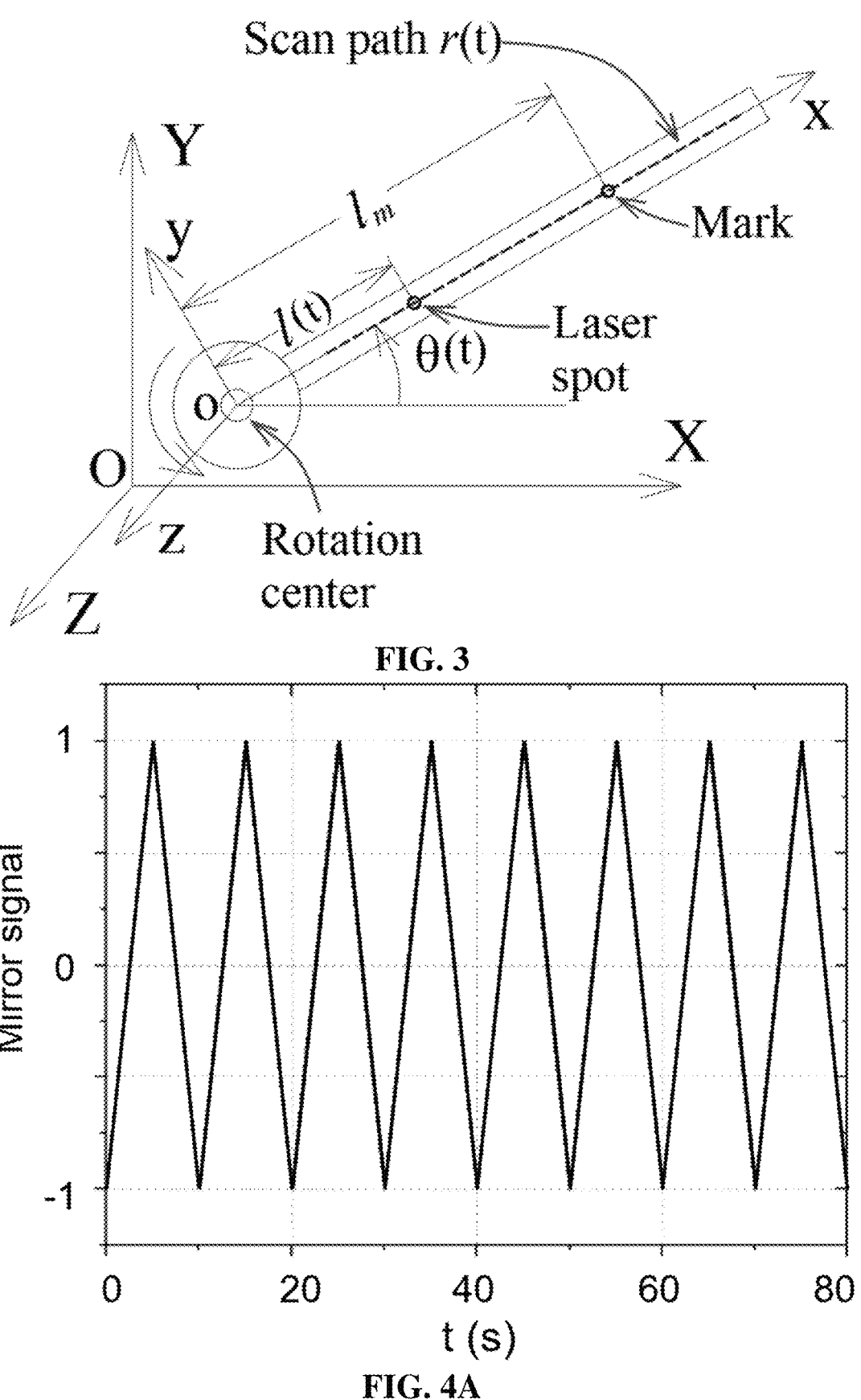
FIG. 3 is a schematic of a rotating structure.
FIG. 4A is a graph of simulator mirror signals of a CSLDV system, specifically, the X-mirror signal for scanning a stationary structure.

Rotating Euler-Bernoulli Beam Vibration Theory: As shown in FIG. 3, consider a fan blade that rotates about the z axis, which, without loss of generality, can be modeled as a uniform, rotating Euler-Bernoulli beam with a length l attached to a rigid hub with a radius b. Two coordinate systems are considered: an inertial coordinate system O-XYZ, and a rotating coordinate system o-xyz whose origin o is at the center of the rigid hub, which is referred to as the rotation center; the z axis is parallel to the Z axis. The position of the origin O of the inertial coordinate system O-XYZ depends on the position of the camera of the TCSLDV system. Small transverse vibration of the beam along the z axis is considered and vibrations along x and y axes are neglected. The x axis passes through the rotation center and is tangent to the neutral axis of the beam at the point where the beam is attached to the hub. Assume that the beam has linear viscous damping in the z direction with a damping coefficient c.

The governing equation of the uniform rotating Euler-Bernoulli beam under a distributed, external white-noise excitation force $f(x, t)$ in the z direction and its associated boundary conditions are derived using the extended Hamilton's principle:

$$\rho w_{tt}(x, t) + cw_t + EIw_{xxxx}(x, t) - \tag{33}$$

$$\frac{1}{2}\rho\dot{\theta}^2(t)\left[((b+l)^2 - x^2)w_{xx}(x, t) - 2xw_x(x, t)\right] =$$

$$f(x, t), b \le x \le b + l, t > 0$$

$$w(x, t)|x = b = w_x(x, t)|x = \tag{34}$$

$$b = w_{xx}(x, t)|x = b + l = w_{xxx}(x, t)|x = b + l = 0$$

where x is the spatial position along the x axis, t is time, $\theta(t)$ is the angle between the x- and X-axes, as shown FIG. 3, an overdot denotes a time derivative, w is the transverse displacement of the beam at the position x and time t along the z axis, and $\rho$ and EI are the mass per unit length and flexural rigidity of the beam, respectively. Note that EQN. 33 and EQN. 34 are applicable to a rotating beam with a prescribed time-varying speed $\dot{\theta}(t)$. When $\dot{\theta}(t)=\Omega$ is a constant, EQN. 33 can be written in the following form as $$\rho w_{tt}(x, t) + cw_t(x, t) + L[w(x, t)] = f(x, t), b \le x \le b + l, t > 0 \tag{35}$$

where $L(\bullet)$ is the stiffness operator:

$$L[w] = EIw_{xxxx}(x, t) - \frac{1}{2}\rho\Omega^2\left[((b+l)^2 - x^2)w_{xx}(x, t) - 2xw_x(x, t)\right], b \le \tag{36}$$

$$x \le b + l, t > 0$$

The term $-\frac{1}{2}\rho\Omega^2[((b+l)^2-x^2)w_{xx}(x,t)-2xw_x(x,t)]$ in EQN. 36 is referred to as the centrifugal stiffening term due to rotation of the beam. It can be shown that $L(\bullet)$ is self-adjoint and positive-definite with boundary conditions in EQN. 34. The eigenvalue problem associated with the corresponding undamped rotating beam is $$L[\phi] = \omega^2\rho\phi \tag{37}$$

where $\omega$ is the undamped natural frequency of the beam, and $\phi$ is the corresponding mode shape or eigenfunction that satisfies boundary conditions corresponding to EQN. 34. By the expansion theorem, the solution to EQN. 35 can be expressed as $$w(x, t) = \sum_{i=1}^{\infty} \phi_i(x)u_i(t) \tag{38}$$

where $\phi_i(x)$ is the i-th eigenfunction of the undamped rotating beam and $u_i(t)$ is the i-th generalized coordinate. Since the undamped rotating beam is self-adjoint, its eigenfunctions can be normalized to satisfy the following orthonormality relations:

$$\int_b^{b+l} \phi_i(p)\rho\phi_j(p)dp = \delta_{ij} \tag{39}$$

$$\int_b^{b+l} \phi_i(p)L[\phi_j(p)]dp = \omega_{n,i}^2\delta_{ij} \tag{40}$$

where $\omega_{n,i}$ is the i-th undamped natural frequency of the rotating beam and $\delta_{ij}$ is Kronecker delta that satisfies $$\delta_{ij} = \begin{cases} 1, & i = j \\ 0, & i \neq j \end{cases} \tag{41}$$

Substituting EQN. 38 into EQN. 35, multiplying the resulting equation by $\phi_j$, integrating the resulting equation from x=b to x=b+l, and using EQN. 39 and EQN. 40 and the expression $\int_b^{b+l} \phi_i(p)c\phi_j(p)dp = (c/\rho)\delta_{ij} = c_i\delta_{ij}$ yield $$\ddot{u}_i(t) + c_i\dot{u}_i(t) + \omega_{n,i}^2 u_i(t) = \int_b^{b+l} \phi_i(p)f(p,t)dp \tag{42}$$

Considering an underdamped rotating beam, one has $c_i = 2\zeta_i\omega_{n,i}$, where $0 < \zeta_i < 1$ is the i-th modal damping ratio of the beam. Since $\omega_{n,1} \leq \omega_{n,i}$ for i=1, 2, . . . , when $0 < c < 2\rho\omega_{n,1}$, all the modal damping ratios $\zeta_i$ satisfy $0 < \zeta_i < 1$. Assume that EQN. 33 has zero initial conditions; the solution to EQN. 42 can be expressed by $$u_i(t) = \int_0^t \int_b^{b+l} \phi_i(p)f(p,t)g_i(t-\tau)dpd\tau \tag{43}$$

where $g_i(t)$ is the unit impulse response function corresponding to the i-th damped mode of the beam and $\omega_{d,i} = \omega_{n,i}\sqrt{1-\zeta_i^2}$ is its i-th damped natural frequency. Substituting EQN. 43 into EQN. 38 yields $$w(x,t) = \sum_{i=1}^{\infty} \phi_i(x) \int_0^t \int_b^{b+l} \phi_i(p)f(p,\tau)g_i(t-\tau)dpd\tau \tag{45}$$

If a concentrated force $f_a(t)$ is applied at a position $x_a$ on the beam, one has $$f(x,t) = \delta(x-x_a)f_a(t) \tag{46}$$

where $\delta$ is Dirac delta function. Substituting EQN. 46 into EQN. 45 yields $$w(x,t) = \sum_{i=1}^{\infty} \phi_i(x)\phi_i(x_a) \int_0^t f_a(\tau)g_i(t-\tau)d\tau \tag{47}$$

If m concentrated forces are applied on the structure, the response of the beam can be expressed as a superposition of those from all the forces by $$w(x,t) = \sum_{j=1}^{m}\sum_{i=1}^{\infty} \phi_i(x)\phi_i(x_j) \int_0^t f_j(\tau)g_i(t-\tau)d\tau \tag{48}$$

$$g_i(t) = \frac{1}{\omega_{d,i}} e^{-\zeta_i\omega_{n,i}t}\sin(\omega_{d,i}t) \tag{44}$$

where $x_j$ is the position at which the j-th concentrated force $f_j$ is applied on the beam.

Lifting method for TCSLDV measurement of rotating structure: Virtual measurement points are assigned on the fan blade in FIG. 3 along a time-varying scan path r(t) when the TCSLDV system is used to periodically measure w by scanning its laser spot along the path r(t). The TCSLDV system registers discrete measurements of w with a finite sampling frequency $F_{sa}$.

Figures 4B, 4C:
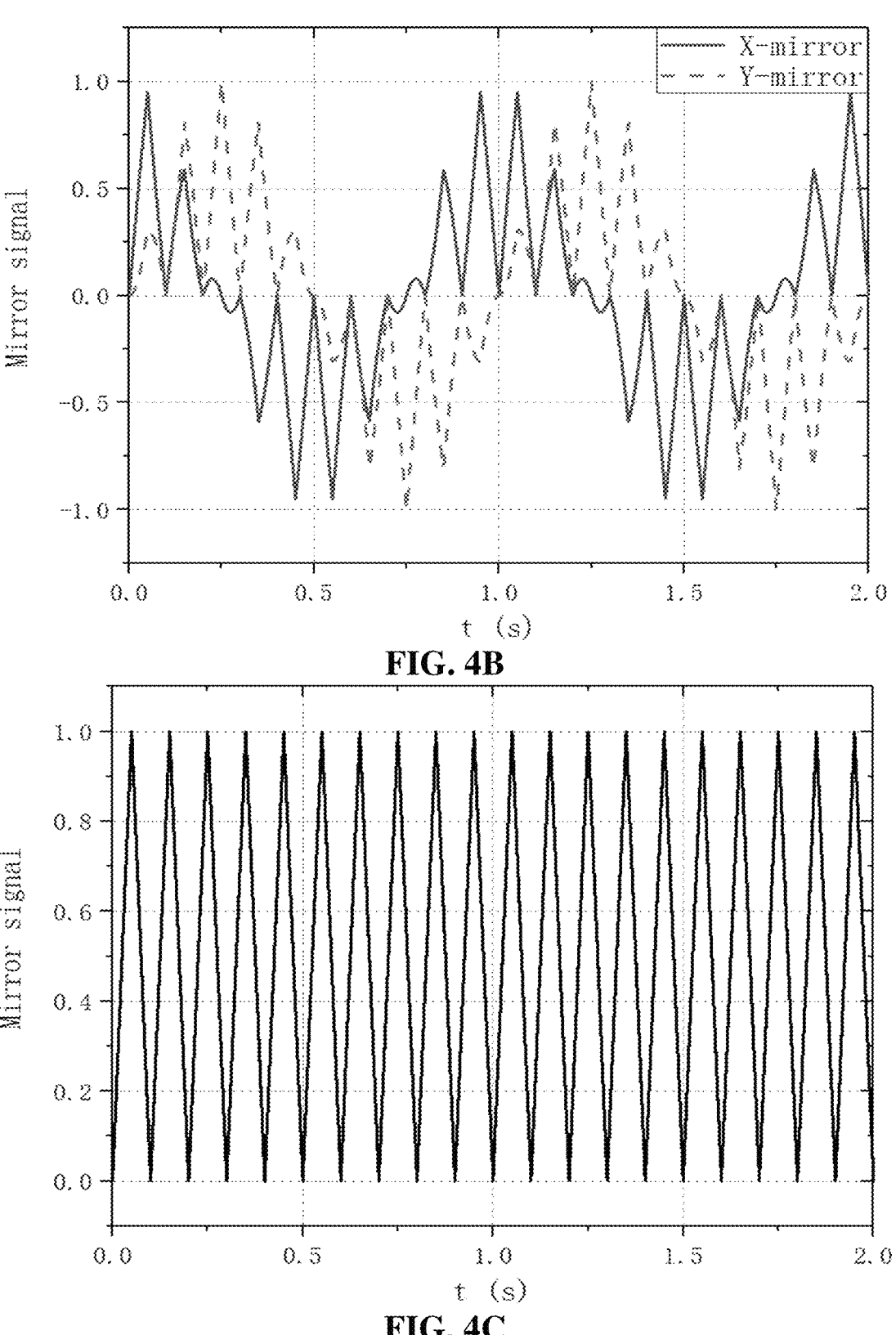
FIG. 4B is X- and Y-mirror signals for scanning a rotating structure.
FIG. 4C is the processed mirror signal by combining mirror signals in FIG. 4B.

A scan path r(t) is usually a straight line on a rotating structure, which is the case considered here. If a CSLDV system is used to scan along a stationary structure and positions of the laser spot can be considered to be linearly related to the rotation angle of a mirror (e.g., X-mirror) in the scanner in the CSLDV, only the X-mirror is needed to complete the scan and the mirror signal can be directly used as the position of the laser spot on the scan path r(t). However, both X- and Y-mirrors are needed to scan along a rotating structure such as the fan blade here; thus use of only one mirror signal is not enough to describe the position of the laser spot on the scan path r(t). A simulated X-mirror signal for scanning a stationary structure is shown in FIG. 4A. Simulated X- and Y-mirror signals for scanning a rotating structure with a constant speed are shown in FIG. 4B. A new method is developed in this work to combine X- and Y-mirror signals to describe the position of a laser spot on the scan path r(t) on a rotating structure.

A mark is attached to a structure that rotates with a constant speed to identify positions of the structure and scan path at any time instant FIG. 3. Let the position of the rotation center relative to the inertial coordinate system XYZ be $(u_0, v_0)$, the position of the mark be $(u_m(t), v_m(t))$, and the position of the laser spot be $(u(t), v(t))$; one has $$\begin{cases} u_m(t) - u_0 = l_m\cos(\theta(t)) = l_m\cos(\Omega t) \\ u_m(t) - u_0 = l_m\sin(\theta(t)) = l_m\sin(\Omega t) \end{cases} \tag{49}$$

$$\begin{cases} u(t) - u_0 = l(t)\cos(\theta(t)) = l(t)\cos(\Omega t) \\ v(t) - v_0 = l(t)\sin(\theta(t)) = l(t)\sin(\Omega t) \end{cases} \tag{50}$$

where $l_m$ is the distance between the rotation center and mark, and l(t) is the distance between the rotation center and laser spot at time t, which can be used to describe the position of the laser spot on the scan path r(t). The position vector of the mark is $$V_m(t) = ((u_m(t) - u_0), (v_m(t) - v_0))^T \tag{51}$$

where a superscript T denotes transpose of a vector. Let $V_m(t_1)$ be the position vector at $t=t_1$ and $V_m(t_2)$ be that at $t=t_2$; the angle $\theta_{12}$ between $V_m(t_1)$ and $V_m(t_2)$ can be obtained by $$\theta_{12} = a\cos\left(\frac{V_m(t_1) \cdot V_m(t_2)}{|V_m(t_1)| \cdot |V_m(t_2)|}\right) \tag{52}$$

Therefore, revolutions per minute of the structure can be written as $$RPM = \frac{30\theta_{12}}{\pi(t_2 - t_1)} \tag{53}$$

The adjusted position vector of the mark is $$V_m^a =$$ (54)

$$((u_m - u_0)\cos(a) + (v_m - v_0)\sin(a), (u_m - u_0)\sin(a) + (v_m - v_0)\cos(a))^T$$

where $\alpha$ is a phase variable that can be used to adjust the position of the mark in the inertial coordinate system O-XYZ. By changing the value of $\alpha$, different positions of the mark can be obtained so that the TCSLDV system can sweep the laser spot along different scan paths. Two end points of the scan path can be obtained by $$\begin{cases} (u_1, v_1) = (u_0 + C_1 V_x, v_0 + C_1 V_y), C_1 > 1 \\ (u_2, v_2) = (u_0 + C_2 V_x, v_0 + C_2 V_y), 0 < C_2 < 1 \end{cases}$$ (55)

where $V_x$ and $V_y$ are X and Y components of $V_m$, respectively, and $C_1$ and $C_2$ are two length factors that can be used to change the distance between the two end points and positions of the two end points. The TCSLDV system can sweep its laser spot between the two end points while tracking the rotating structure. Since the scan path lies on a straight line through the rotation center, the distance between the rotation center and laser spot is $$r(t) = \sqrt{(u - u_0)^2 + (v - v_0)^2}$$ (56)

where u and v are X- and Y-mirror signals, respectively. The position of the laser spot on the scan path r(t) can be obtained by combining X- and Y-mirror signals using EQN. 56. The processed mirror signal by this method is shown in FIG. 4C. The method can also be applied to a structure that rotates with a prescribed time-varying speed. The solution w in EQN. 47 can be written as functions of l(t) and t:

$$w[l(t), t] = \sum_{i=1}^{n} \phi_i[l(t)]\phi_i(x_a) \int_0^t f_a(\tau)g_i(t - \tau)d\tau$$ (57)

where n is the number of modes that are measured in discrete measurements of w by the TCSLDV system, which is finite since $F_{sa}$ is finite. The number of virtual measurement points N on the scan path r(t) is determined by the sampling frequency $F_{sa}$ and scan frequency $F_{sc}$ as $$N = \frac{F_{sa}}{F_{sc}}$$ (58)

where $F_{sc}$ is equal to the number of complete scans in one second. Multiple series of discrete measurements of w in EQN. 57 are formed by lifting them in the lifting method. Each lifted w series corresponds to a virtual measurement point as if it were measured by a transducer attached to the rotating structure at that point. Note that N in EQN. 58 should be an integer since the laser spot needs to arrive at the same virtual points in each complete scan period; thus $F_{sa}$ should be an integer multiple of $F_{sc}$. Therefore one has $$l(t) = l(t + sT_{sc})$$ (59)

where s=0, 1, 2, . . . and $T_{sc}=1/F_{sc}$ is the duration of a complete scan period. A complete scan means that the TCSLDV system sweeps its laser spot back and forth once on the scan path r(t). There is a constant sampling time difference $T_{sa}=1/F_{sa}$ between two neighboring lifted w series, which means the lifted w series are not simultaneously registered by the TCSLDV system. Let measurement of w starts at t=0 in EQN. 57 when the laser spot arrives at an endpoint of the scan path r(t); the lifted w at the k-th virtual measurement point on the path r(t) can thus be written as a function of $sT_{sc}$:

$$w_k^l(sT_{sc}) = w[(k-1)T_{sa} + (s-1)T_{sc}]$$ (60)

where k=0, 1, . . . K and s=0, 1, . . . S, in which K and S are numbers of measurement points and complete scans, respectively. EQN. 60 shows that the laser spot arrives at the k-th virtual measurement point when t=(k–1)$T_{sa}$+(s–1)$T_{sc}$ and the sampling frequency of $w_k^l$ is equal to $F_{sc}$. Measured w can be expressed by an S×K matrix $W^l$ that consists of lifted w at K virtual measurement points in S complete scans:

$$W^l =$$ (61)

$$\begin{bmatrix} w(0) & w(T_{sa}) & \dots & w((K-1)T_{sa}) \\ w(T_{sc}) & w(T_{sa} + T_{sc}) & \dots & w((K-1)T_{sa} + T_{sc}) \\ \vdots & \vdots & \ddots & \vdots \\ w((S-1)T_{sc}) & w(T_{sa} + (S-1)T_{sc}) & \dots & w((K-1)T_{sa} + (S-1)T_{sc}) \end{bmatrix}$$

where the s-th row consists of lifted w in the s-th scan period and the k-th column consists of lifted w at the k-th virtual measurement point.

Correlation between two TCSLDV measurements: Let $w_{k_1}^l$ t, and $w_{k_2}^l$ be lifted w at the $k_1$-th and $k_2$-th virtual measurement points on the scan path r(t); one has $$w_{k_1}^l(s_{k_1}T_{sc}) = \sum_{i=1}^{n} \phi_{i,k_1} \int_0^{(k_1-1)T_{sa}+(s_{k_1}-1)T_{sc}} \phi_i(x_a)f_a(\tau) \times$$ (62)

$$g_i[(k_1 - 1)T_{sa} + (s_{k_1} - 1)T_{sc} - \tau]d\tau$$

$$w_{k_2}^l(s_{k_2}T_{sc}) = \sum_{i=1}^{n} \phi_{i,k_2} \int_0^{(k_2-1)T_{sa}+(s_{k_2}-1)T_{sc}} \phi_i(x_a)f_a(\tau) \times$$ (63)

$$g_i[(k_2 - 1)T_{sa} + (s_{k_2} - 1)T_{sc} - \tau]d\tau$$

where $\phi_{i,k_1}(x)$ and $\phi_{i,k_2}(x)$ are values of the i-th normalized eigenfunction of the undamped rotating structure associated with the structure described by EQN. 33 at the $k_1$-th and $k_2$-th virtual measurement points on the scan path r(t), respectively, and $S_{k_1}$ and $S_{k_2}$ are numbers of complete scan periods of $w_{k_1}^l$ and $w_{k_2}^l$, respectively. The correlation function between $w_{k_1}^l$ and $w_{k_2}^l$ can be expressed by the expected value of their product:

$$\overline{R}_{k_1 k_2}[w_{k_1}^l(m_{k_1}T_{sc}), w_{k_2}^l(m_{k_2}T_{sc})] = E[w_{k_1}^l(m_{k_1}T_{sc})w_{k_2}^l(m_{k_2}T_{sc})]$$ (64)

where E[•] is an expectation operator. Note that correlation functions can be calculated whether the structure rotates with a constant or time-varying speed, but modal parameters can be estimated by analyzing the correlation functions when the structure rotates with a constant speed. The laser spot of the TCSLDV system arrives at the $k_1$-th and $k_2$-th virtual measurement points on the scan path r(t) at $t_1=(k_1-1)T_{sa}+(s_{k_1}-1)T_{sc}$ and $t_2=(k_2-1)T_{sa}+(s_{k_2}-1)T_{sc}$, respectively. Thus $$(k_2-1)T_{sa}+(s_{k_2}-1)T_{sc}=(k_2-1)T_{sa}+(s_{k_1}-1)T_{sc}+T \tag{65}$$

where $T=(s_{k_2}-s_{k_1})T_{sc}$ is the time-delay variable. If the structure rotates with a constant speed, the cross-correlation function in EQN. 63 becomes a function of $s_{k_1}T_{sc}$ and T by substituting EQN. 64 into EQN. 63 to obtain $$R_{k_1k_2}(m_{k_1}T_{sc},T)=E\left[w_{k_1}^i(m_{k_1}T_{sc})w_{k_2}^j(m_{k_1}T_{sc},T+T)\right] \tag{66}$$

which means that the reference point is the $k_1$-th measurement point on the scan path r(t) and the measurement point is the $k_2$-th virtual measurement point on the path r(t). Substituting EQNS. 62 and 63 into EQN. 66 yields $$R_{k_1k_2}(m_{k_1}T_{sc},T)= \tag{67}$$

$$E\left[\sum_{i=1}^n\sum_{j=1}^n\phi_{i,k_1}\phi_i(x_a)\phi_{j,k_2}\phi_i(x_a)\int_0^{(k_2-1)T_{sa}+(s_{k_2}-1)T_{sc}}\times\right.$$

$$\int_0^{(k_2-1)T_{sa}+(s_{k_2}-1)T_{sc}}g_i\left[(k_1-1)T_{sa}+(s_{k_1}-1)T_{sc}-\sigma\right]\times$$

$$\left.g_j\left[(k_2-1)T_{sa}+(s_{k_2}-1)T_{sc}-\tau\right]f_a(\sigma)f_a(\tau)d\tau d\sigma\right]$$

Since only f is a random variable in EQN. 67, EQN. 67 becomes $$R_{k_1k_2}(m_{k_1}T_{sc},T)= \tag{68}$$

$$\sum_{i=1}^n\sum_{j=1}^n\phi_{i,k_1}\phi_i(x_a)\phi_{j,k_2}\phi_i(x_a)\int_0^{(k_2-1)T_{sa}+(s_{k_2}-1)T_{sc}}\times$$

$$\int_0^{(k_2-1)T_{sa}+(s_{k_2}-1)T_{sc}}g_i\left[(k_1-1)T_{sa}+(s_{k_1}-1)T_{sc}-\sigma\right]\times$$

$$g_j\left[(k_2-1)T_{sa}+(s_{k_2}-1)T_{sc}+T-\tau\right]E[f_a(\sigma)f_a(\tau)]d\tau d\sigma$$

The expected value of $f_a(\sigma)f_a(\tau)$ is $$E[f_a(\sigma)f_a(\tau)]=\alpha_a\delta(\tau-\sigma) \tag{69}$$

where $\alpha_a$ is a constant that depends on $f_a$. Let $\lambda=(k_1-1)T_{sa}+(s_{k_1}-1)T_{sc}-\sigma$; substituting EQN. 69 into EQN. 68 yields $$\tilde{R}_{k_1k_2}(T)= \tag{70}$$

$$\sum_{i=1}^n\sum_{j=1}^n\alpha_a\phi_{i,k_1}\phi_i(x_a)\phi_{j,k_2}\phi_i(x_a)\times\int_0^\infty g_i(\lambda)g_j[T+(k_2-k_1)T_{sa}+\lambda]d\lambda$$

Substituting EQN. 35 into EQN. 70 yields $$\tilde{R}_{k_1k_2}(T)= \tag{71}$$

$$\sum_{j=1}^n\phi_{j,k_2}\left[P_{k_1k_2,j}e^{-\zeta_j\omega_{n,j}(T+(k_2-k_1)T_{sa})}\times\cos(\omega_{d,j}(T+(k_2-k_1)T_{sa}))+\right.$$

$$\left.Q_{k_1k_2,j}e^{-\zeta_j\omega_{n,j}(T+(k_2-k_1)T_{sa})}\times\sin(\omega_{d,j}(T+(k_2-k_1)T_{sa}))\right]$$

where $$P_{k_1k_2,j}= \tag{72}$$

$$\sum_{i=1}^n\frac{\alpha_a\phi_{i,k_1}\phi_i(x_a)\phi_i(x_a)}{\omega_{d,i}\omega_{d,j}}\int_0^\infty e^{(-\zeta_i\omega_{n,i}-\zeta_j\omega_{n,j})\lambda}\times\sin(\omega_{d,i}\lambda)\sin(\omega_{d,j}\lambda)d\lambda$$

$$Q_{k_1k_2,j}= \tag{73}$$

$$\sum_{i=1}^n\frac{\alpha_a\phi_{i,k_1}\phi_i(x_a)\phi_i(x_a)}{\omega_{d,i}\omega_{d,j}}\int_0^\infty e^{(-\zeta_i\omega_{n,i}-\zeta_j\omega_{n,j})\lambda}\times\sin(\omega_{d,i}\lambda)\cos(\omega_{d,j}\lambda)d\lambda$$

Let $A_j=\sqrt{(P_{k_1k_2,j})^2+(Q_{k_1k_2,j})^2}$ be an amplitude constant and $\theta_j=$a tan $2(Q_{k_1k_2,j},P_{k_1k_2,j})$ be a phase constant; EQN. 70 becomes $$\tilde{R}_{k_1k_2}(T)=R\left[\sum_{j=1}^n A_j\phi_{j,k_2}e^{-\zeta_j\omega_{n,j}(T+(k_2-k_1)T_{sa})+i\omega_{d,j}(T+(k_2-k_1)T_{sa}-\theta_j)}\right] \tag{74}$$

where R[•] donates the real part of a complex variable and $i=\sqrt{-1}$. Let $\tilde{A}=A_je^{-i\theta_j}$ be a complex factor corresponding to the j-th mode of the rotating structure with a constant speed; one has $$\tilde{R}_{k_1k_2}(T)=R\left[\sum_{j=1}^n\tilde{A}_j\phi_{j,k_2}e^{(-\zeta_j\omega_{n,j}+i\omega_{d,j})(k_2-k_1)T_{sa}+(-\zeta_j\omega_{n,j}+i\omega_{d,j})T}\right] \tag{75}$$

The above provides complete derivation of a cross-correlation function between two lifted w measured on a rotating structure with a constant speed under white-noise excitation at a fixed position of the structure. By using EQN. 48 and following the above derivation, cross-correlation functions of the rotating structure under multiple white-noise excitations at multiple fixed positions of the structure can be obtained, which have the same form as that of EQN. 75.

By applying a standard OMA algorithm such as the PolyMAX algorithm to power spectra associated with cross-correlation functions, $\omega_{d,j}$, $\zeta_j$, and $\tilde{A}_j\phi_{j,k_2}e^{(-\zeta_j\omega_{n,j}+i\omega_{d,j})(k_2-k_1)T_{sa}}$ in EQN. 75 can be estimated, the first two of which are the j-th damped natural frequency and modal damping ratio of the rotating structure, respectively, and $\phi_{j,k_2}$ in the third of which is the j-th undamped mode shape the rotating structure. The additional term $e^{(-\zeta_j\omega_{n,j}+i\omega_{d,j})(k_2-k_1)T_{sa}}$ in the expression $\tilde{A}_j\phi_{j,k_2}e^{(-\zeta_j\omega_{n,j}+i\omega_{d,j})(k_2-k_1)T_{sa}}$ can be eliminated to obtain $\phi_{j,k_2}$ with a scaling factor $\tilde{A}_j$ by multiplying the expression by $e^{-(-\zeta_j\omega_{n,j}+i\omega_{d,j})(k_2-k_1)T_{sa}}$ since $\omega_{d,j}$ and $\zeta_j$ have been estimated and $(k_2-k_1)T_{sa}$ is known. Modal parameters of the rotating structure estimated are not affected by whether the structure is excited at one or multiple points, as long as the reference and measurement points and at least one excitation point are not nodal points of a mode of the structure of interest. ODSs of a rotating structure with a constant or time-varying speed can be estimated by analyzing correlation functions in EQN. 64 using, for example, the ODS module in the LMS Test.Lab software.

The present disclosure provides a modal analysis method comprising: measuring a response of a rotating structure subject to random excitation with a system; interpolate positions of the response on a grid to generate a plurality of interpolated positions; rectifying the plurality of interpolated positions to create a plurality of rectified interpolated positions; identifying a plurality of zero-crossings from the plurality of rectified interpolated positions; determine a portion of the plurality of zero-crossings with a time increment; and interpolate and lift measurements at the portion of the plurality of zero-crossings.

In some embodiments, rectifying the plurality of interpolated positions includes determining negative absolute values of differences between the plurality of interpolated positions and a position of a virtual measurement point on a scan path.

In some embodiments, the time increment is equal to the inverse of a scan frequency.

In some embodiments, the system is a TCSLDV system.

In some embodiments, the system includes a camera and the method includes capturing images of the rotating structure.

In some embodiments, the method further includes determining a damped natural frequency, a damping ratio, and/or an undamped mode shape of the rotating structure.

In some embodiments, the rotating structure is a wind turbine blade.

4. TWO-DIMENSIONAL SCAN SCHEME

Figures 5, 6:
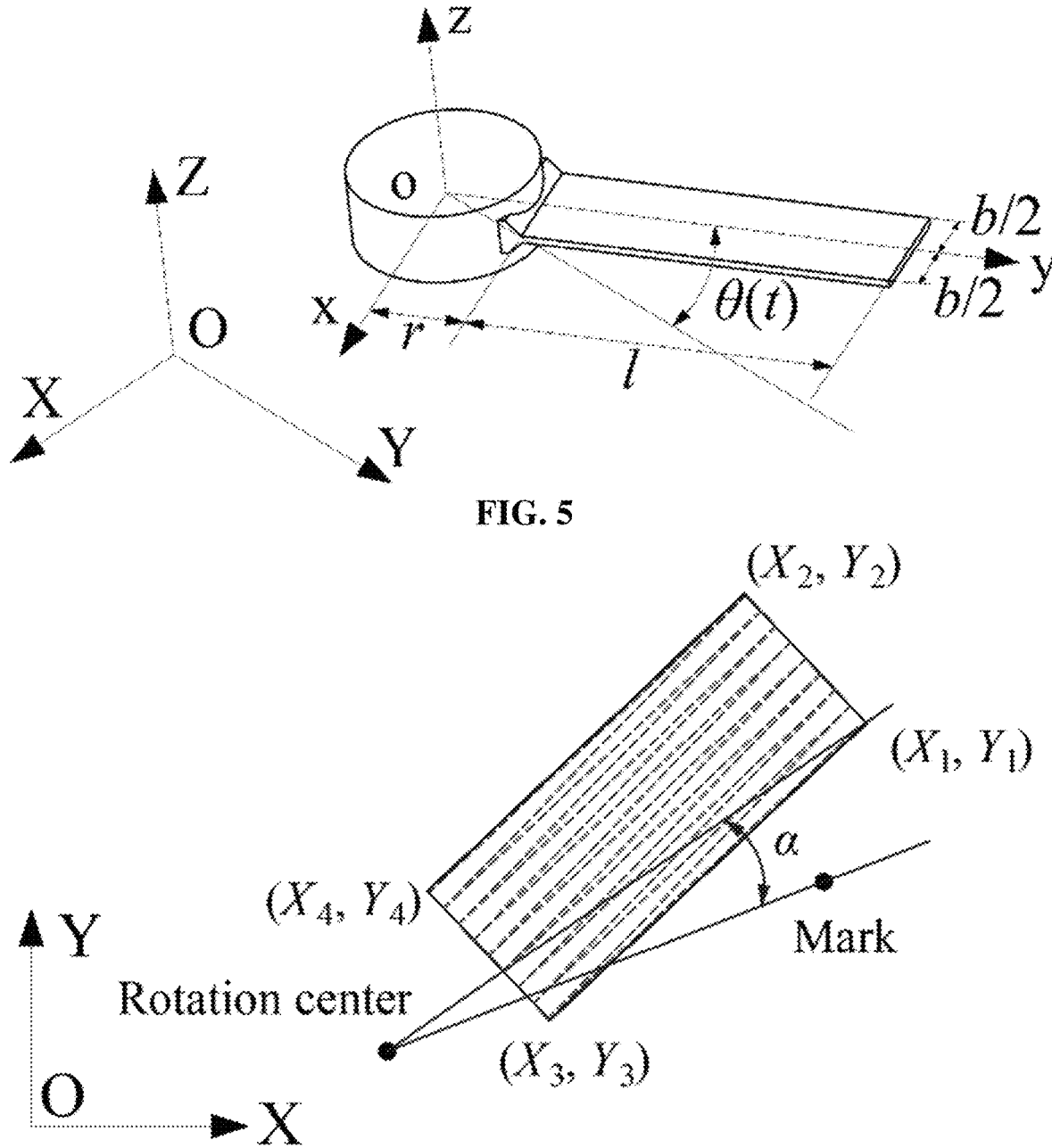
FIG. 5 is a schematic of a nonuniform rotating plate.
FIG. 6 is a schematic of a zigzag scan path on a rotating plate.

Rotating Plate Model: A nonuniform rectangular rotating plate model is used to describe a rotating fan blade. The rotating plate that rotates about the z-axis has a length of l and width of b (FIG. 5). The plate is attached to a rigid hub. The inertial coordinate system O-XYZ whose origin O is at corners of pictures captured by the camera in the tracking CSLDV system and the rotating coordinate system o-xyz whose origin o is at the rotation center of the plate are used to describe the motion of the rotating plate. The distance between o and the fixed end of the rotating plate is r. Note that Z- and z-axes are parallel to each other. The angle between Y- and y-axes that is used to describe the angular position of the plate is $\theta(t)$, where t is time. By using the extended Hamilton's principle and only considering the vibration along the z-direction, the governing equation and associated boundary conditions of the nonuniform rotating plate in FIG. 5 subjected to a distributed random force f(x, y, t) along the z-direction can be derived as $$\rho(x, y)u_{tt} + \nabla^2\left[D(x, y)\nabla^2 u\right] + C(u_t) - \dot{\theta}^2(t)\left[u_{xx}\int_x^{r+l}\rho(p, y)pdp - \right.$$ (76)

$$\left. \rho(x, y)xu_x + u_{yy}\int_y^{\pm b/2}\rho(x, p)pdp - \rho(x, y)yu_y\right] =$$

24

-continued
$$f(x, y, t), -b/2 \le x \le b/2, r \le y \le r + l, t > 0,$$

$$u \mid y = r = 0, u_x \mid y = r = 0, u_{xx} + vu_{yy} \mid y = r + l = 0,$$ (77)

$$u_{xxx} + u_{xyy} \mid y = r + l = 0, u_{xy} \mid y = r + l = 0,$$

$$u_{yy} + vu_{xx} \mid x = \pm b/2 = 0,$$

$$u_{yyy} + u_{xxy} \mid x = \pm b/2 = 0, u_{xy} \mid x = \pm b/2 = 0,$$

where x and y are spatial positions along x- and y-directions, u is the plate displacement along the z-direction at the point (x, y) and time t, D(x, y) and v are the flexural rigidity and Poisson's ratio of the plate at (x, y), respectively, a subscript and an overdot denote partial differentiation with respect to x and t, respectively, $\rho(x, y)$ is the mass per unit area of the rotating plate at (x, y), C is the spatial damping operator, and $\nabla$ is the del operator.

The solution to the governing equation of the nonuniform rotating plate subject to a concentrated random force that is applied at the point $(x_a, y_a)$ is derived in Example 4 as $$u = \sum_{i=1}^{\infty}\phi_i(x, y)\phi_i(x_a, y_a)\int_0^t f_a(t-\tau)(1/\omega_{d,i})e^{-\zeta_i\omega_i\tau}\sin(\omega_{d,i}\tau)d\tau,$$ (78)

where $\phi_i(x, y)$ is the i-th full-field mode shape of the corresponding undamped rotating plate, and $\omega_i$, $\zeta_i$ and $\omega_{d,i}=\omega_i\sqrt{1-\zeta_i^2}$ are the i-th undamped natural frequency, modal damping ratio, and damped natural frequency of the plate, respectively.

Two-Dimensional (2D) Scan Scheme: A 2D zigzag scan path is generated on the surface of the rotating plate. Let coordinates of four corners of the plate be $(X_1, Y_1)$, $(X_2, Y_2)$, $(X_3, Y_3)$ and $(X_4, Y_4)$, and the scan path that is shown as dash lines in FIG. 6 starts from $(X_1, Y_1)$ and ends at $(X_4, Y_4)$. The scan path consists of multiple connected scan lines. The laser spot of the tracking CSLDV system is swept by an odd number of times on each scan line, and then start to be swept on the next scan line from the connection point of the scanned scan line and next scan line.

Since the plate rotates, coordinates of the four corners of the plate change with time. To generate a scan path on the rotating plate, coordinates of the corners need to be determined. A mark is attached somewhere outside the rotating plate to determine positions of the four corners. Let coordinates of the mark and rotation center be $(X_m, Y_m)$ and $(X_0, Y_0)$, respectively; the position of one corner of the rotating plate can be calculated by $$\begin{cases} X_1 = X_0 + s_1/s_m[(X_m - X_0)\cos(\alpha) - (Y_m - Y_0)\sin(\alpha)] \\ Y_1 = Y_0 + s_1/s_m[(Y_m - Y_0)\cos(\alpha) + (X_m - X_0)\sin(\alpha)] \end{cases},$$ (79)

where $\alpha$ is the angle between the line passing through $(X_0, Y_0)$ and $(X_m, Y_m)$ and that passing through $(X_0, Y_0)$ and $(X_1, Y_1)$, and $s_1$ and $s_m$ are constant distances between $(X_0, Y_0)$ and $(X_1, Y_1)$ and between $(X_0, Y_0)$ and $(X_m, Y_m)$, respectively. Note that $\alpha$ in EQN. 79 is a constant since the relative position between the mark and plate is fixed. Positions of other three corners can be similarly determined. Let the number of scan lines be N; positions of end points of the i-th scan line $(X_i^1, Y_i^1)$ and $(X_i^2, Y_i^2)$ can be calculated by $$\begin{cases} X_i^1 = X_2 + \dfrac{2(X_1 - X_2)}{N-1}\left(\dfrac{N-i}{2}\right) \\ Y_i^1 = Y_2 + \dfrac{2(Y_1 - Y_2)}{N-1}\left(\dfrac{N-i}{2}\right) \end{cases}, \qquad (80)$$

$$\begin{cases} X_i^2 = X_4 + \dfrac{2(X_3 - X_4)}{N-1}\left(\dfrac{N-i}{2}\right) \\ Y_i^2 = Y_4 + \dfrac{2(Y_3 - Y_4)}{N-1}\left(\dfrac{N-i}{2}\right) \end{cases}, \qquad (81)$$

when i is an odd number, $$\begin{cases} X_i^1 = X_2 + \dfrac{2(X_1 - X_2)}{N-1}\left(\dfrac{N-i-1}{2}\right) \\ Y_i^1 = Y_2 + \dfrac{2(Y_1 - Y_2)}{N-1}\left(\dfrac{N-i-1}{2}\right) \end{cases}, \qquad (82)$$

$$\begin{cases} X_i^2 = X_4 + \dfrac{2(X_3 - X_4)}{N-1}\left(\dfrac{N-i-1}{2}\right) \\ Y_i^2 = Y_4 + \dfrac{2(Y_3 - Y_4)}{N-1}\left(\dfrac{N-i-1}{2}\right) \end{cases}, \qquad (83)$$

when i is an even number. Once positions of the two end points of the i-th scan line are determined, the laser spot can be swept between the two end points. This scheme can be applied to any quadrilateral rotating plate.

When the tracking CSLDV system is used to scan a rotating plate, feedback signals of X- and Y-mirrors of the scanner in the system can be used as X and Y positions of the laser spot. The method for processing mirror signals disclosed herein is used to process feedback signals of X and Y mirrors and processed mirror signals can be used to obtain mode shapes of the rotating plate. At any time instant, the distance between the laser spot and rotation center $d_s(t)$ is $$d_s(t) = \sqrt{(X_s(t) - X_0)^2 + (Y_s(t) - Y_0)^2}, \qquad (84)$$

where $X_s(t)$ and $Y_s(t)$ are X and Y positions of the laser spot at time t, respectively. One can just use $d_s(t)$ to describe the position of the laser spot on scan lines. The real time rotation speed of the plate R can also be obtained by $$R = \frac{30\gamma}{\pi(t_2 - t_1)}, \qquad (85)$$

where $t_1$ and $t_2$ are two neighboring time instants when the tracking CSLDV system measures the surface velocity of the rotating plate, and $$\gamma = a\cos \qquad (86)$$

$$\left( \frac{(X_s(t_1) - X_0)(X_s(t_2) - X_0) + (Y_s(t_1) - Y_0)(Y_s(t_2) - Y_0)}{\sqrt{\left[(X_s(t_1) - X_0)^2 + (Y_s(t_1) - Y_0)^2\right]\left[(X_s(t_2) - X_0)^2 + (Y_s(t_2) - Y_0)^2\right]}} \right).$$

Improved 2D Demodulation Method: The time-varying 2D zigzag scan path is generated on the rotating plate based on the above scheme, and the tracking CSLDV system measures u by sweeping its laser spot along the zigzag scan path and registering discrete measurements of u. The solution to the governing equation of the rotating plate subject to a concentrated random force in EQN. 78 can be used as the measured response of the rotating plate using the 2D scan scheme. Note that when there are multiple random excitation forces applied on the rotating plate, the solution to its governing equation has the same form as that in EQN. 78. One can process the measured response from each scan line to estimate undamped mode shapes of the rotating plate on scan lines and combine mode shapes into an undamped full-field mode shape. Let $x = x_j$ be the x position of the j-th scan line; applying integration by part to EQN. 78 yields $$u(x_j, y, t) = \qquad (87)$$

$$\sum_{i=1}^{\infty} \phi_i(x_j, y)\phi_i(x_a, y_a)\left[A_i(t)\cos(\omega_{d,i}t) + B_i(t)\sin(\omega_{d,i}t)_{+C^i}(t)\right],$$

where $$A_i(t) = -\frac{\omega_{d,i}e^{-\zeta_i\omega_i t}f_a(0)}{\omega_{d,i}\omega_i^2}, \qquad (88)$$

$$B_i(t) = -\frac{\zeta_i\omega_i e^{-\zeta_i\omega_i t}f_a(0)}{\omega_{d,i}\omega_i^2}, \qquad (89)$$

$$C_i(t) = \frac{f_a(t)}{\omega_i^2} + \int_0^t \frac{e^{-\zeta_i\omega_i t}f_a'(t-\tau)}{\omega_{d,i}\omega_i^2}[\zeta_i\omega_i\sin(\omega_{d,i}\tau) + \omega_{d,i}\cos(\omega_{d,i}\tau)]d\tau. \qquad (90)$$

Applying a bandpass filter that filters all damped natural frequencies of the rotating plate except the i-th damped natural frequency $\omega_{d,i}$ to EQN. 87, the measured response becomes $$u_i(x_j, y, t) = \qquad (91)$$

$$\Phi_i(x_j, y)\cos(\omega_{d,i}t - \beta) = \Phi_{I,i}(x_j, y)\cos(\omega_{d,i}t) + \Phi_{Q,i}(x_j, y)\sin(\omega_{d,i}t),$$

where $\Phi_i(x_j, y) = H_i\phi_i(x, y)$, in which $H_i$ is a scalar factor, $\beta$ is a phase variable, $\Phi_{I,i}(x_j, y) = \Phi_i(x_j, y)\cos(\beta)$, and $\Phi_{Q,i}(x_j, y) = \Phi_i(x_j, y)\sin(\beta)$. EQN. 91 is multiplied by $\cos(\omega_{d,i}t)$ and $\sin(\omega_{d,i}t)$ to calculate $\Phi_{I,i}(x_j, y)$ and $\Phi_{Q,i}(x_j, y)$, respectively to yield $$u_i(x_j, y, t)\cos(\omega_{d,i}t) = \qquad (92)$$

$$\Phi_{I,i}(x_j, y)\cos^2(\omega_{d,i}t) + \Phi_{Q,i}(x_j, y)\sin(\omega_{d,i}t)\cos(\omega_{d,i}t) =$$

$$\frac{1}{2}\Phi_{I,i}(x_j, y) + \frac{1}{2}\Phi_{I,i}(x_j, y)\cos(2\omega_{d,i}t) + \frac{1}{2}\Phi_{Q,i}(x_j, y)\sin(2\omega_{d,i}t),$$

$$u_i(x_j, y, t)\sin(\omega_{d,i}t) = \qquad (93)$$

$$\Phi_{I,i}(x_j, y)\sin(\omega_{d,i}t)\cos(\omega_{d,i}t) + \Phi_{Q,i}(x_j, y)\sin^2(\omega_{d,i}t) =$$

$$\frac{1}{2}\Phi_{Q,i}(x_j, y) + \frac{1}{2}\Phi_{I,i}(x_j, y)\sin(2\omega_{d,i}t) - \frac{1}{2}\Phi_{Q,i}(x_j, y)\cos(2\omega_{d,i}t).$$

A low-pass filter can be applied to $u_i(x_j, y, t)\cos(\omega_{d,i}t)$ and $u_i(x_j, y, t)\sin(\omega_{d,i}t)$ to eliminate four terms $\frac{1}{2}\Phi_{I,i}(x_j, y)\cos(2\omega_{d,i}t)$, $\frac{1}{2}\Phi_{Q,i}(x_j, y)\sin(2\omega_{d,i}t)$, $\frac{1}{2}\Phi_{I,i}(x_j, y)\sin(2\omega_{d,i}t)$ and $-\frac{1}{2}\Phi_{Q,i}(x_j, y)\cos(2\omega_{d,i}t)$ in EQN. 92 and EQN. 93 and obtain $\Phi_{I,i}(x_j, y)$ and $\Phi_{Q,i}(x_j, y)$. One can determine $\Phi_i(x_j, y)$ by using the relation in EQN. 91 and normalize $\Phi_i(x_j, y)$ by dividing it by its maximum value. Note that one calculates a mode shape of the rotating plate on a scan line that is along its length direction. The improved demodulation method can be applied to the measured response from a scan line at any position on the plate to estimate the mode shape on the scan line.

Once undamped mode shapes on all scan lines are obtained, one can scan the rotating plate along a scan line in the x-direction to obtain an undamped mode shape $\phi_i(x, y')$, where $y'$ is any position except positions of nodal points of the i-th undamped mode shape. The undamped mode shape in the x-direction can be used to combine undamped mode shapes on all scan lines in the y-direction into an undamped full-field mode shape of the rotating plate.

The present disclosure provides a modal analysis method comprising measuring a response of a rotating structure subject to random excitation with a system; determining a Fast Fourier Transform (FFT) of the response; applying a bandpass filter to the response with a passband that includes a damped natural frequency of the rotating structure to create a filtered response; and determining a time interval between a minimum value and a maximum value of the filtered response. The method further includes multiplying the filtered response in the time interval by sinusoidal signals to create a plurality of processed responses; and applying a lowpass filter to the plurality of processed responses to obtain an end-to-end undamped mode shape of the rotating structure (e.g., in-plane and quadrature components of an end-to-end undamped mode shape).

In some embodiments, the sinusoidal signals include $\cos(\omega_{d,i}t)$ and $\sin(\omega_{d,i}t)$, where $\omega_{d,i}$ is the damped natural frequency of the rotating structure.

In some embodiments, the system is a TCSLDV system.

In some embodiments, the rotating structure is rotating at a non-constant speed.

In some embodiments, the time interval is measured by the system from a first end of a scan path to a second end.

In some embodiments, the method further includes determining an end-to-end undamped mode shape of the structure.

In some embodiments, the method further includes determining a first normalized end-to-end undamped mode shapes of the rotating structure.

In some embodiments, the method further includes determining a second normalized end-to-end undamped mode shape and/or a third normalized end-to-end undamped mode shape of the rotating structure.

In some embodiment, the method further includes determining a first damped natural frequency of the rotating structure.

In some embodiments, the method further includes determining a second damped natural frequency and/or a third damped natural frequency of the rotating structure.

In some embodiments, measuring the response of the rotating structure includes identifying a mark on the rotating structure.

In some embodiments, measuring includes scanning along a two-dimensional path on the rotating structure.

In some embodiments, the rotating structure is a wind turbine blade.

5. METHODS AND SYSTEMS

The systems and methods described herein can be implemented in hardware, software, firmware, or combinations of hardware, software and/or firmware. In some examples, the systems and methods described in this specification may be implemented using a non-transitory computer readable medium storing computer executable instructions that when executed by one or more processors of a computer cause the computer to perform operations. Computer readable media suitable for implementing the systems and methods described in this specification include non-transitory computer-readable media, such as disk memory devices, chip memory devices, programmable logic devices, random access memory (RAM), read only memory (ROM), optical read/write memory, cache memory, magnetic read/write memory, flash memory, and application-specific integrated circuits. In addition, a computer readable medium that implements a system or method described in this specification may be located on a single device or computing platform or may be distributed across multiple devices or computing platforms.

As used herein, the term "computers" includes a plurality of electrical and electronic components that provide power, operational control, and protection to the components and modules within the computers and/or the system. For example, a processing computer includes, among other things, a processing unit (e.g., a microprocessor, a microcontroller, or other suitable programmable device), and is implemented using a known computer architecture (e.g., a modified Harvard architecture, a von Neumann architecture, etc.).

The memory storage of the computers is a non-transitory computer readable medium and includes, for example, a program storage area and the data storage area. The program storage area and the data storage area can include combinations of different types of memory, such as a ROM, a RAM (e.g., DRAM, SDRAM, etc.), EEPROM, flash memory, a hard disk, a SD card, or other suitable magnetic, optical, physical, or electronic memory devices. The processing unit is connected to the memory and executes software instructions that are capable of being stored in a RAM of the memory (e.g., during execution), a ROM of the memory (e.g., on a generally permanent bases), or another non-transitory computer readable medium such as another memory or a disc. Software included in the implementation of the methods disclosed herein can be stored in the memory. The software includes, for example, firmware, one or more applications, program data, filters, rules, one or more program modules, and other executable instructions. For example, a processing computer is configured to retrieve from the memory and execute, among other things, instructions related to the processes and methods described herein.

In another aspect, a computer program product comprising a computer readable storage medium having program instructions embodied therewith is described, the program instructions executable by a computing device to cause the computing device to: measure a response of a rotating structure subject to random excitation with a system; determine a Fast Fourier Transform (FFT) of the response; and apply a bandpass filter to the response with a passband that includes a damped natural frequency of the rotating structure to create a filtered response. The program instructions further cause the computing device to determine a time interval between a minimum value and a maximum value of the filtered response; multiply the filtered response in the time interval by sinusoidal signals to create a plurality of processed responses; and apply a lowpass filter to the plurality of processed responses to obtain an end-to-end undamped mode shape of the rotating structure (e.g., in-plane and quadrature components of an end-to-end undamped mode shape).

In another aspect, a computer program product comprising a computer readable storage medium having program instructions embodied therewith is described, the program instructions executable by a computing device to cause the computing device to measure a response of a rotating structure subject to random excitation with a system; interpolate positions of the response on a grid to generate a plurality of interpolated positions; and rectify the plurality of interpolated positions to create a plurality of rectified interpolated positions. The program instructions further cause the computing device to identify a plurality of zero-crossings from the plurality of rectified interpolated positions; determine a portion of the plurality of zero-crossings with a time increment; and interpolate and lift measurements at the portion of the plurality of zero-crossings.

One skilled in the art will readily appreciate that the present disclosure is well adapted to carry out the objects and obtain the ends and advantages mentioned, as well as those inherent therein. The present disclosure described herein are presently representative of preferred embodiments, are exemplary, and are not intended as limitations on the scope of the present disclosure. Changes therein and other uses will occur to those skilled in the art which are encompassed within the spirit of the present disclosure as defined by the scope of the claims.

6. EXAMPLES

It will be readily apparent to those skilled in the art that other suitable modifications and adaptations of the methods of the present disclosure described herein are readily applicable and appreciable, and may be made using suitable equivalents without departing from the scope of the present disclosure or the aspects and embodiments disclosed herein. Having now described the present disclosure in detail, the same will be more clearly understood by reference to the following examples, which are merely intended only to illustrate some aspects and embodiments of the disclosure, and should not be viewed as limiting to the scope of the disclosure. The disclosures of all journal references, U.S. patents, and publications referred to herein are hereby incorporated by reference in their entireties.

The present disclosure has multiple aspects, illustrated by the following non-limiting examples.

Example 1

Figure 7A:
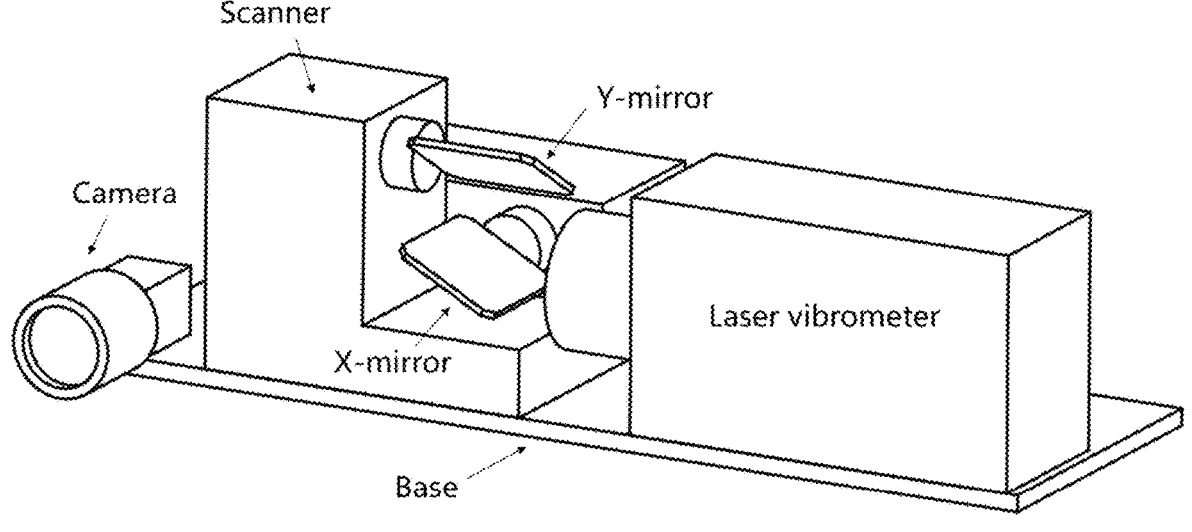
FIG. 7A is a picture of a TCSLDV system for rotating structure vibration measurement.
Figure 7B:
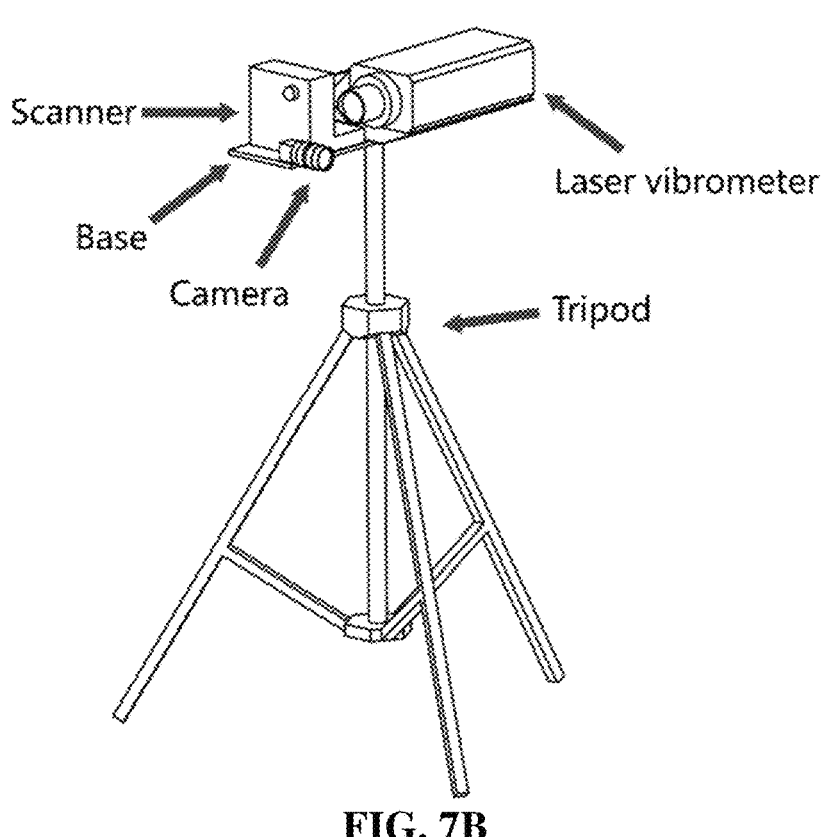
FIG. 7B is a schematic of a TCSLDV system.

Experimental Setup: A TCSLDV system was developed for measuring vibration of a rotating structure and a fan blade with a rotating diameter of 139 cm was used as the rotating structure. In the illustrated embodiment, the TCSLDV system consists of a Polytec OFV-533 laser Doppler vibrometer, a Cambridge 6240H scanner with an NI 9149 controller, and a Basler camera (FIG. 7A). The controller was connected to the scanner to control rotation angles of two orthogonal mirrors of the scanner. Since the laser beam of the vibrometer was reflected by the mirrors, horizontal and vertical positions of the laser spot on the structure can be controlled by changing rotation angles of X- and Y-mirrors, respectively. The vibrometer could measure the surface velocity of a point on the fan blade where the laser spot was located. The vibrometer, scanner and camera were mounted on a tripod (FIG. 7B) whose height is 141.1 cm.

Figures 7C, 8:
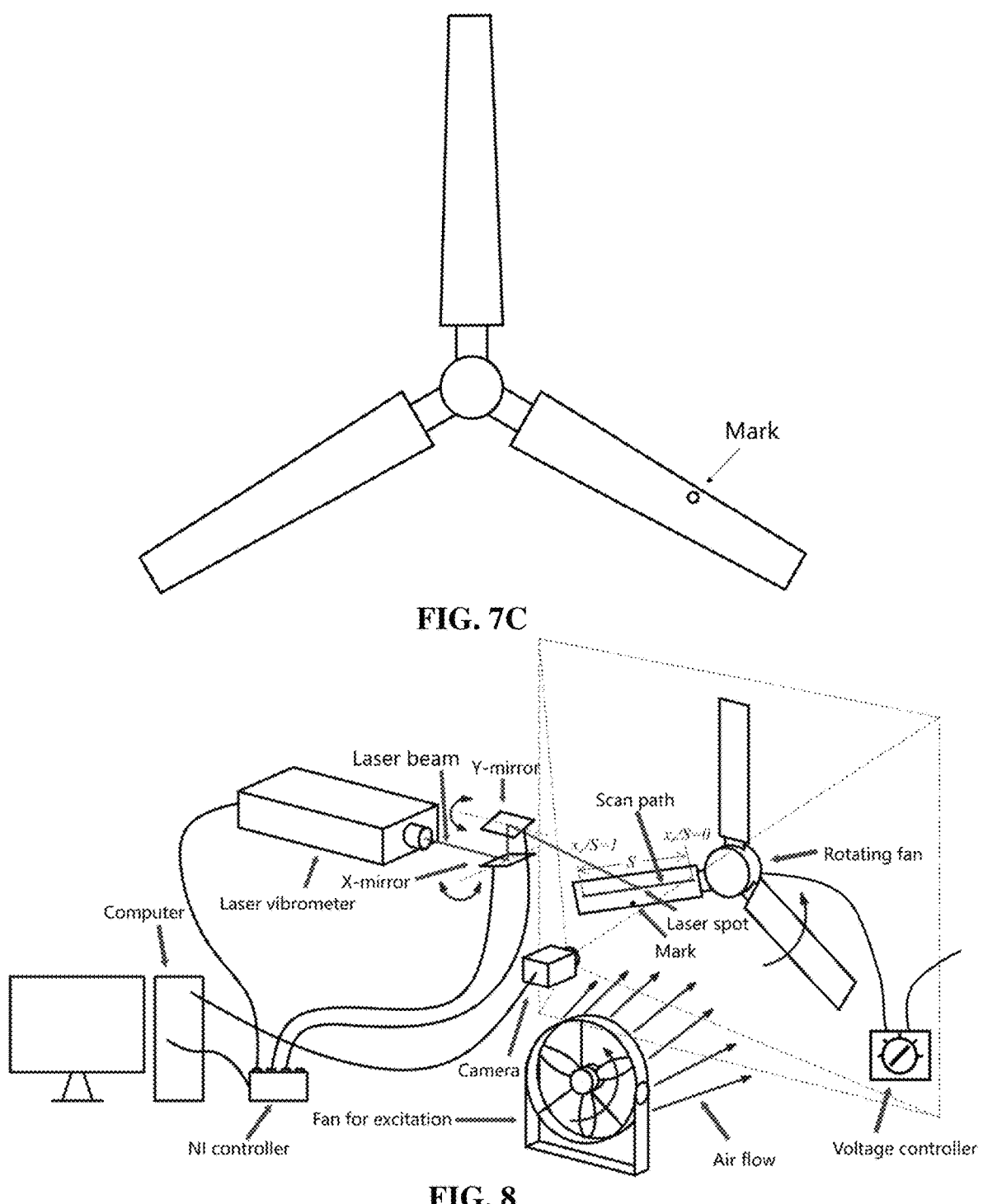
FIG. 7C is a picture of a fan with a blade having a mark that is tracked by the camera.
FIG. 8 illustrates an experimental setup for rotating structure vibration measurement using a TCSLDV system.

A control scheme was designed using the system engineering software LabVIEW so that various scan paths of the laser spot could be created by sending control signals to the scanner. The camera was used to capture images of the rotating fan in FIG. 7C with a frame rate of 25 frames per second. A black circular mark was attached to one blade of the rotating fan so that the TCSLDV system could track the position of the blade by determining the position of the mark. Each time when the camera captured an image of the rotating fan blade, the image was processed by the LabVIEW software to determine the position of the mark on the blade. Images captured were converted to grayscale images by IMAQ Vision in Lab View. Since the surface of the blade was white while the mark was black, locations of the mark could be easily identified in these grayscale images. Since the mark was fixed on the rotating fan blade, the position of the fan blade could be determined as long as the position of the mark was determined. The controller could control the scanner to track the rotating fan blade and sweep its laser spot along it as the camera continuously captured its images (FIG. 8). Each time when the TCSLDV system determined the position of the mark, it could sweep the laser spot on the scan path that was determined by the position of the mark. Since the rotating fan was sufficiently far away from the TCSLDV system and rotation angles of X- and Y-mirrors were sufficiently small, horizontal and vertical positions of the laser spot could be considered to be linearly related to rotation angles of X- and Y-mirrors, respectively. Feedback signals of the scanner that were registered in the form of voltage were used to indicate rotation angles of X- and Y-mirrors.

Experiments were conducted to estimate modal parameters of the rotating fan blade using the OMA method described herein (e.g., the improved demodulation method). Since the random wind load perpendicular to the fan blade surface was small in the experiments when the fan rotated, a small fan whose diameter is 30.48 cm was used to provide more random excitation on the blade surface (FIG. 8). The rotating fan was vertically mounted on an aluminum frame and the frame and wall behind the fan were covered with a black cloth to facilitate image processing. The height of the rotation center of the fan was 122.3 cm, the distance between the TCSLDV system and the fan to be scanned was 174.6 cm, and the distance between the fan for excitation and that to be scanned was 94.6 cm. A voltage controller was connected to the rotating fan to adjust its constant rotation speeds. A strip of a reflective tape was attached to the surface of the rotating fan blade to enhance the signal-to-noise ratio of TCSLDV measurement. The scan path ranged from $x_d/S=0$ to $x_d/S=1$, as shown in FIG. 8, where $x_d$ is the distance between the laser spot and the end point of the scan path close to the rotation center, and S is the length of the scan path.

Figure 9A:
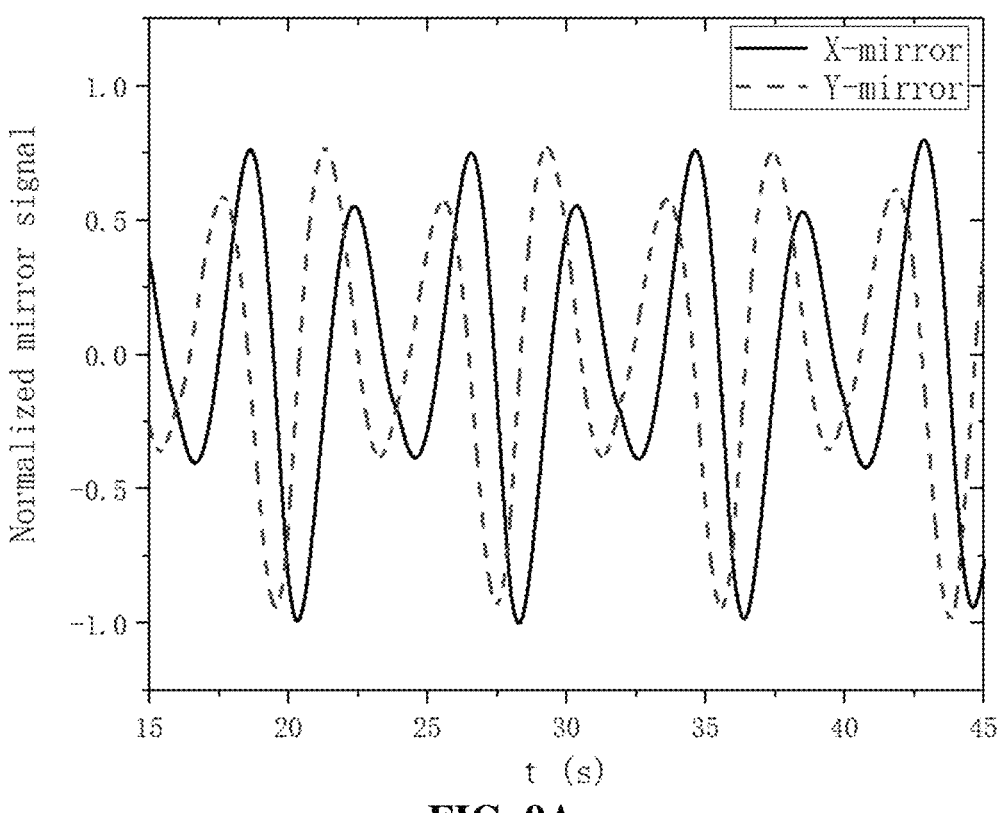
FIG. 9A is a graph of feedback signals from X- and Y-mirrors when R=15.41 rpm.

Operational Model Analysis (OMA) Results: The fan was turned on and rotated with a constant speed. Mirror signals and the measured response of the rotating fan blade are shown in FIG. 9A and FIG. 9B, respectively, with the frame rate of the camera being 25 Hz, $F_{sa}=2500$ Hz, $F_{sc}=0.125$ Hz, and R=15.41 rpm. Note that $F_{sc}=1$ Hz for scanning the rotating fan blade with a non-constant speed, which means that damped natural frequencies and end-to-end undamped mode shapes of the rotating fan blade with a non-constant speed are obtained in a short time duration of 0.5 s. Mirror signals were normalized by dividing their data by their maximum values. Feedback signals of X- and Y-mirrors were processed using the method described herein to combine the two mirror signals to describe the position of the laser spot on the scan path on the rotating fan blade. The processed mirror signal that can be used to represent $x_d/S$ is shown in FIG. 9C.

Figures 10A, 10B:
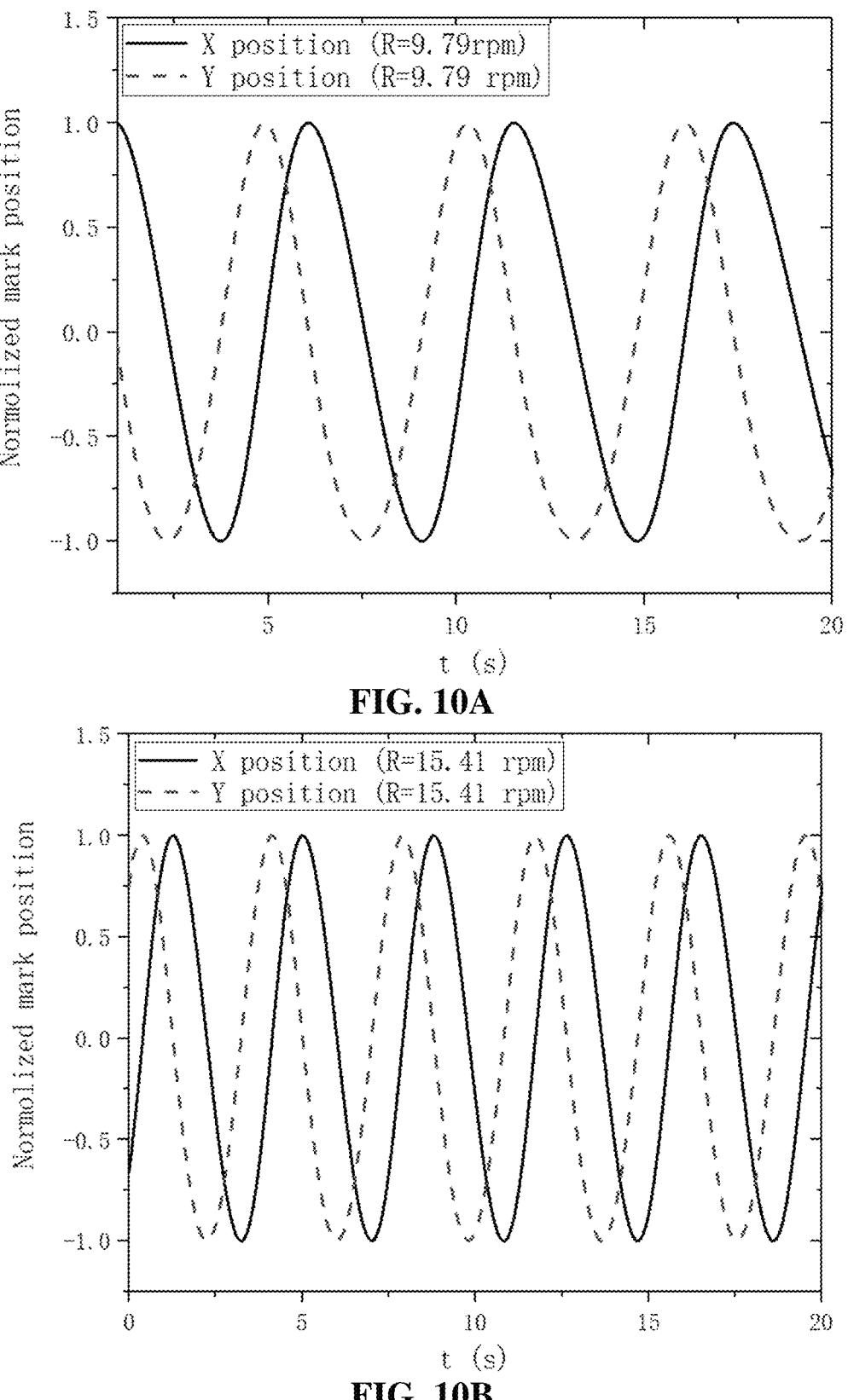
FIG. 10A is graph of the measured mark position when R=9.79 rpm.
FIG. 10B is a graph of the measured mark position when R=15.41 rpm.
Figures 10C, 10D:
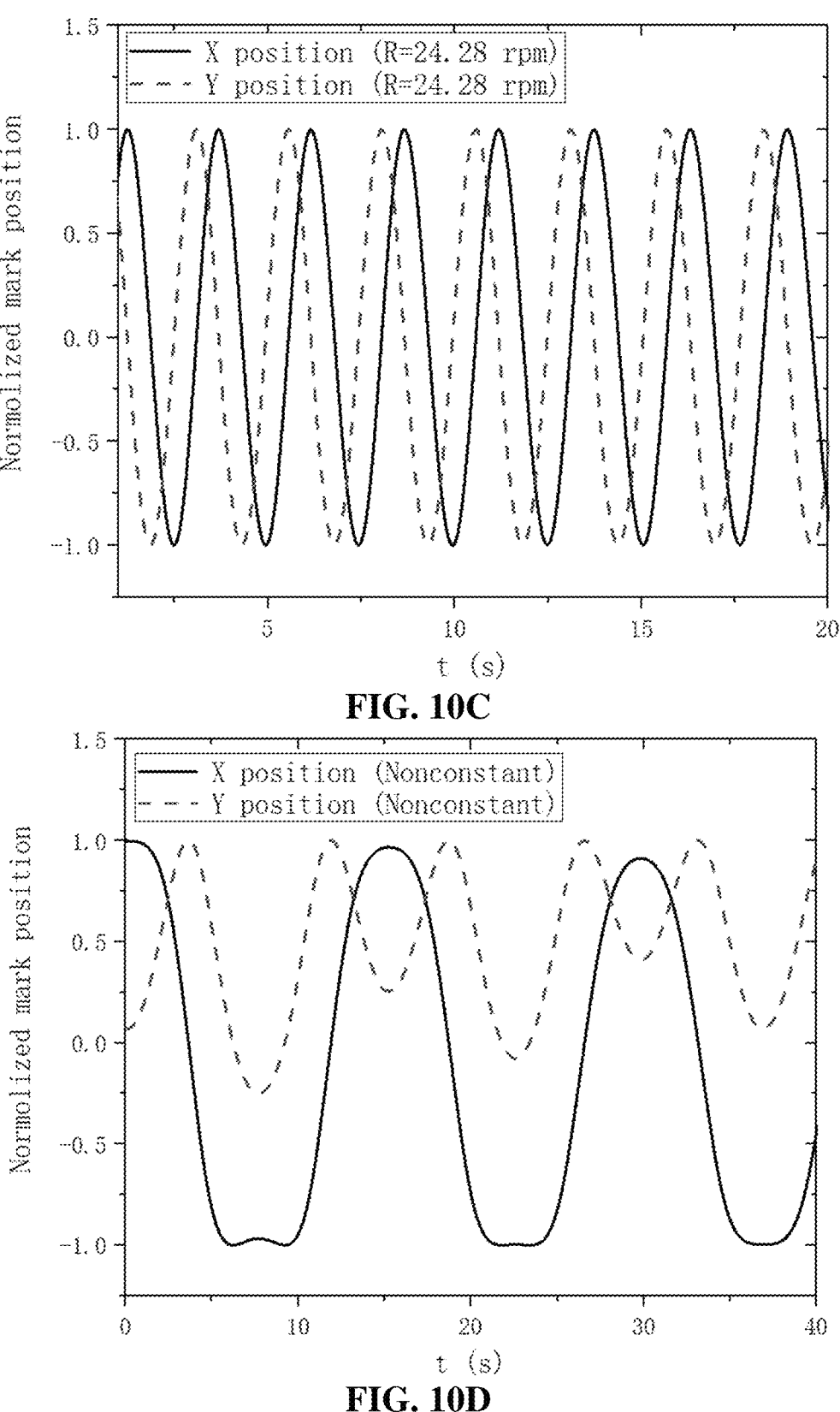
FIG. 10C is a graph of the measured mark position when R=24.28 rpm.
FIG. 10D is a graph of the measured mark position with a non-constant rotation speed.
Figures 10E, 11A:
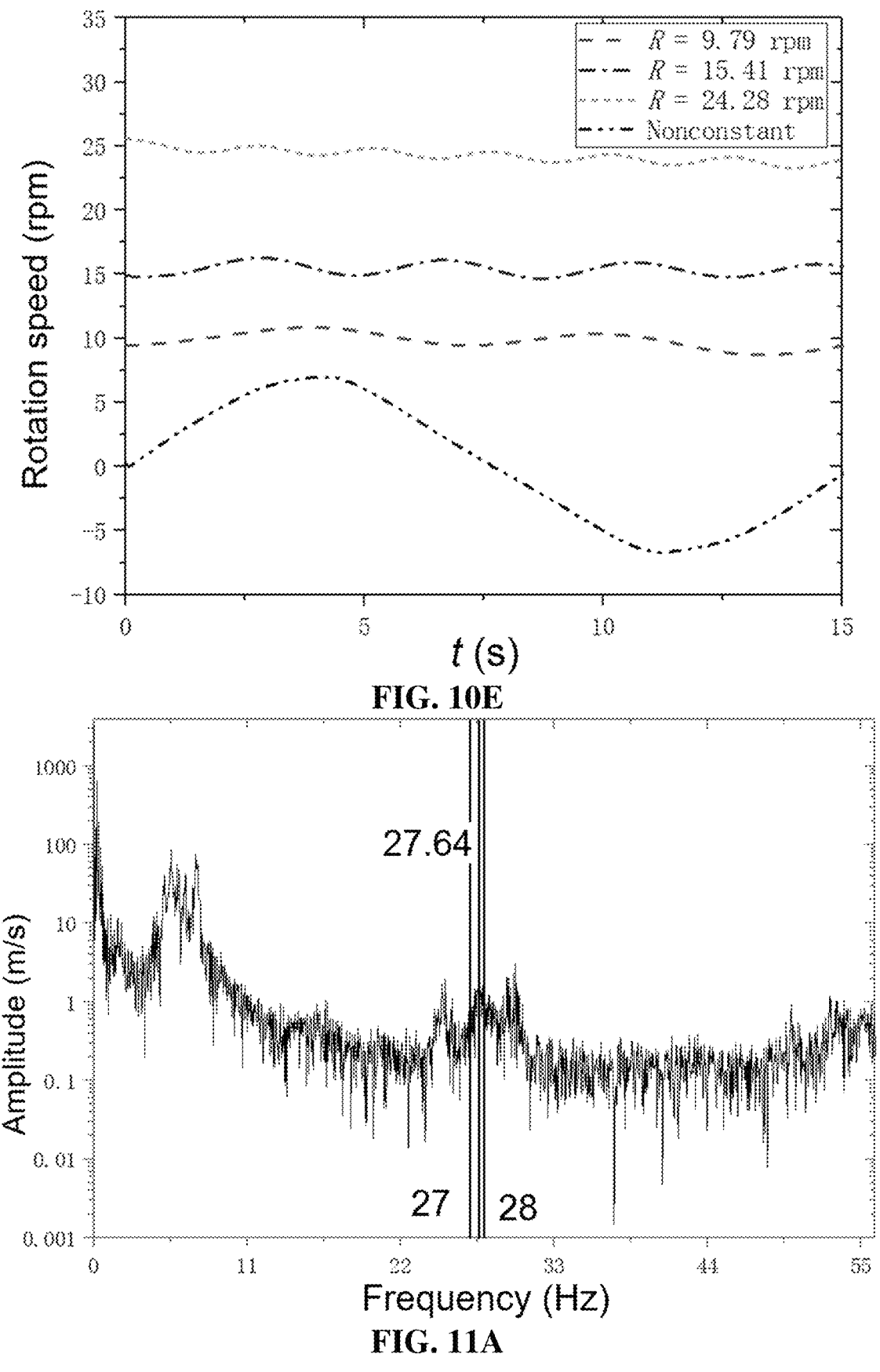
FIG. 10E is a graph of the measured rotation speeds of the fan blade with the constant and non-constant speeds based on the mark positions in FIGS. 10A-10D.
FIG. 11A is a graph of a FFT of the measured response of the rotating fan blade under random excitation when R=15.41 rpm.

The voltage controller prescribed three constant rotation speeds R=9.79 rpm, 15.41 rpm, and 24.28 rpm for the fan. Since there were a mark and a strip of a reflective tape attached to the fan blade, it was a little heavier than the other two blades of the fan and has a downward equilibrium position when the fan was turned off. To study the case with a non-constant rotation speed of the fan blade, it was rotated to an unbalanced position and released from rest with an initial speed; it then started to rotate under the gravity effect and had a non-constant rotation speed. Rotation speed of the fan was determined by processing mark positions in images captured by the camera using EQN. 26 and EQN. 27. The mark positions obtained with different constant rotation speeds and the non-constant rotation speed are shown in FIGS. 10A, 10B, 10C and 10D. Rotation speeds of the fan obtained from mark positions in FIGS. 10A, 10B, 10C and 10D are shown in FIG. 10E. Measured rotation speeds of the fan blade with prescribed constant rotation speeds are basically constant around its prescribed values, but slightly vary with time.

Figures 9B, 9C:
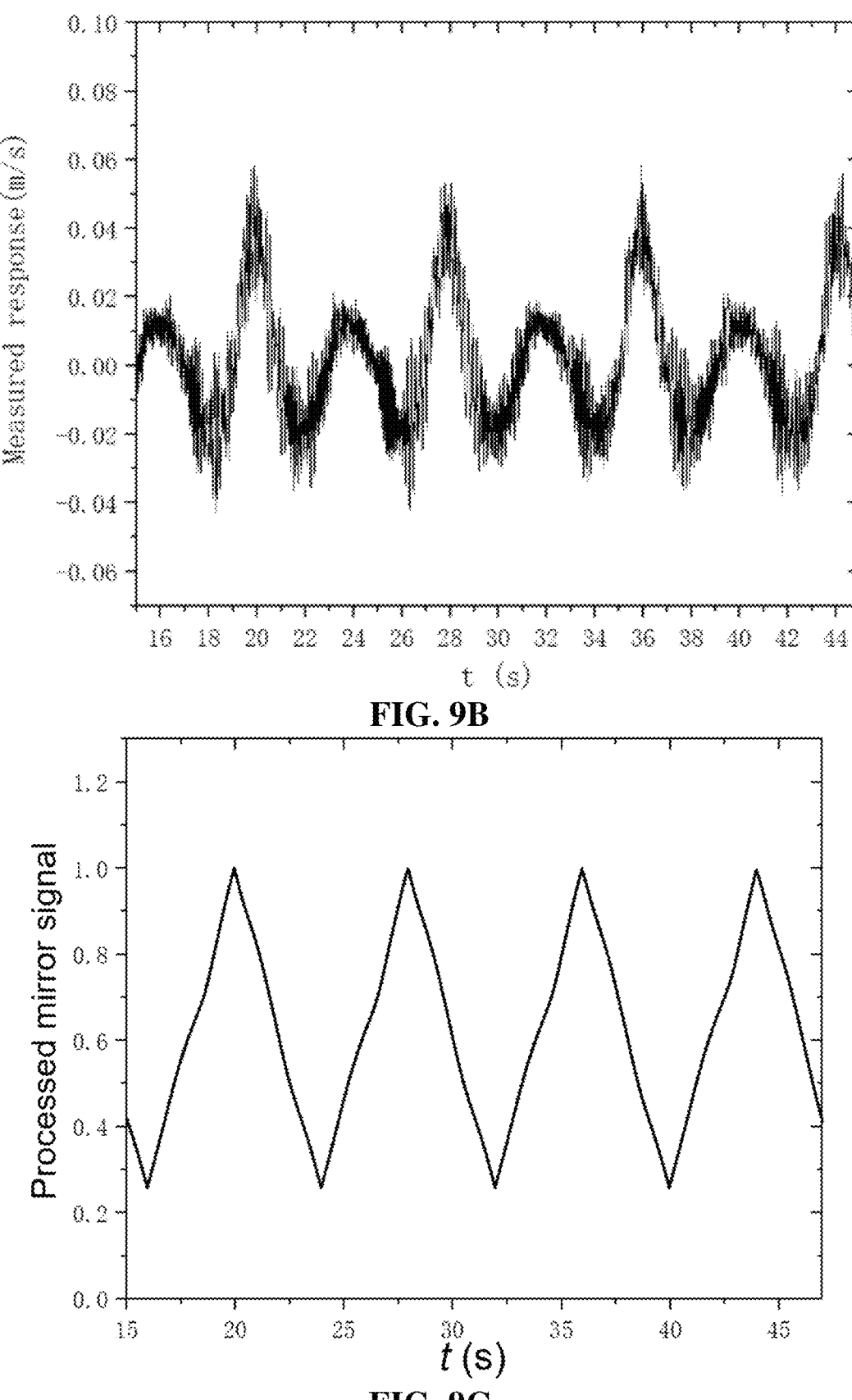
FIG. 9B is a graph of the measured response of the rotating fan blade under random excitation with R=15.41 rpm.
FIG. 9C is a graph of the processed mirror signals with R=15.41 rpm.

The improved demodulation method was applied to the response measured in tests with different rotation speeds and processed mirror signals such as the one shown in FIG. 9C. A detailed description of the improved demodulation method includes: (STEP 1) obtain the FFT of the response of a structure measured by the TCSLDV system; (STEP 2) identify damped natural frequencies of the structure from the FFT in STEP 1; (STEP 3) Apply a bandpass filter whose passband only contains one damped natural frequency of the structure to the measured response; (STEP 4) determine a time interval in the processed mirror signal, where the mirror signal starts at its minimum value and ends at its maximum value; (STEP 5) multiply the filtered measured response in STEP 3 in the time interval determined in STEP 4 by sinusoidal signals $\cos(\omega_{d,i}t)$ and $\sin(\omega_{d,i}t)$, where $\omega_{d,i}$ is the damped natural frequency selected in STEP 3; and (STEP 6) apply a lowpass filter to the two processed responses in STEP 5 to obtain in-plane and quadrature components of the end-to-end undamped mode shape of the structure corresponding to the damped natural frequency $\omega_{d,i}$.

The time interval determined in STEP 3 is for obtaining an end-to-end undamped mode shape of the structure from its measured response. Minimum values of the processed mirror signal mean that the laser spot of the TCSLDV system reaches the end $x_d/S=0$ of the scan path and its maximum values mean that the laser spot of the TCSLDV system reaches the end $x_d/S=1$ of the scan path. The response in this time interval is measured by the TCSLDV system from one end of the scan path to its other end since mirror signals and the measured response are simultaneously recorded by the TCSLDV system. An end-to-end undamped mode shape of the structure can be obtained from the measured response in this time interval.

Figures 11B, 11C:
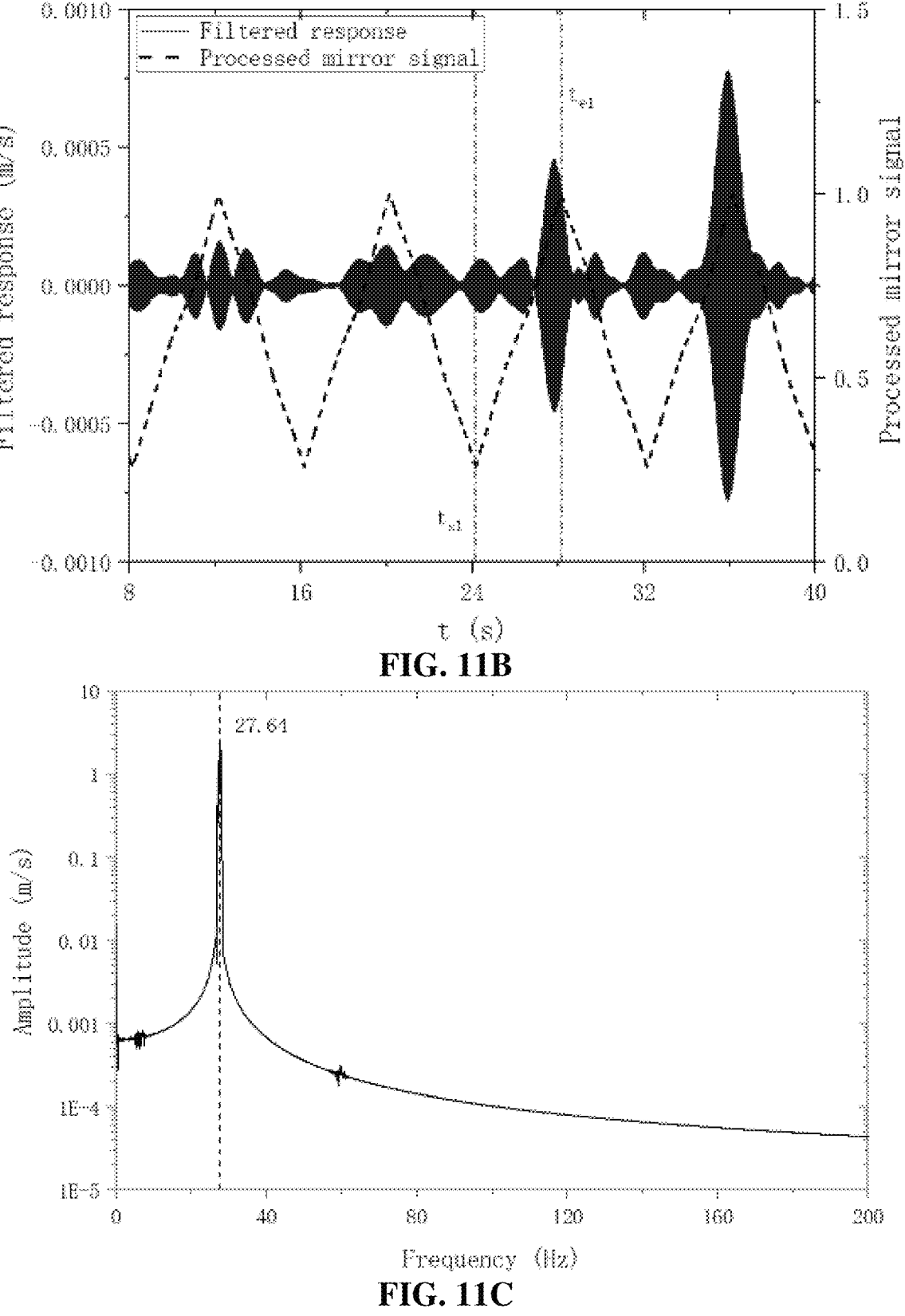
FIG. 11B is a graph of the measured response in FIG. 11A that is filtered by a bandpass filter whose pass band is 27-28 Hz and processed mirror signal.
FIG. 11C is a graph of the FFT of the filtered measured response in FIG. 11A.
Figures 11D, 12A:
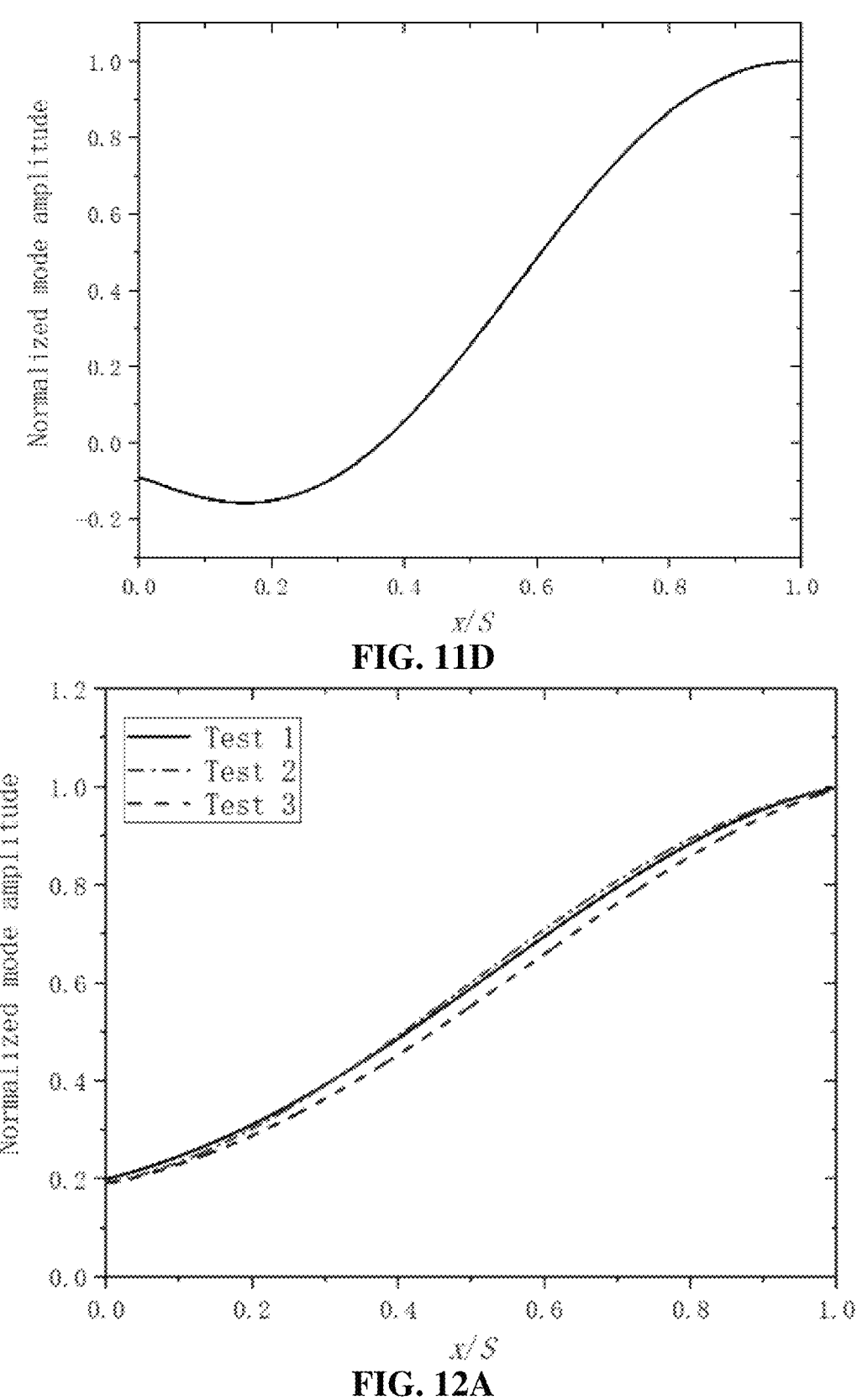
FIG. 11D is a graph of the second normalized mode shape obtained from the filtered measured response and processed mirror signal in FIG. 11B.
FIG. 12A is graph of the first normalized end-to-end undamped mode shape of the stationary fan blade.

The procedure for obtaining the second end-to-end undamped mode shape of the rotating fan blade with R=15.41 rpm is described here as an example. The FFT of the measured response with R=15.41 rpm is shown in FIG. 11A, where two dashed lines at 27 and 28 Hz indicate the passband of the bandpass filter applied to the measured response and the dashed line at 27.64 Hz indicates the second damped natural frequency of the rotating fan blade with the constant speed R=15.41 rpm. One can see that there are some other peaks near the one at 27.64 Hz in FIG. 11A, where the one at 30 Hz corresponds to the second damped natural frequencies of the two other blades of the fan and the one at 25 Hz corresponds to the rotation speed of the small excitation fan (1500 rpm=25 Hz), whose excitation was transmitted to the fan blade via air flow. To determine if a damped natural frequency from the FFT of the measured response corresponds to the rotating fan blade that is scanned by the TCSLDV system, one can only excite the corresponding stationary fan blade and measure its response to estimate its corresponding damped natural frequency. The two measured damped natural frequencies would be close to each other since the rotation speed of the fan blade is small, and one can then be certain that the damped natural frequency from the FFT of the measured response corresponds to the fan blade scanned by the TCSLDV system. If the other peaks near the one at 27.64 Hz in FIG. 11A are very close to 27.64 Hz, one does not need to determine to which blade the peak at 27.64 Hz corresponds. The filtered measured response and processed mirror signal are shown in FIG. 11B, where two dashed lines at $t=t_{s1}$ and $t=t_{e1}$ indicate the time interval selected to obtain the second end-to-end undamped mode shape of the rotating fan blade. The FFT of the filtered measured response in FIG. 11B is shown in FIG. 11C. The second normalized end-to-end undamped mode shape of the rotating fan blade obtained from the filtered measured response and processed mirror signal in the time interval in FIG. 11B is shown in FIG. 11D.

Figures 12B, 12C:
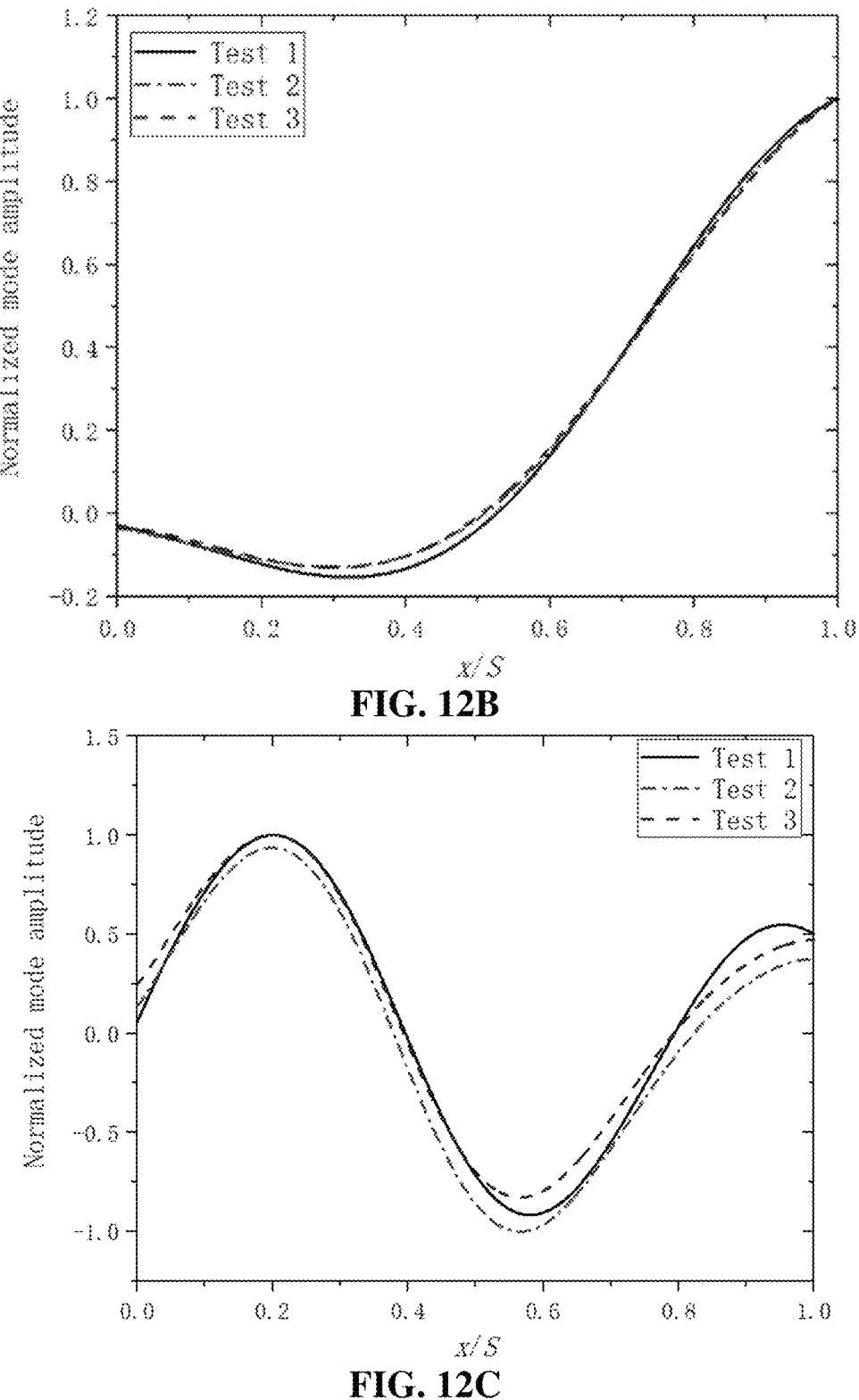
FIG. 12B is a graph of the second normalized end-to-end undamped mode shape of the stationary fan blade.
FIG. 12C is a graph of the third normalized end-to-end undamped mode shape of the stationary fan blade.
Figures 13A, 13B:
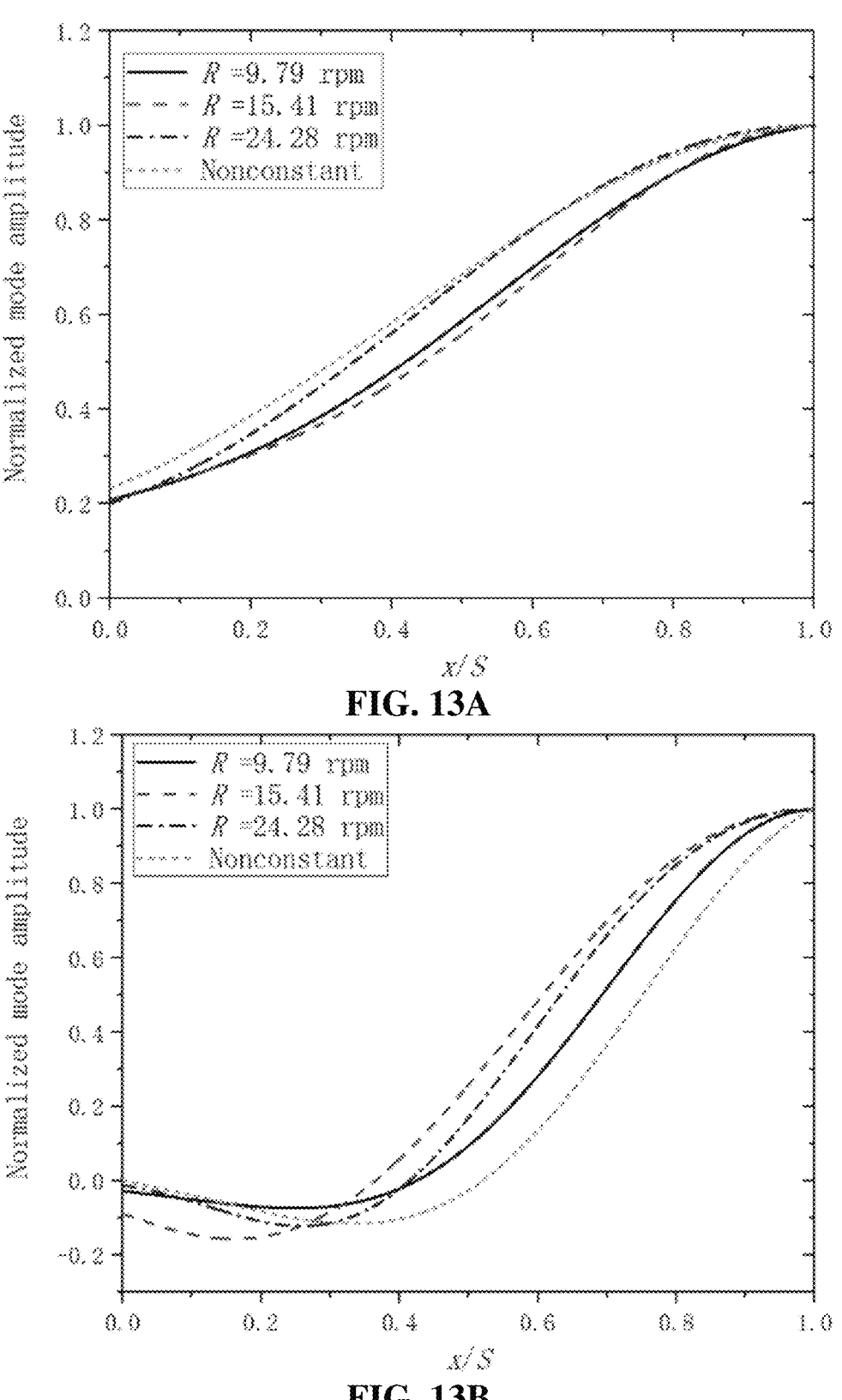
FIG. 13A is a graph of the first normalized end-to-end undamped mode shape of a rotating fan blade with different rotation speeds.
FIG. 13B is a graph of the second normalized end-to-end undamped mode shape of a rotating fan blade with different rotation speeds.
Figures 13C, 14:
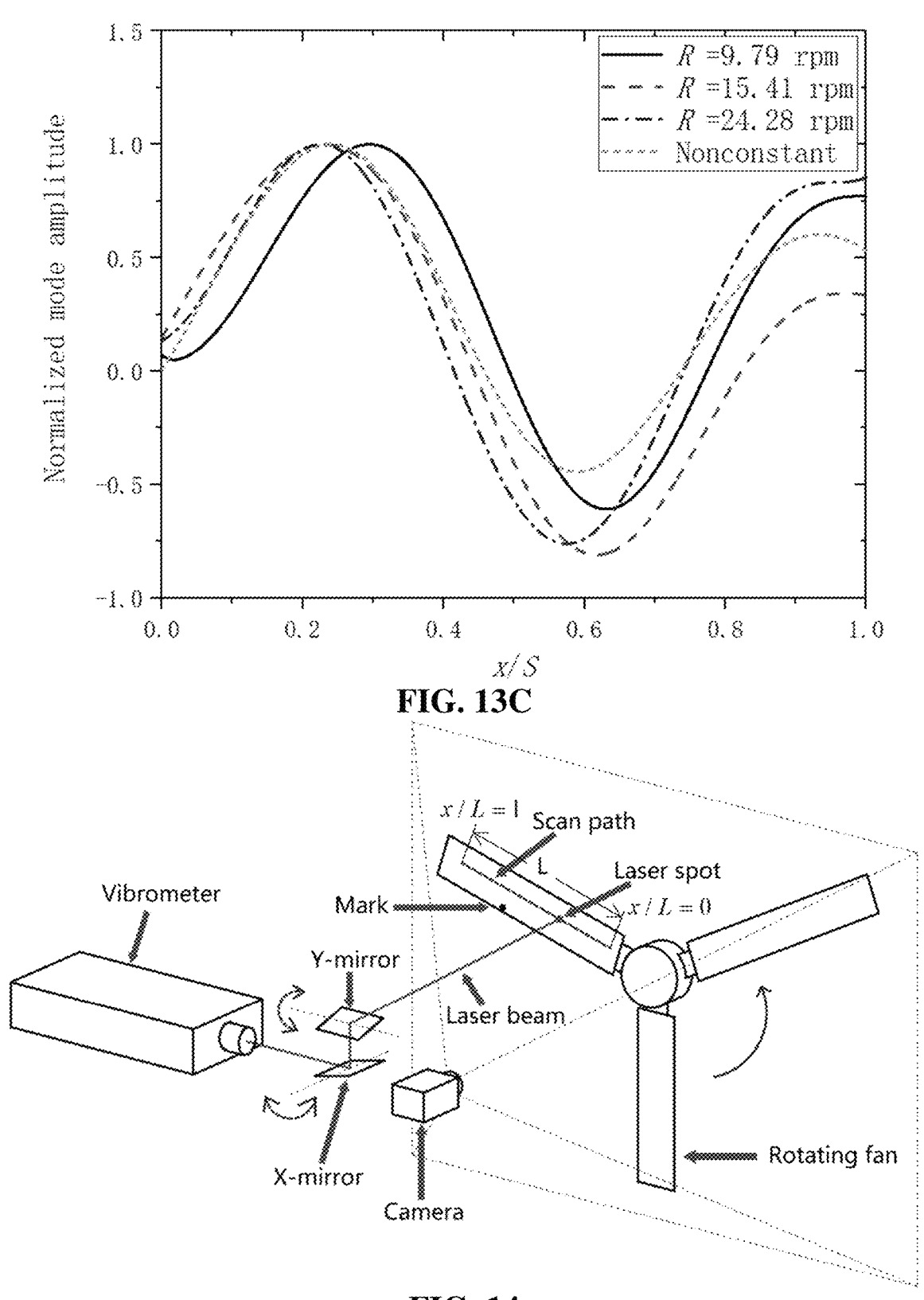
FIG. 13C is a graph of the third normalized end-to-end undamped mode shape of a rotating fan blade with different rotation speeds.
FIG. 14 is a schematic of rotating structure vibration measurement using a TCSLDV system.

The first, second and third damped natural frequencies of the corresponding stationary fan blade obtained in three tests under almost the same testing conditions and their average values and standard derivations are shown in Table 1. The first, second and third normalized end-to-end undamped mode shapes of the stationary fan blade obtained in the three tests are shown in FIGS. 12A, 12B, and 12C, respectively. Note that the fan blade was basically stationary, but slowly swung back and forth a bit about its downward equilibrium position due to fan excitation, and it was scanned by the TCSLDV system. The first, second and third damped natural frequencies of the rotating fan blade with three different constant speeds and the first, second and third damped natural frequencies of the rotating fan blade with a non-constant speed in the short time duration are shown in Table 2. The first, second and third normalized end-to-end undamped mode shapes of the rotating fan blade with the three different constant rotation speeds and the first, second and third normalized end-to-end undamped mode. shapes of the rotating fan blade with the non-constant rotation speed in the short time duration are shown in FIGS. 13A, 13B, and 13C.

TABLE 1

| Damped natural frequencies of the stationary fan blade from three tests under basically the same testing conditions | | | |
|---|---|---|---|
| Test number | First damped natural frequency (Hz) | Second damped natural frequency (Hz) | Third damped natural frequency (Hz) |
| 1 | 6.227 | 27.197 | 54.36 |
| 2 | 6.233 | 27.23 | 54.25 |
| 3 | 6.224 | 27.19 | 54.30 |
| Average value | 6.228 | 27.206 | 54.303 |
| Standard derivation | 0.0037 | 0.0174 | 0.045 |

TABLE 2

| Damped natural frequencies of the rotating fan blade with different speeds | | | |
|---|---|---|---|
| R (rpm) | First damped natural frequency (Hz) | Second damped natural frequency (Hz) | Third damped natural frequency (Hz) |
| 9.79 | 6.375 | 27.33 | 54.79 |
| 15.41 | 6.56 | 27.64 | 56.37 |
| 24.28 | 6.75 | 27.85 | 57.16 |
| Non-constant | 6.27 | 27.41 | 55.02. |

Estimated damped natural frequencies of the rotating fan blade increased with its constant speed due to the centrifugal stiffening term in EQN. 4, which is analytically shown below. Integrating $\int_r^{r+d} \phi_i(x) L[\phi_j(x)] dx$ by part and applying boundary conditions in EQN. 2 to the resulting expression yield $$\int_r^{r+d} \phi_i(x) L[\phi_j(x)] dx = \int_r^{r+d} \phi_i \left\{ [EI(x)\phi_{j,xx}]_{xx} - \Omega^2 \left[ \phi_{j,xx} \int_x^{r+d} \rho(\zeta)\zeta d\zeta - 2\rho(x) x \phi_{j,x} \right] \right\} dx$$

$$= \int_r^{r+d} \left[ EI(x)\phi_{i,xx}\phi_{j,xx} + \Omega^2 \phi_{i,x}\phi_{j,x} \int_x^{r+d} \rho(\zeta)\zeta d\zeta \right] dx, \quad r < x < r + d \tag{94}$$

Substituting EQN. 94 into EQN. 12 and setting i=j yields $$\int_r^{r+d} \left[ EI(x)\phi_{i,xx}^2 + \Omega^2 \phi_{i,x}^2 \int_x^{r+d} \rho(\zeta)\zeta d\zeta \right] dx = \omega_i^2, \quad r < x < r + d \tag{95}$$

Since $r \leq x \leq r+d$, $\int_x^{r+d} \rho(\zeta)\zeta d\zeta \geq 0$. Therefore, the integral on the left-hand side of EQN. 95 increases with the constant rotation speed of the fan blade $\Omega$, which causes its natural frequencies $\omega_i$ to increase it.

Estimated end-to-end undamped mode shapes of the stationary and rotating fan blades are similar in shape to undamped mode shapes of a cantilever beam since one end of the fan blade is connected to its hub and its other end is free. Amplitudes of end-to-end undamped mode shapes of the fan blade at $x_d/S=0$ are small but not zero since the end point $x_d/S=0$ of the scan path in FIG. 8 is not exactly at the end of the fan blade close to the fan hub and the hub can have some vibration. Normalized end-to-end undamped mode shapes of the stationary fan blade obtained from the three tests are basically the same; some small differences among them can be caused by errors in experimental measurement, such as some tracking error introduced by the fan blade slowly swinging back and forth a bit, which leads to slightly different scanning paths in the three tests, and error due to slight difference between the actual scan frequency $F_{sc}$ and frequency of signals sent to the scanner. When the TCSLDV system tracked the rotating fan blade with different speeds and swept its laser spot on the fan blade, positions of scan paths may not be exactly the same. Due to this reason and mainly the fact that the stiffness operator $L(\cdot)$ in EQN. 3 depends on the rotation speed of the fan blade, estimated normalized end-to-end undamped mode shapes of the rotating fan blade with different speeds in FIGS. 13A-13C have some differences among them.

As detailed herein, a TCSLDV system was developed to track and scan a rotating structure and a new OMA method based on a rigorous nonuniform rotating beam vibration theory, an image processing method, and an improved demodulation method is proposed to measure the rotation speed of the structure and estimate its damped natural frequencies and end-to-end undamped mode shapes for a constant rotation speed and instantaneous end-to-end undamped mode shapes for a non-constant rotation speed in a short time duration. The image processing method determines real-time positions of the rotating structure to calculate its speed and generate a scan path on the structure. The improved demodulation method determines end-to-end undamped mode shapes of the rotating structure under random excitation by multiplying the measured response by sinusoidal signals at damped natural frequencies obtained from the FFT of the filtered measured response. Damped natural frequencies and end-to-end undamped mode shapes of a rotating fan blade with a constant speed under random excitation and end-to-end undamped mode shapes of the rotating fan blade with a non-constant speed in a short time duration were successfully estimated using the new OMA method. It is theoretically and experimentally shown that estimated damped natural frequencies of the rotating fan blade increase with its constant speed.

A CSLDV system is capable of obtaining spatially dense vibration measurement by continuously sweeping its laser spot along a scan path on a structure surface. This paper presents a new operational modal analysis (OMA) method for a rotating structure based on a rigorous nonuniform rotating beam vibration theory, an image processing method, and an improved demodulation method that can estimate modal parameters of a linear structure, including damped natural frequencies and undamped mode shapes, under random excitation. The governing equation of a rotating beam is introduced and its solution that can be considered as the response of the beam measured by a CSLDV system is derived. A novel TCSLDV system is developed to track and scan a rotating structure, and the real-time position of the rotating structure can be determined by image processing so that the TCSLDV system is capable of tracking a time-varying scan path on the rotating structure. The improved demodulation method can obtain end-to-end mode shapes of a structure by multiplying the measured response by sinusoidal signals with its damped natural frequencies obtained from the fast Fourier transform of the measured response. Experimental investigation is conducted using the TCSLDV system to study the OMA method with which modal parameters of a rotating fan blade with different constant speeds and instantaneous modal parameters of that with a non-constant speed are obtained. Estimated damped natural frequencies of the rotating fan blade increase with its constant speed.

Example 2

Experimental Setup: A TCSLDV system was developed in this work for measuring vibration of a rotating structure and a fan blade was used as the rotating structure. The TCSLDV system consists of a Polytec OFV-533 laser Doppler vibrometer, a Cambridge 6240H scanner with an NI 9149 controller, and a Basler camera whose maximum frame rate is 50 Hz (FIG. 7A). The controller was connected to the scanner to control rotation angles of two orthogonal mirrors of the scanner. Since the laser beam of the vibrometer was reflected by the mirrors, horizontal and vertical positions of the laser spot on the structure can be controlled by changing rotation angles of X- and Y-mirrors, respectively. The vibrometer can measure the surface velocity of a point on the blade where the laser spot is located. A control scheme was designed using the system engineering software LabVIEW so that various scan paths of the laser spot can be created by sending control signals to the scanner.

The camera was used to capture images of the rotating fan in FIG. 7C with a frame rate of 50 frames per second. A black circular mark was attached to one blade of the rotating fan so that the TCSLDV system can track the position of the blade by determining the position of the mark. Every time when the camera captured an image of a rotating fan blade, the image was processed by the LabVIEW software to determine the position of the mark on the blade. Images captured were converted to grayscale images by IMAQ Vision in LabView. Since the surface of the blade is white while the mark is black, locations of the mark can be easily identified in these grayscale images. Since the mark is fixed on the rotating fan blade, the position of the blade can be determined as long as the position of the mark is determined. The controller can control the scanner to track the rotating fan blade and sweep its laser spot along it as the camera continuously captures its images (FIG. 8). Every time when the TCSLDV system determined the position of the mark, it can sweep the laser spot from one end of the scan path to its other end. Since the rotating fan was sufficiently far away from the TCSLDV system and rotation angles of X and Y-mirrors were sufficiently small, horizontal and vertical positions of the laser spot can be considered to be linearly related to rotation angles of X- and Y-mirrors, respectively. Feedback signals of the scanner that are registered in the form of voltage were used to indicate rotation angles of X- and Y-mirrors.

The experiment was set up to estimate modal parameters and ODSs of the rotating fan blade using the OMA method described herein (e.g., the improved lifting method). Since the ambient wind load perpendicular to the fan blade surface is small in the experiment when the fan rotates, a small fan was used to provide more ambient excitation on the blade surface (FIG. 8). The rotating fan was vertically mounted on an aluminum frame and the frame and wall behind the fan were covered with a black cloth to facilitate image process-ing. A voltage controller was connected to the rotating fan to adjust its constant rotation speeds. A strip of a reflective tape was attached to the surface of the rotating fan blade to enhance the signal-to-noise ratio of TCSLDV measurement. The scan path ranged from x/L=0 to x/L=1, as shown in FIG. 14, where x is the distance between the laser spot and end point of the scan path close to the rotation center, and L is the length of the scan path.

Figures 15A, 15B:
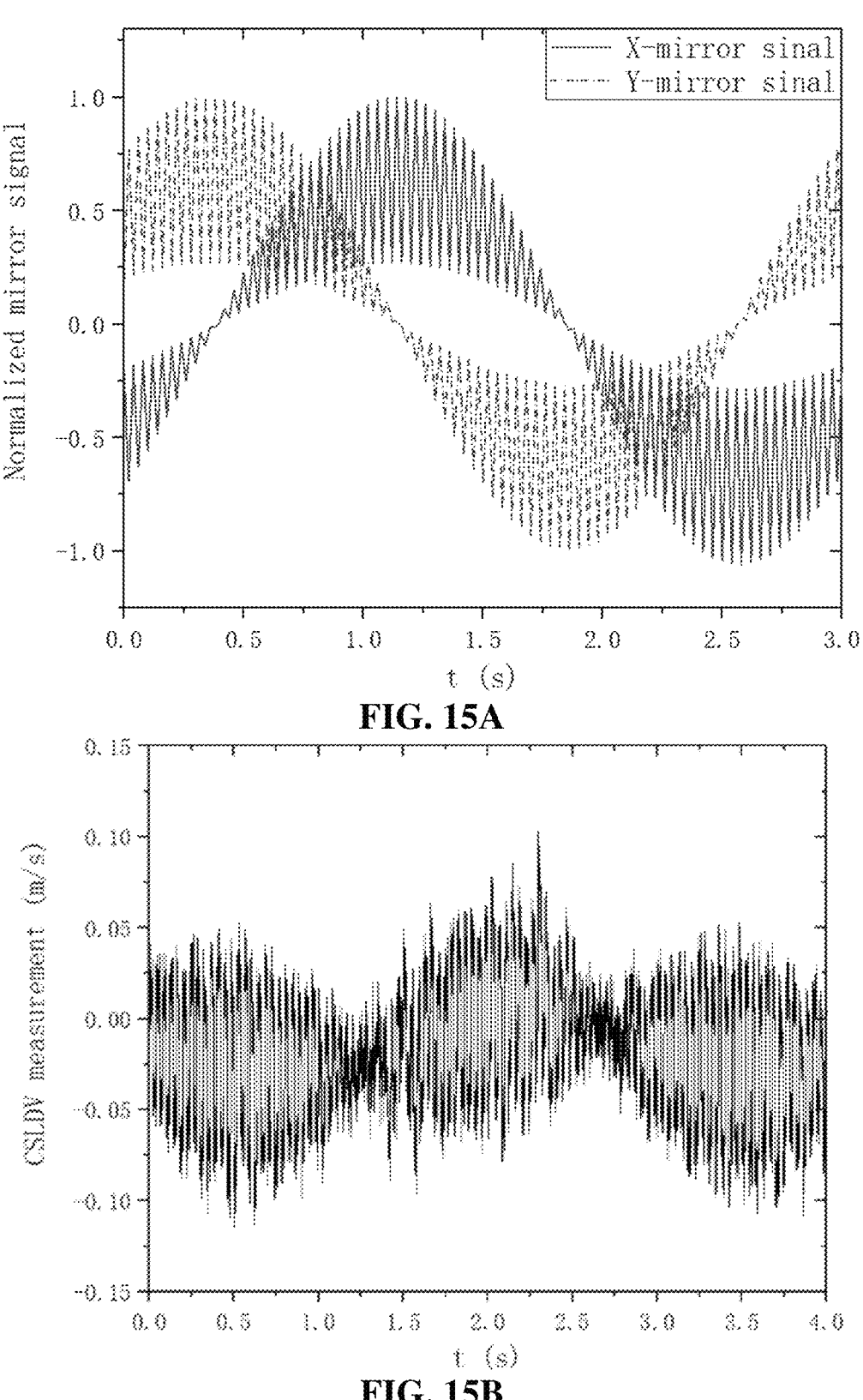
FIG. 15A is a graph of feedback signals for an X- and Y-mirror.
FIG. 15B is a graph of the measured response of the rotating fan blade under ambient excitation.
Figures 15C, 15D:
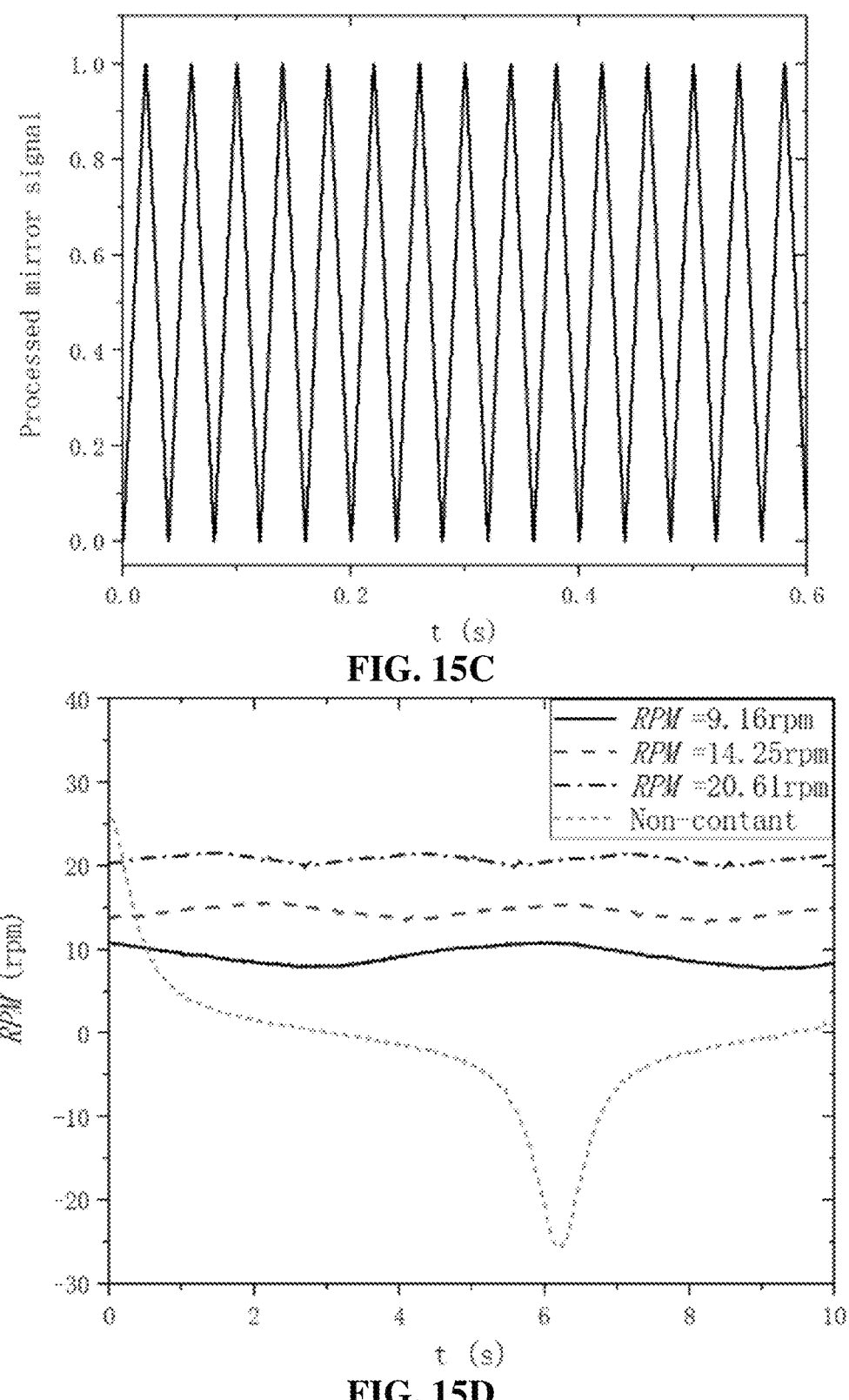
FIG. 15C is a graph of a processed mirror signal.
FIG. 15D is a graph of measured rotation speeds of the fan blade with a constant or non-constant rotation speed.
Figures 15E, 16A:
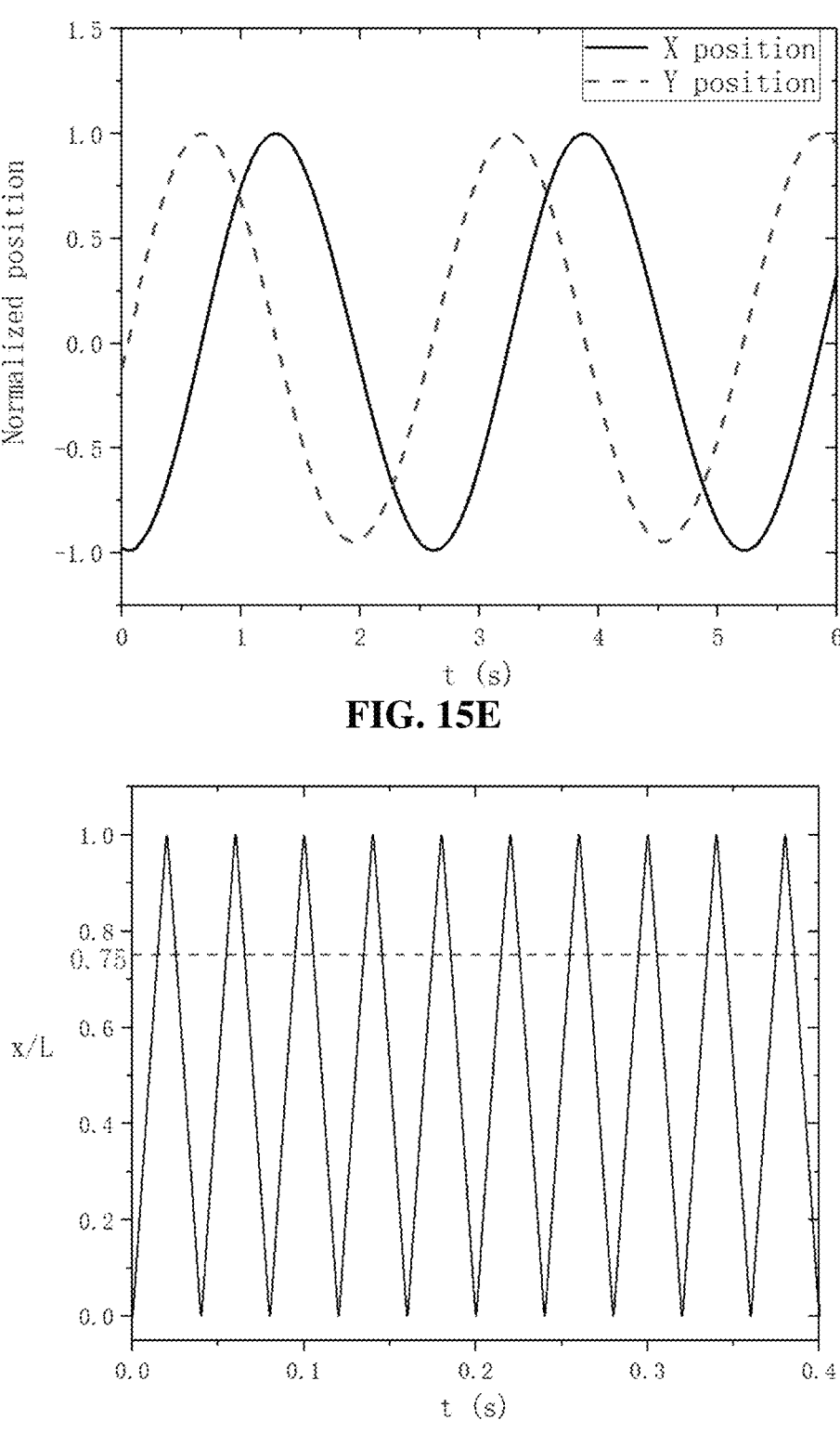
FIG. 15E is a graph of measured X and Y positions of the mark when the blade rotates.
FIG. 16A is a graph of laser spot position x/L from t=0 s to t=0.4 s with the horizontal dashed line indicating the position x/L=0.75.

Operational Modal Analysis (OMA) results: The fan was turned on and rotated with a constant speed. Mirror signals and measured response of the rotating fan blade was shown in FIG. 15A and FIG. 15B, respectively, with the frame rate of the camera being 50 Hz, $F_{sa}$=2500 Hz, and RPM=20.61 rpm. Mirror signals were normalized by dividing data in a signal by their maximum value. Since the TCSLDV system swept its laser spot from one end of the scan path to its other end, which is half of a complete scan, when the camera captured an image of the rotating fan, the number of complete scans in one second is half of the frame rate of the camera; therefore $F_{sc}$=½×50=25 Hz. The scan frequency of the TCSLDV system cannot exceed 25 Hz since the maximum frame rate of the camera is 50 frames per second, which means Nyquist frequency of the TCSLDV system is 12.5 Hz; a camera with a higher frame rate can be used to increase the scan frequency of the system when modal parameters of high modes of the fan blade need to be estimated. Feedback signals of X- and Y-mirrors were processed using the method described herein to combine signals of the two mirrors to describe the position of the laser spot on the scan path on the rotating fan blade. The processed mirror signal that can be used to represent x/L was shown in FIG. 15C, rotation speeds of the fan blade measured by the TCSLDV system are shown in FIG. 15D, and measured X and Y positions of the mark are shown in FIG. 15E.

The voltage controller prescribed three constant rotation speeds RPM=9.16 rpm, 14.25 rpm, and 20.61 rpm for the fan; measured rotation speeds of the fan blade are basically constant around these values, but slightly vary with time. Since there were a mark and a strip of a reflective tape attached to the fan blade, it was slightly heavier than the other two blades of the fan and has a downward equilibrium position when the fan was turned off. To study a case with a non-constant rotation speed of the fan blade, it was rotated to an unbalanced position and released from rest; it then started to rotate under the gravity effect and had a non-constant rotation speed shown in FIG. 15D.

Although the frequency of signals from the NI controller to the scanner was exactly 25 Hz, the actual scan frequency $F_{sc}$ in the experiment was slightly larger or smaller than 25 Hz. Due to slight difference between the actual $F_{sc}$ and frequency of signals sent to the scanner, N in EQN. 58 was a fraction instead of an integer, and time instants when the laser spot reached a certain position on the fan blade could not be accurately determined. However, N should be an integer so that the laser spot could arrive at the same virtual measurement points in every complete scan; therefore response measured by the TCSLDV system could not be directly lifted to measurements at virtual measurement points on the fan blade. A resampling scheme for lifting CSLDV measurement requires obtaining a constant integer number of samples in every scan period and accurately measuring $F_{sc}$. Xu et al. developed a simpler and more robust resampling scheme that can lift measurement of a CSLDV system at any virtual measurement point on a scan path. This scheme can be applied to periodic scans where N is not an integer since precise estimation of $F_{sc}$ is not required. The scheme requires a sufficiently high sampling frequency $F_{sa}$ of the TCSLDV system so that response between two sampling points can be well approximated by interpolation. Measured response can be lifted at any virtual measurement point on the scan path.

Detailed steps of using this scheme to lift measurement of the TCSLDV system to virtual measurement points on the scan path include: (STEP 1) interpolate positions of sampling points of the TCSLDV system on a dense grid; (STEP 2) calculate negative absolute values of differences between interpolated positions and x to negatively rectify the interpolated positions, where x denotes the position of a virtual measurement point on the scan path; (STEP 3) identify instants when the rectified interpolated positions in STEP 2 are closest to zero in every complete scanning period; (STEP 4) select the instants identified in STEP 3 so that their time increment is equal to $1/F_{sc}$; and (STEP 5) interpolate and lift measurements at selected instants in STEP 4, which constitute lifted measurement at the virtual measurement point x.

Figures 16B, 16C:
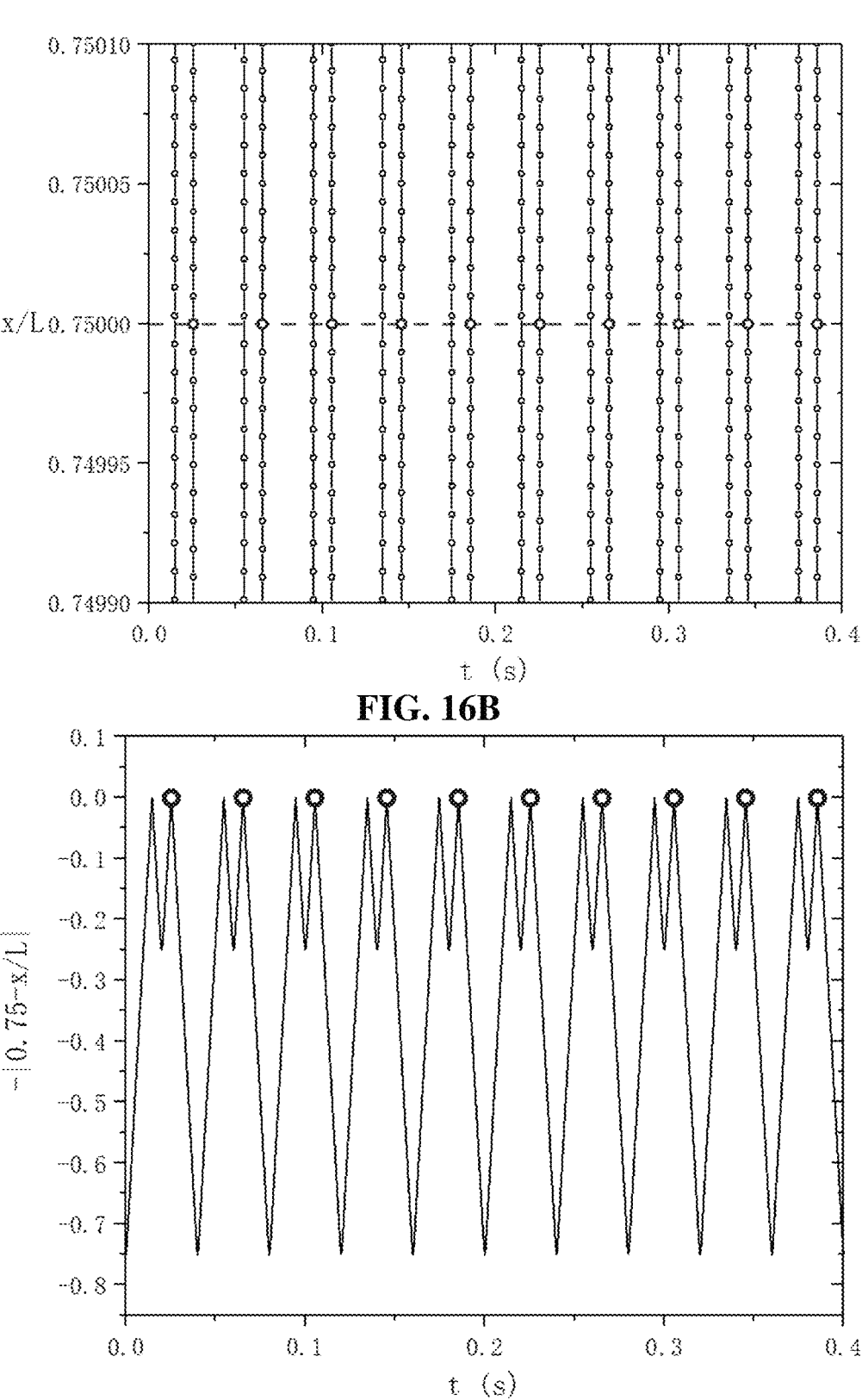
FIG. 16B is a graph of interpolated laser spot positions with dots indicating instants when the laser spot arrived at x/L=0.75.
FIG. 16C is a graph of negatively rectified interpolated laser spot positions with dots indicating instants when the laser spot arrived at x/L=0.75.
Figures 16D, 16E:
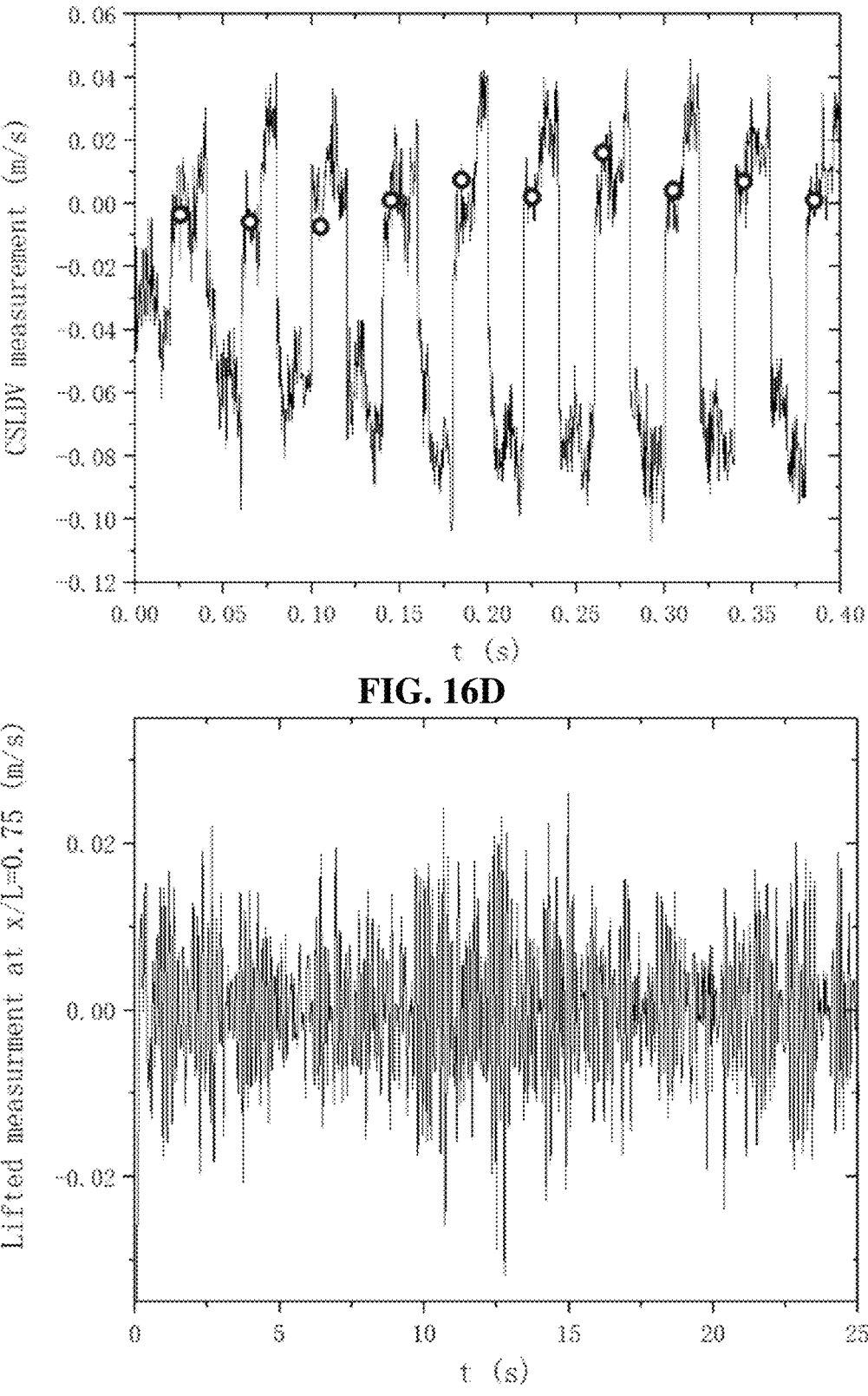
FIG. 16D is a graph of measured response of the fan blade under ambient excitation with dots indicating lifted measurements at x/L=0.75.
FIG. 16E is a graph of lifted measurement at x/L=0.75 from t=0 s to t=25 s.

The first four steps (e.g., STEPS 1-4) of the scheme above are to interpolate sampling points and identify zero-crossings of interpolated sampling points. The fifth step (STEP 5) is to interpolate and lift measurements at instants of zero-crossings of interpolated sampling points. An example is shown in FIGS. 16A-16E to illustrate how the scheme lifted TCSLDV measurement at x/L=0.75. The horizontal dashed line in FIGS. 16A and 16B indicates the position of the laser spot at x/L=0.75. Instants when the laser spot was closest to the position x/L=0.75 are shown as dots in FIG. 16B. Negatively rectified differences between interpolated positions of the laser spot and x/L=0.75 are shown in FIG. 16C

$$\int_b^{b+l} \phi_i(x)L[\phi_j(x)]dx = \int_b^{b+l} \phi_i\left\{EI\phi_{j,xxxx} - \frac{1}{2}\rho\Omega^2\left[((b+l)^2 - x^2)\phi_{j,xx} - 2x\phi_{j,x}\right]\right\}dx \qquad (96)$$

$$= \int_b^{b+l}\left[EI\phi_{i,xx}\phi_{j,xx} + \frac{1}{2}\rho\Omega^2((b+l)^2 - x^2)\phi_{i,x}\phi_{j,x}\right]dx$$

to identify instants when the laser spot arrived at x/L=0.75. Lifted TCSLDV measurement at x/L=0.75 can be obtained from measurements at these identified instants shown as dots in FIG. 16D. Lifted TCSLDV measurement at x/L=0.75 from t=0 s to t=25 s is shown in FIG. 16E and lifted TCSLDV measurements at all virtual measurement points were obtained by applying this scheme.

Figures 17A, 17B, 17C:
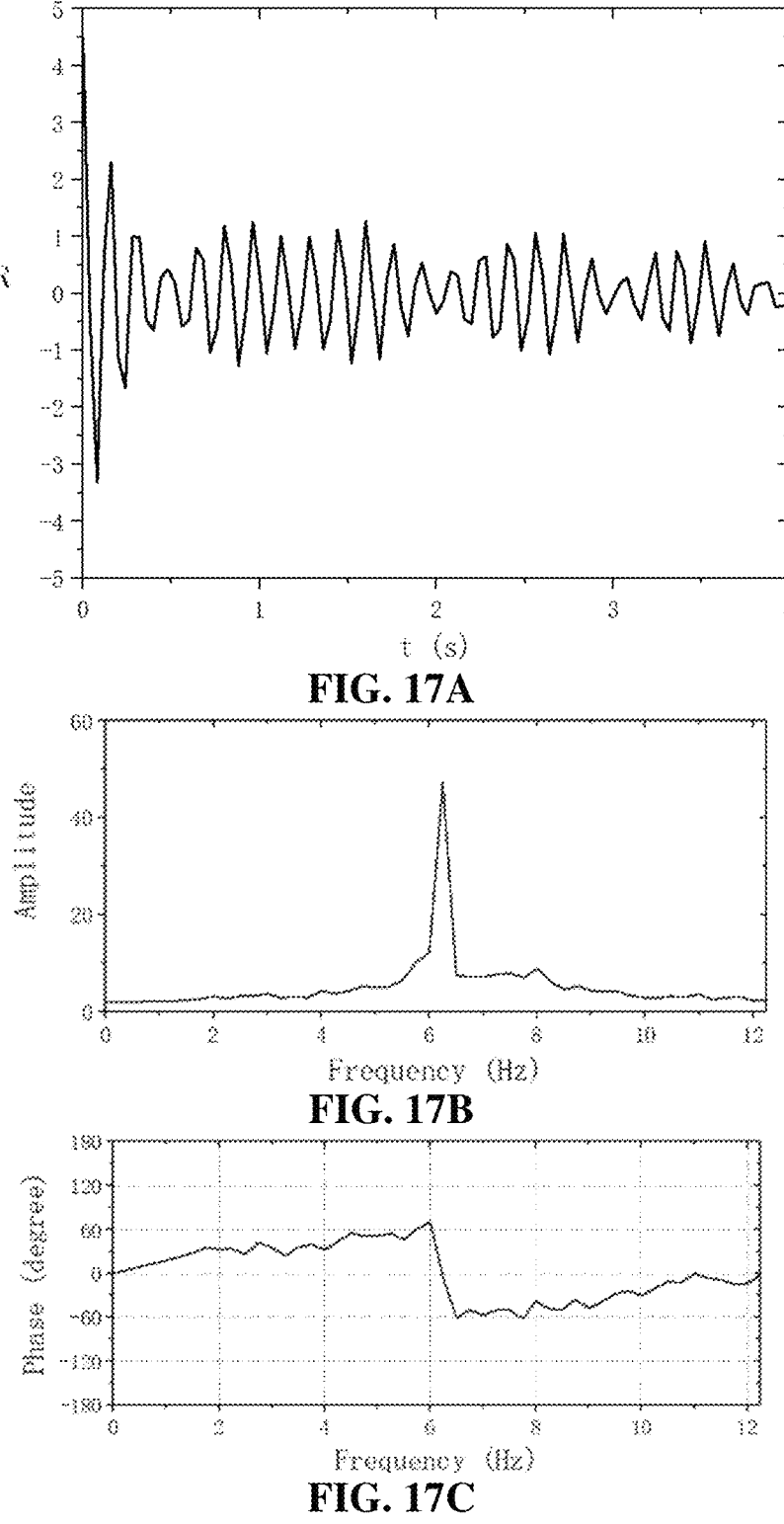
FIG. 17A is a graph of the correlation function between lifted measurement at x/L=0.5 and reference measurement at x/L=0.75 with non-negative time delays.
FIG. 17B is a graph of the amplitude of the power spectrum associated with the correlation function in FIG. 17A.
FIG. 17C is a graph of the phase of the power spectrum associated with the correlation function in FIG. 17A.

The virtual measurement point at x/L=0.75 was chosen as the reference point for the OMA method. The correlation function between lifted measurement at x/L=0.5 and reference measurement at x/L=0.75 with non-negative time delays is shown in FIG. 17A, which has a duration of 4 s. The amplitude and phase of the power spectrum associated with the correlation function in FIG. 17A are shown in FIG. 17B and FIG. 17C, respectively. Power spectra associated with all correlation functions between lifted measurements and reference measurement can be calculated and analyzed using, for example, Operational PolyMAX in the LMS Test. Lab software to estimate modal parameters of the rotating fan blade with a constant speed. ODSs of the rotating fan blade with a constant or non-constant speed can be estimated using the ODS calculation module in the LMS Test. Lab software.

Figures 18A, 18B:
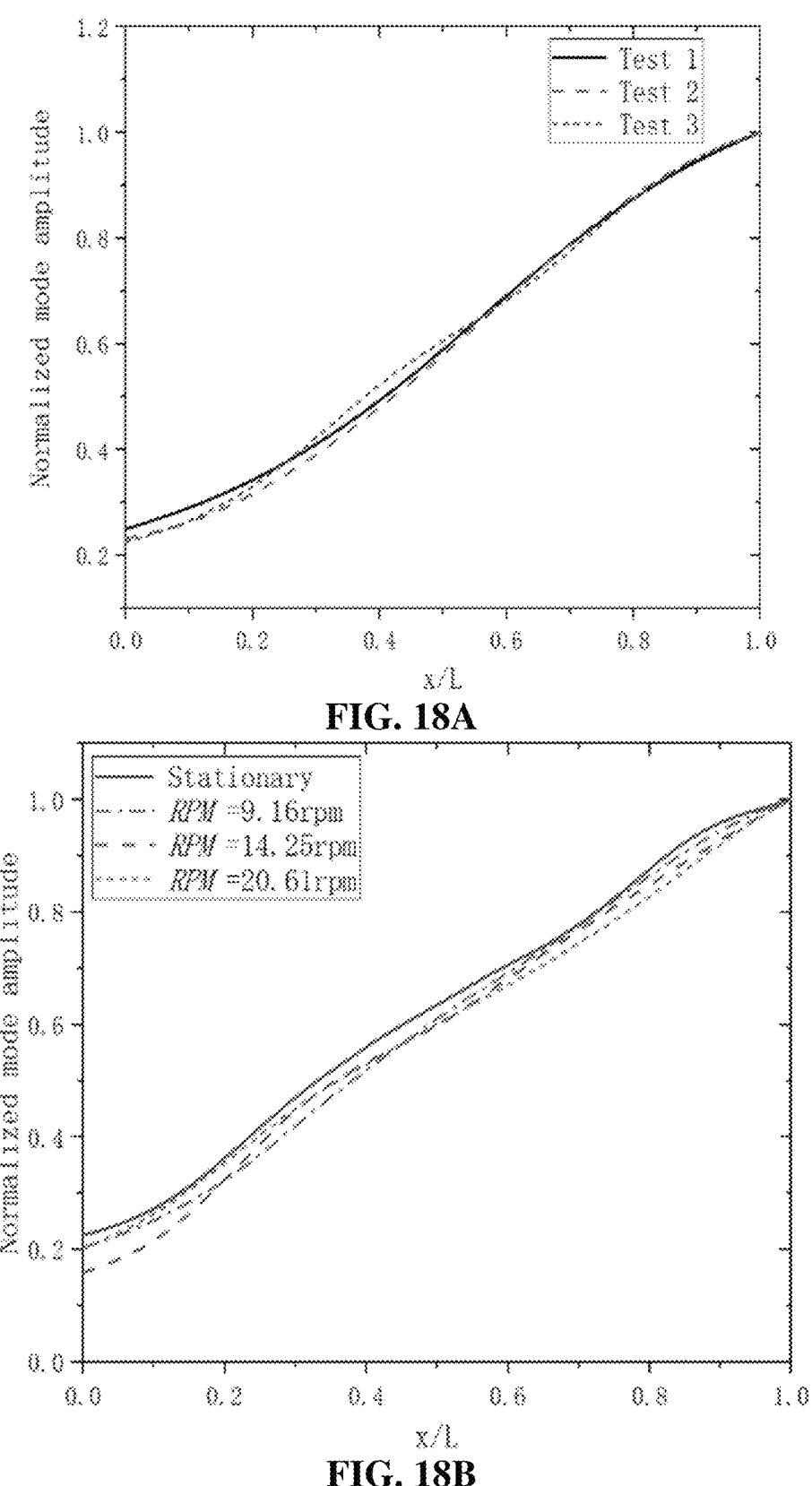
FIG. 18A is a graph of first normalized undamped mode shapes of the stationary fan blade.
FIG. 18B is a graph of first normalized undamped mode shapes of the stationary fan blade and the rotating fan blade with three different constant speeds.

The first damped natural frequencies and modal damping ratios of the stationary fan blade obtained in three tests under almost the same testing conditions are shown in Table 3, and the first undamped mode shapes of the stationary fan blade obtained in the three tests are shown in FIG. 18A. Since Nyquist frequency of the TCSLDV system is 12.5 Hz and the second damped natural frequency of the stationary fan blade measured by a laser vibrometer is about 27 Hz, only the first modal parameters were estimated. Note that to estimate modal parameters of the stationary fan blade, the fan was turned off and the fan blade was excited by the excitation fan. The fan blade was basically stationary, but slowly swung back and forth a bit about its downward equilibrium position due to fan excitation, and it was scanned by the TCSLDV system. Note also that undamped mode shapes estimated in this work were normalized by dividing their data by their maximum values. The first damped natural frequencies and modal damping ratios of the rotating fan blade with three different constant speeds are shown in Table 4, and the first undamped mode shapes of the rotating fan blade with the three different rotation speeds are shown in FIG. 18B. The average value of the first damped natural frequencies of the stationary fan blade obtained in the three tests is 6.223 Hz with a standard deviation of 0.0164. The average value of the first modal damping ratios of the stationary fan blade obtained in the three tests is 0.339% with a standard deviation of $9.71\times10^{-4}$. It is seen that there is more uncertainty in damping ratio measurement than damped natural frequency measurement as there is more uncertainty in damping modeling in EQN. 33. The estimated first damped natural frequency of the rotating fan blade increases with its speed due to the centrifugal stiffening term in EQN. 36. This can be analytically shown below. Integrating $\int_b^{b+l}\phi_i(x)L[\phi_j(x)]$ dx by part and applying boundary conditions in EQN. 35 yields Substituting EQN. 96 into EQN. 40 and setting i=j yield $$\int_b^{b+l}\left[EI\phi_{i,xx}^2 + \frac{1}{2}\rho\Omega^2((b+l)^2 - x^2)\phi_{i,x}^2\right]dx = \omega_{n,i}^2 \qquad (97)$$

Since b≤x≤b+l, $(b+l)^2-x^2 \geq 0$. Therefore the integral on the left-hand side of EQN. 77 increases with the rotation speed $\Omega$ of the fan blade, which causes its natural frequency $\omega_{n,i}$ to increase with the rotation speed $\Omega$.

Estimated first undamped mode shapes of the stationary and rotating fan blades are similar to the first undamped mode shape of a cantilever beam since one end of the fan blade is connected to its hub and its other end is free. Amplitudes of the first undamped mode shapes of the fan blade at x/L=0 are small but not zero; this is the case because the end point x/L=0 of the scan path in FIG. 14 is not exactly at the end of the fan blade close to the fan hub and the hub can have some vibration. The first normalized undamped mode shapes of the stationary fan blade obtained from the three different tests are basically the same; some small differences among them can be caused by errors in experimental measurement, such as some tracking error

TABLE 3

First damped natural frequencies and modal damping ratios of the stationary fan blade estimated in three tests under almost the same conditions

| Test number | Damped natural frequency | Modal damping ratio |
|---|---|---|
| 1 | 6.235 Hz | 0.4% |
| 2 | 6.229 Hz | 0.227% |
| 3 | 6.204 Hz | 0.39% |

TABLE 4

First damped natural frequencies and modal damping ratios of the stationary fan blade and the rotating fan blade with three different constant speeds

Figure 18C:
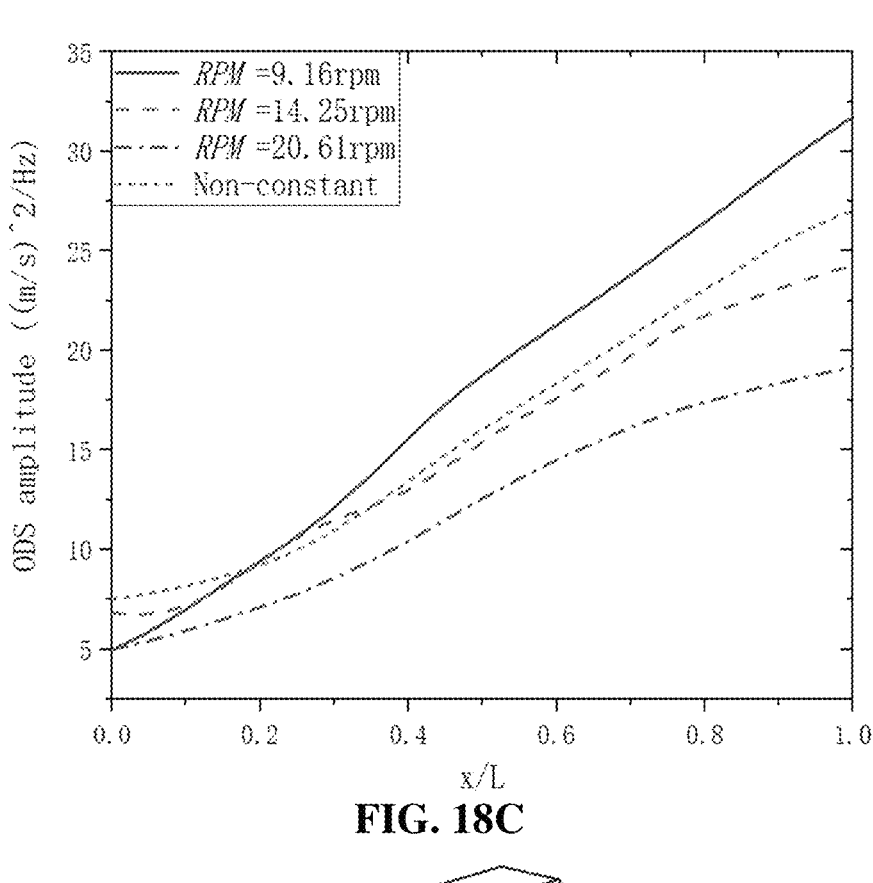
FIG. 18C is a graph of operating deflection shapes (ODSs) of the rotating fan blade with three different constant speeds and a non-constant speed.

| RPM | Damped natural frequency | Modal damping ratio |
|---|---|---|
| Stationary | 6.22 Hz | 0.778% |
| 9.16 rpm | 6.34 Hz | 0.789% |
| 14.25 rpm | 6.50 Hz | 0.709% |
| 20.61 rpm | 6.73 Hz | 0.939% | introduced by the fan blade slowly swinging back and forth a bit, which lead to slightly different scanning paths in the three tests, and error due to slight difference between the actual scan frequency $F_{sc}$ and frequency of signals sent to the scanner. When the TCSLDV system tracked the rotating fan blade with different speeds and swept its laser spot on the fan blade, positions of scan paths may not be exactly the same. Due to this reason and mainly the fact that the stiffness operator L(•) in EQN. 35 depends on the rotation speed of the fan blade, estimated first normalized mode shapes of the rotating fan blade with different constant speeds in FIG. 18B have some differences among them. Estimated ODSs of the rotating fan blade in four tests with three different constant speeds and a non-constant speed, as shown in FIG. 15D, are shown in FIG. 18C. The estimated ODS of the rotating fan blade with the non-constant speed has a similar shape to those of the rotating fan blade with constant speeds. Differences among ODSs of the rotating fan blade with different speeds in FIG. 18C are more pronounced than those among its first normalized undamped mode shapes in FIG. 18B, since ODSs depend on wind loads applied on the rotating fan blade and wind loads depend on its rotation speeds, while first normalized undamped mode shapes do not depend on wind loads. The rotation speed of the fan blade can also affect its ODSs, but its effect on the ODSs can be smaller than that of wind loads.

As detailed herein, a TCSLDV system was developed to track and scan a rotating structure and a new OMA method based on a rigorous rotating beam vibration theory, an image processing method, and the lifting method is proposed to measure the rotation speed of the structure and estimate its modal parameters for a constant speed and ODSs for constant and non-constant speeds. The image processing method determines real-time positions of the rotating structure to calculate its speed and generate a scan path on the structure. The lifting method is used to transform TCSLDV measurement into measurements at multiple virtual measurement points. Correlation functions with non-negative time delays among lifted measurements are calculated and analyzed to estimate modal parameters and ODSs of the rotating structure. Modal parameters a rotating fan blade with a constant speed and ODSs of the fan blade with constant and non-constant speeds were successfully estimated using the new OMA method. It was theoretically and experimentally shown that estimated damped natural frequencies of the rotating fan blade increased with its rotation speed. Estimated undamped mode shapes and ODSs of a rotating structure such as a turbine blade (e.g., a wind turbine blade, tidal turbine blade, wave turbine blade, etc.) can be used to identify its structural damage in some future study.

A continuously scanning laser Doppler vibrometer (CSLDV) system is capable of rapidly obtaining spatially dense vibration measurement by continuously sweeping its laser spot along a path on a structure surface. This paper presents a new operational modal analysis (OMA) method for a rotating structure based on a rigorous rotating beam vibration theory, an image processing method, and a data processing method called the lifting method. A novel tracking CSLDV (TCSLDV) system was developed in this work to track and scan a rotating structure, and the real-time position of the rotating structure can be determined by image processing so that the TCSLDV system is capable of tracking a time-varying scan path on the rotating structure. The lifting method can transform raw TCSLDV measurement into measurements at multiple virtual measurement points as if they were measured by transducers attached to these measurement points. Modal parameters of the rotating structure with a constant speed, including damped natural frequencies, undamped mode shapes, and modal damping ratios, and operating deflection shapes (ODS) of the structure with a constant or prescribed time-varying rotation speed can be determined by calculating and analyzing correlation functions with non-negative time delays among measurements at virtual measurement points. Experimental investigation is conducted using the TCSLDV system to study the OMA method with which modal parameters and an ODS of a rotating fan blade with different constant speeds, as well as an ODS of the rotating fan blade with a non-constant speed are successfully estimated.

Example 3

Figure 19A:
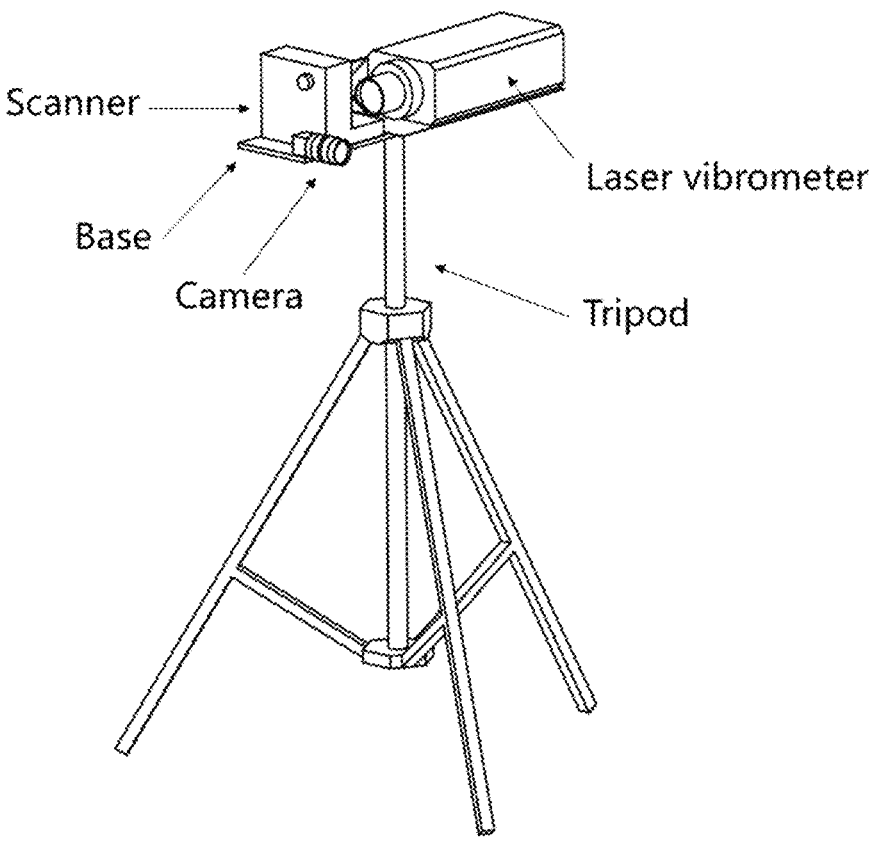
FIG. 19A is a picture of a tracking CSLDV system.
Figure 19B:
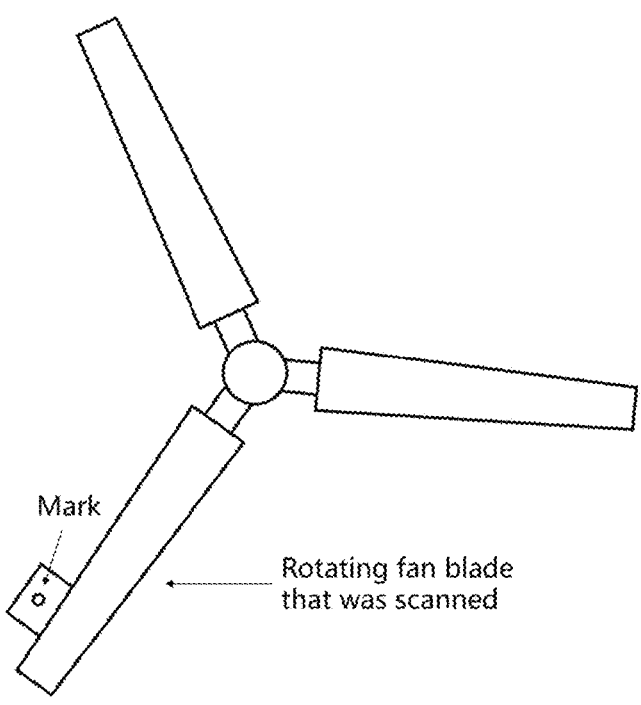
FIG. 19B is a picture of a fan.

Experimental Setup: A fan whose rotating diameter is 139 mm is mounted on a stationary frame and considered as a horizontal-axis wind turbine model. The rotation center of the fan had a height of 122.3 cm. Blades of the fan were considered as rotating plates when the fan rotated. One blade of the rotating fan was scanned by the tracking CSLDV system described herein using the 2D scan scheme. In the illustrated embodiment, the tracking CSLDV system consists of a Polytec OFV-533 laser Doppler vibrometer, a Basler camera whose frame rate was 25 frame per second, and a Cambridge 6240H scanner (FIG. 19A). The camera captured images of the fan when it rotated. An NI 9149 controller was used to control the scanner to sweep the laser spot of the vibrometer on the rotating fan blade. The tracking CSLDV system mounted on a tripod whose height was 114.4 cm. A black circular mark attached to a piece of paper that was attached to the edge of the rotating fan blade, as shown in FIG. 19B, was used to determine its position. The position of the mark was determined by processing images captured by the camera using IMAQ Vision within LabView: Once the position of the mark was determined, positions of four corners of the rotating fan blade could be determined using the method disclosed herein. The tracking CSLDV system could generate 2D scan paths on the rotating fan blade as long as the camera continuously captured its images. Feedback signals of X- and Y-mirrors of the scanner were processed using EQN. 86. The tracking CSLDV system could track a rotating structure whose maximum speed was about 30 rpm, and the rotation speed of a large horizontal-axis wind turbine was about 5-15 rpm.

Figure 20A:
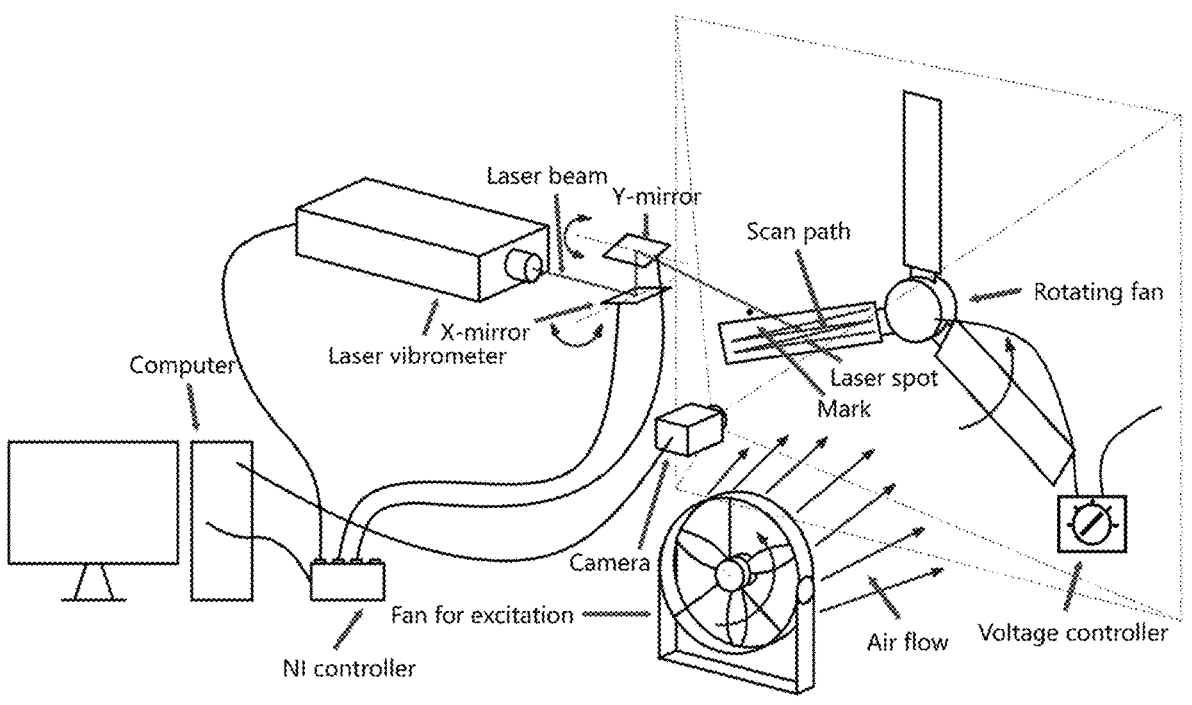
FIG. 20A is a picture of an experimental setup for scanning a rotating fan blade.
Figure 20B:
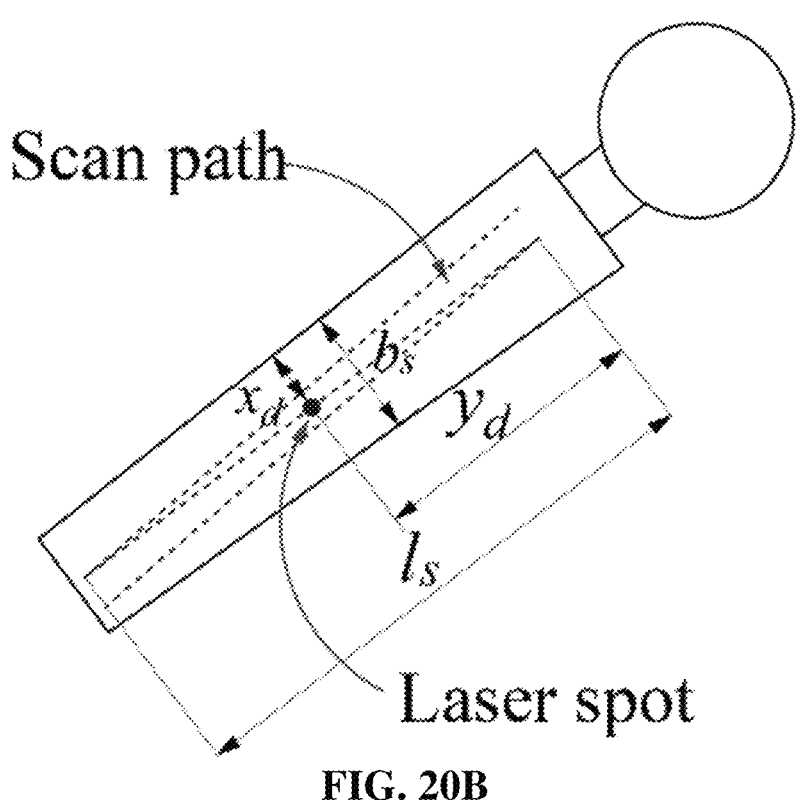
FIG. 20B is a schematic of scanning on a surface of the fan blade.

The air flow of a small excitation fan with a radius of 15.24 cm was used to apply random excitation on the rotating fan blade (FIG. 20A). The wall behind the fan and the stationary structure were covered with black cloth so that the background of images captured by the camera were basically black (FIG. 19B), which could facilitate image processing. The rotating fan blade that was scanned by the tracking CSLDV system was covered with a strip of reflective tape to enhance laser measurement. The distance between the fan whose one blade was scanned and tracking CSLDV system was 174.6 cm and the distance between two fans was 94.6 cm. The fan whose one blade was scanned could rotate with different constant speeds since there was a voltage controller connecting to it (FIG. 20A). The scan line in FIG. 20B ranged from $y_d/l_s=0$ to $y_d/l_s=1$, where $y_d$ is the distance between the end point of the scan line near the rotation center and the laser spot, and $l_s$ is the length of the scan line. The position of the laser spot in the width direction of the rotating blade ranged from $x_d/b_s=0$ to $x_d/b_s=1$, where $x_d$ is the distance between one edge of the rotating fan blade and the laser spot, and $b_s$ is the width of the rotating fan blade at $y=y_d$.

Figures 21A, 21B:
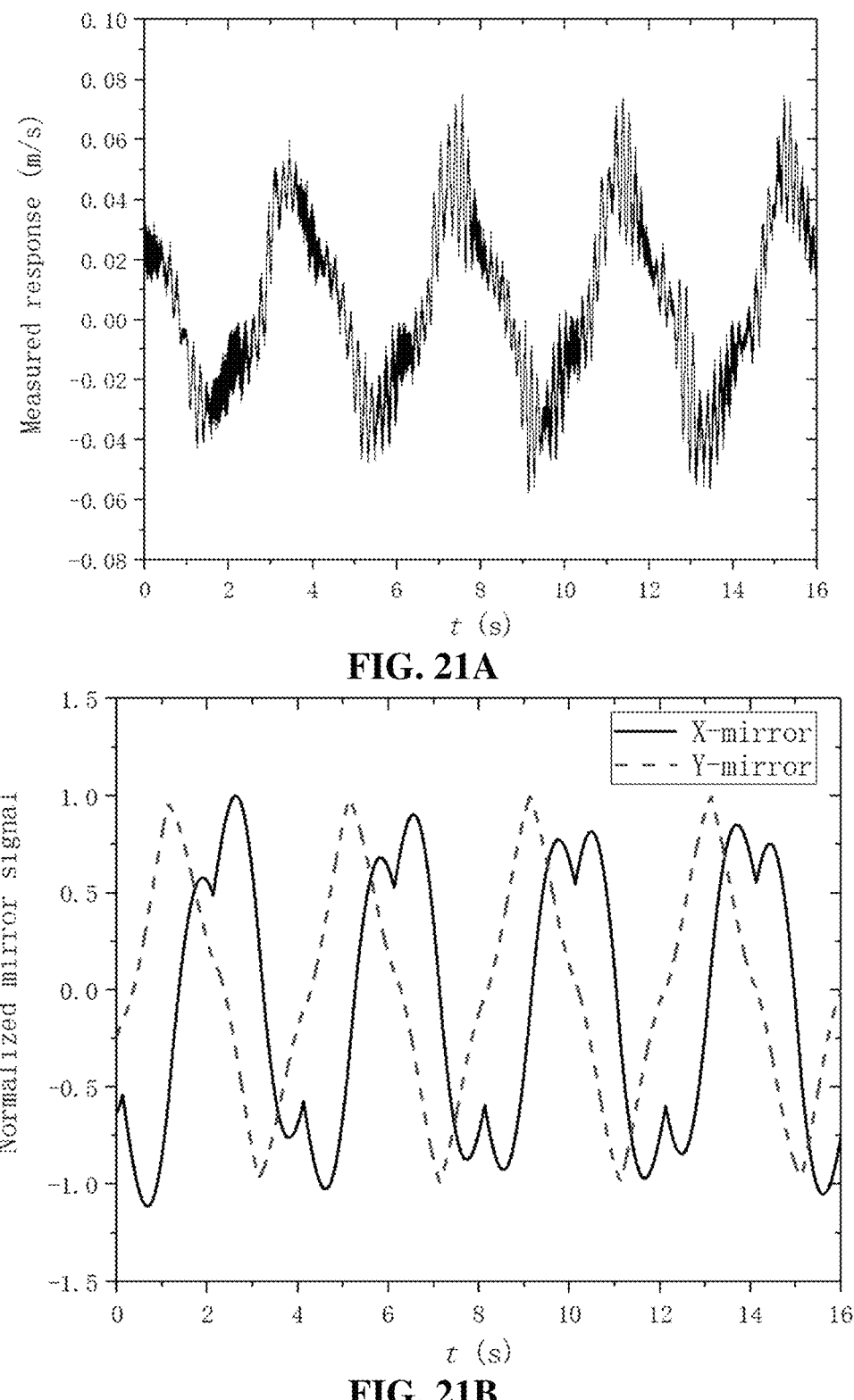
FIG. 21A is a graph of measured response of a rotating fan blade subject to random excitation with R=15.34 rpm.
FIG. 21B is a graph of X- and Y-mirror feedback signals with R=15.34 rpm.

Operational Modal Analysis (OMA) Results: A 2D scan path that consists of 27 scan lines was generated on the surface of the rotating fan blade based on the 2D scan scheme disclosed herein. The measured response from the 2D scan path on the rotating fan blade and X- and Y-mirror feedback signals are shown in FIG. 21A and FIG. 21B, respectively, with the sampling frequency of the laser vibrometer $F_{sa}$=2500 Hz, the scan frequency of the tracking CSLDV system $F_{sc}$=0.5 Hz, and R=15.34 rpm. Note that the scan frequency is equal to the number of times the laser spot is swept back and forth on a scanning line in one second. Data of mirror signals were divided by their maximum values to normalize them. The processed mirror signal in FIG. 21C that was used to represent $y_d/l_s$ was obtained by the method disclosed herein. Three constant rotation speeds R=9.71 rpm, 15.34 rpm and 22.05 rpm were prescribed by the voltage controller for the fan. The rotation speed of the fan blade was determined by processing mark positions in images captured by the camera using EQN. 85 and EQN 86. Mark positions obtained with different constant rotation speeds are shown in FIGS. 22A, 22B, 22C, and 22D. Fan rotation speeds obtained from mark positions in FIGS. 22A, 22B, 22C, and 22D are shown in FIG. 22E. Rotation speeds of the fan blade measured by the tracking CSLDV system with prescribed constant speeds slightly vary with time around its prescribed constant values. Note that a fan blade that was covered with a strip of reflective tape was heavier than that that was not covered with it, and the gravity effect of three blades caused the speed of the rotating fan to change with positions of the blades.

Figures 21C, 22A:
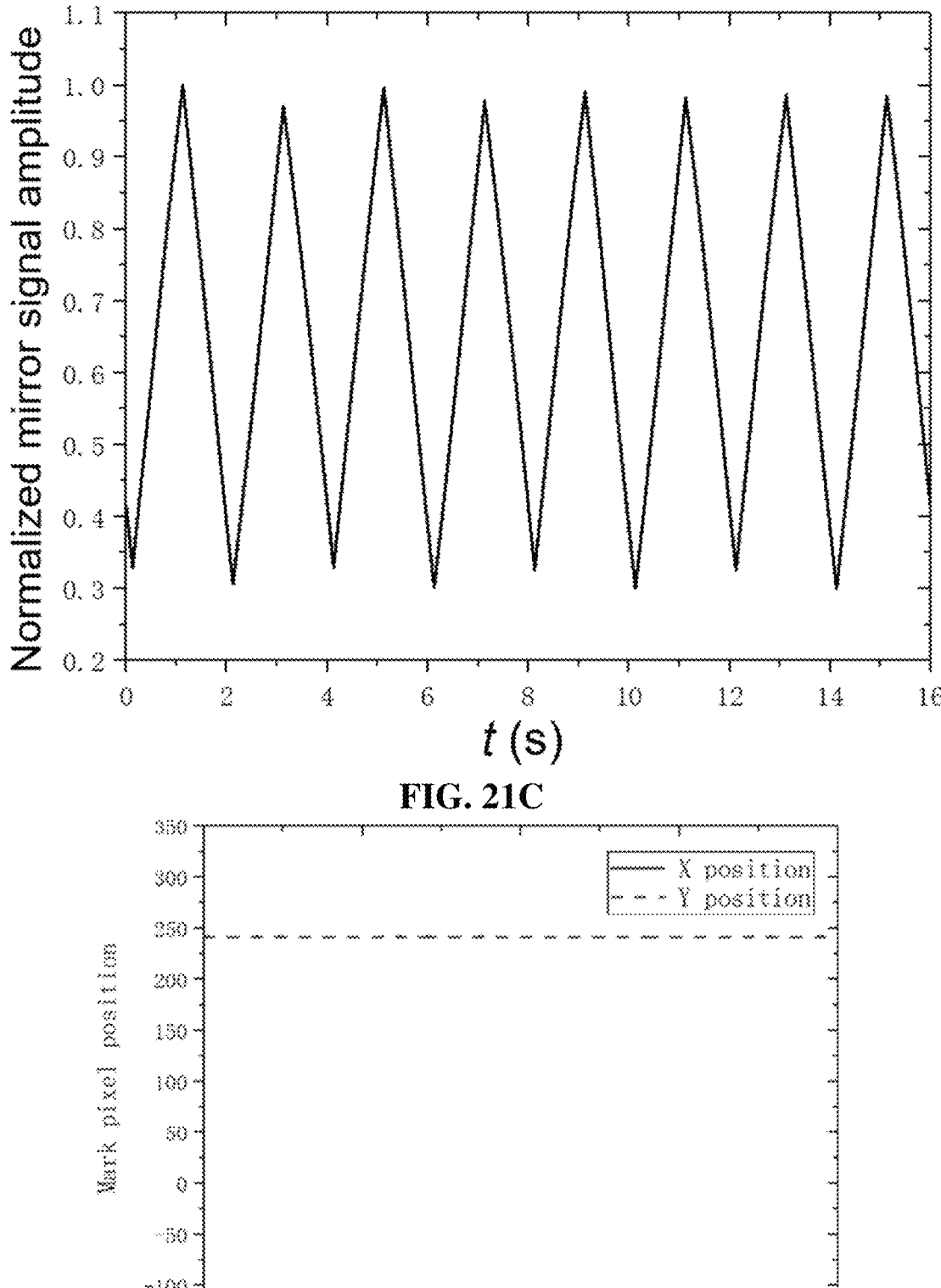
FIG. 21C is a graph of processed mirror signals with R=15.34 rpm.
FIG. 22A is a graph of measured mark position when the fan blade is stationary.
Figures 22B, 22C:
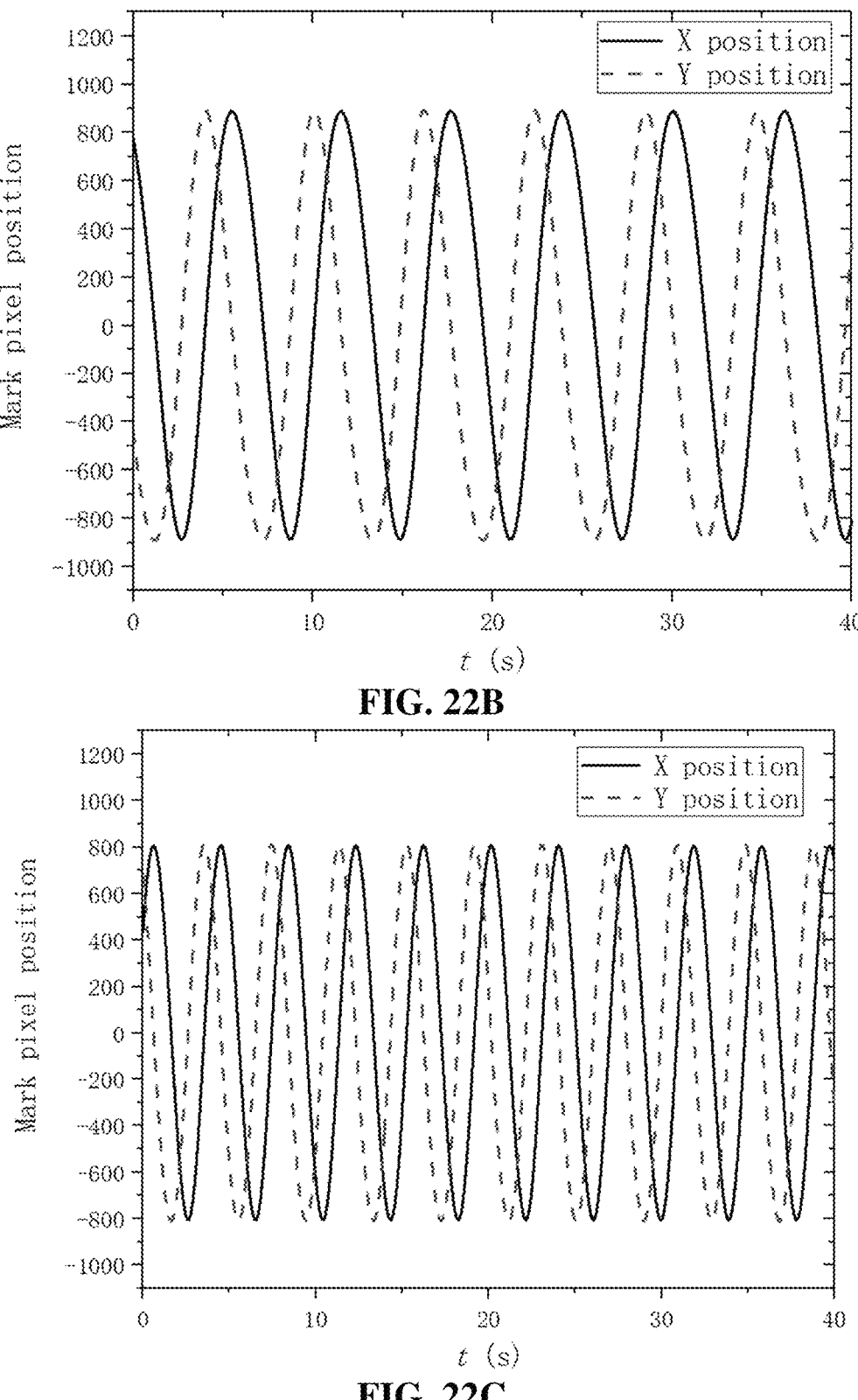
FIG. 22B is a graph of measured mark position when R=9.71 rpm.
FIG. 22C is a graph of measured mark position when R=15.34 rpm.
Figures 22D, 22E:
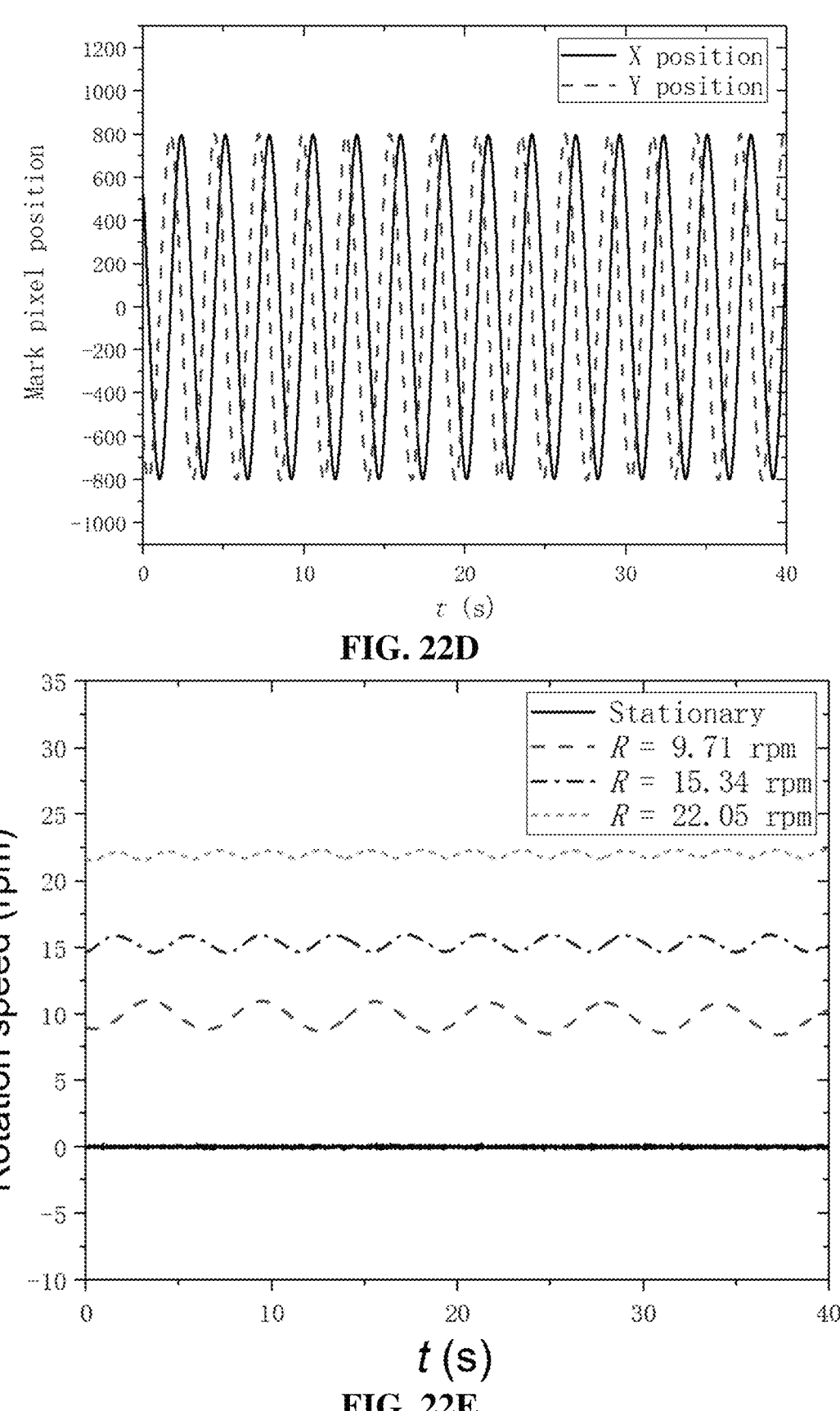
FIG. 22D is a graph of measured mark position when R=22.05 rpm.
FIG. 22E is a graph of measured speeds of the rotating fan blade with different speeds based on mark positions in FIGS. 22A-22D.

The improved 2D demodulation method detailed herein was applied to responses from all the scan lines measured in tests with different rotation speeds and processed mirror signals such as the one shown in FIG. 21C. Minimum values of the processed mirror signal in FIG. 21C mean that the laser spot of the tracking CSLDV system reaches the end point $y_d/l_s$=0 of the scan line and its maximum values mean that the laser spot of the tracking CSLDV system reaches the end point $y_d/l_s$=1 of the scan line. The response in this time interval was measured by the tracking CSLDV system from one end point to the other one since mirror signals and the measured response were simultaneously recorded by the tracking CSLDV system. An undamped mode shape on the scan line was obtained from the measured response in the time interval between neighboring minimum and maximum values of the processed mirror signal.

Figure 23A:
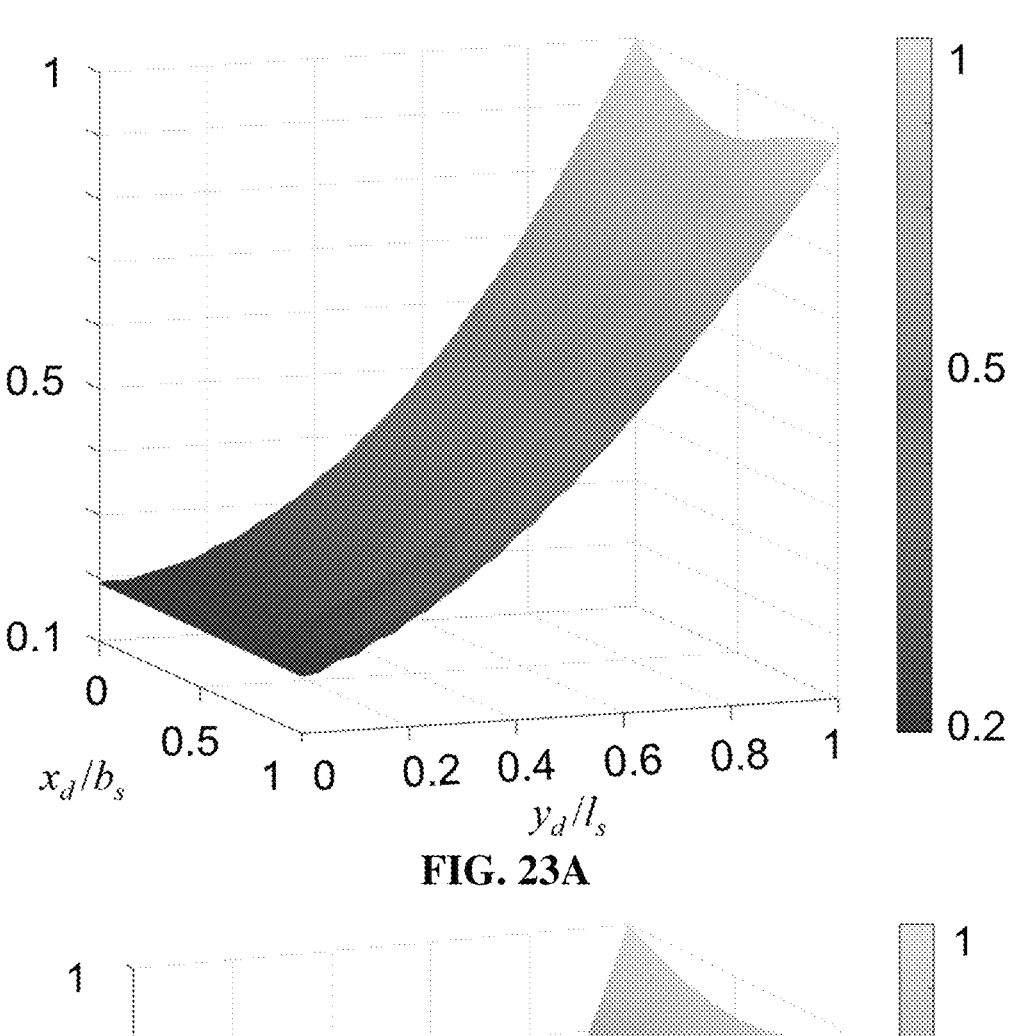
FIG. 23A is a graph of estimated first normalized undamped full-field mode shape of the stationary fan blade using the 2D scan scheme and OMA method.
Figure 23B:
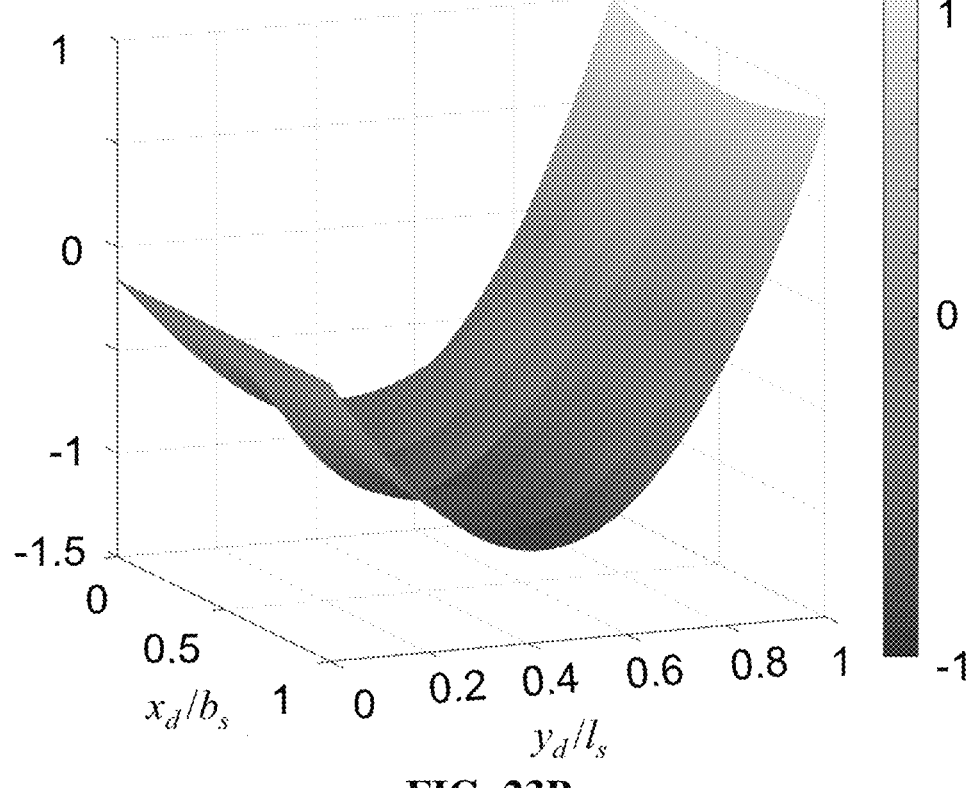
FIG. 23B is a graph of estimated second normalized undamped full-field mode shaped of the stationary fan blade using 2D scan scheme and OMA method.
Figures 24A, 24B:
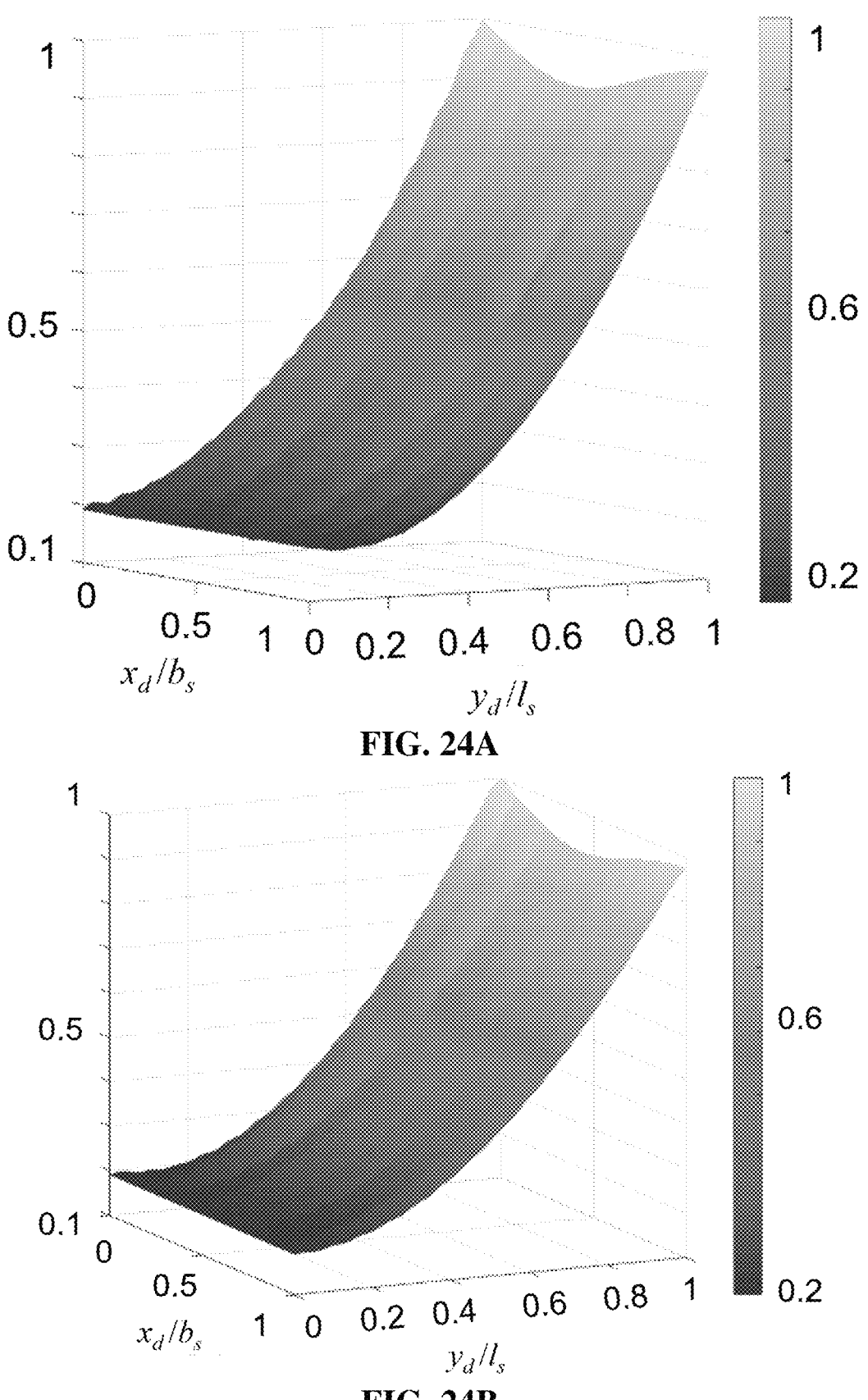
FIG. 24A is a graph of estimated first normalized undamped full-field mode shape of the rotating fan blade with R=9.71 rpm.
FIG. 24B is a graph of estimated first normalized undamped full-field mode shape of the rotating fan blade with R=15.34 rpm.
Figures 24C, 24D:
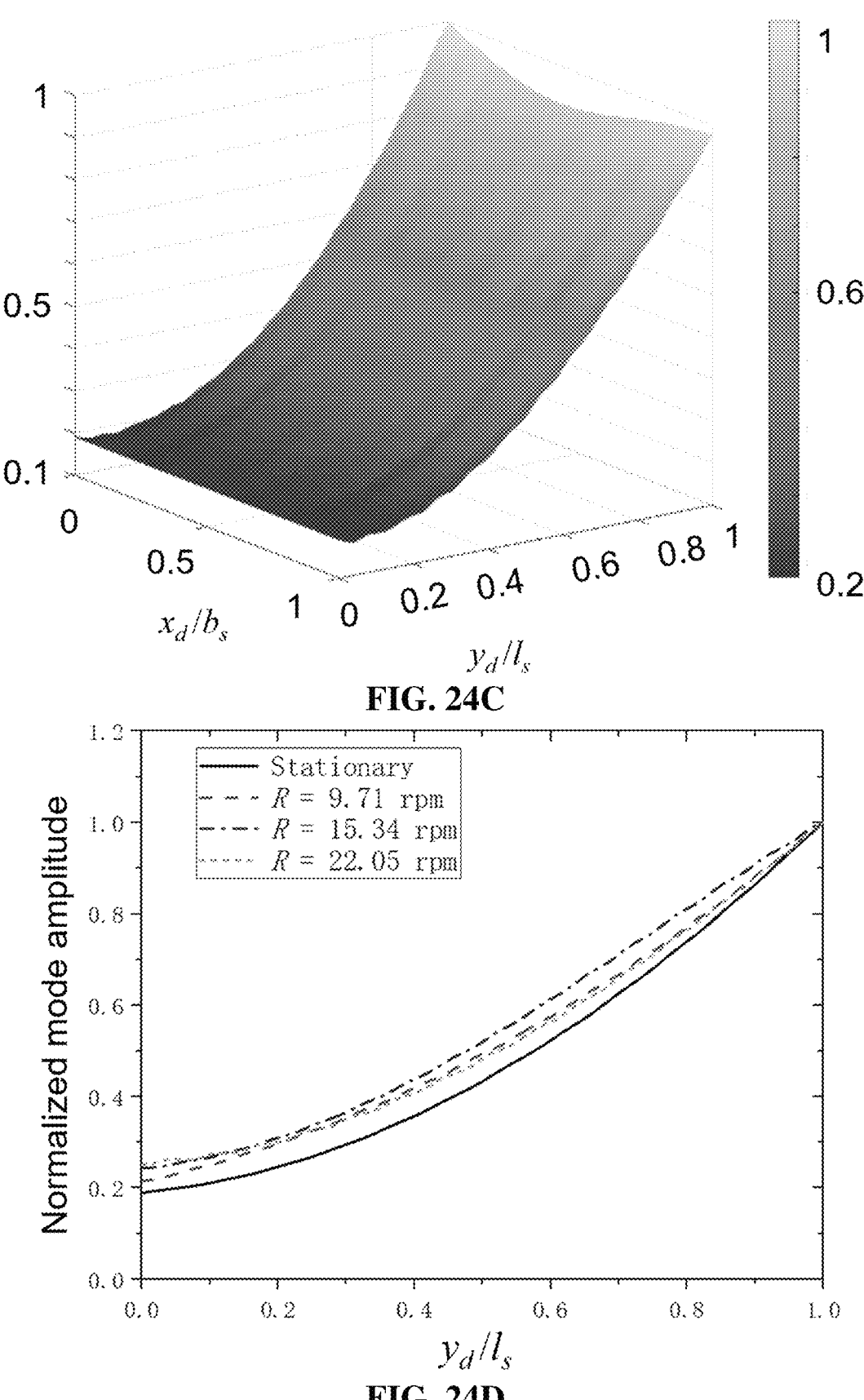
FIG. 24C is a graph of estimated first normalized undamped full-field mode shape of the rotating fan blade with R=22.05 rpm.
FIG. 24D is a graph of estimated first normalized undamped mode shapes of the rotating fan blade on scan lines at the same position.

The first two damped natural frequencies of the stationary fan blade and the rotating fan blade with three different constant speeds were estimated from fast Fourier transforms (FFTs) of measured responses, as shown in Table 5. The first two normalized undamped full-field mode shapes of the stationary fan blade are shown in FIG. 23A and FIG. 23B, respectively. The first normalized undamped full-field mode shapes of the rotating fan blade with three different constant speeds are shown in FIGS. 24A, 24B, and 24C, respectively, and the second normalized undamped full-field mode shapes of the rotating fan blade with three constant

TABLE 5

Figures 24E, 25A:
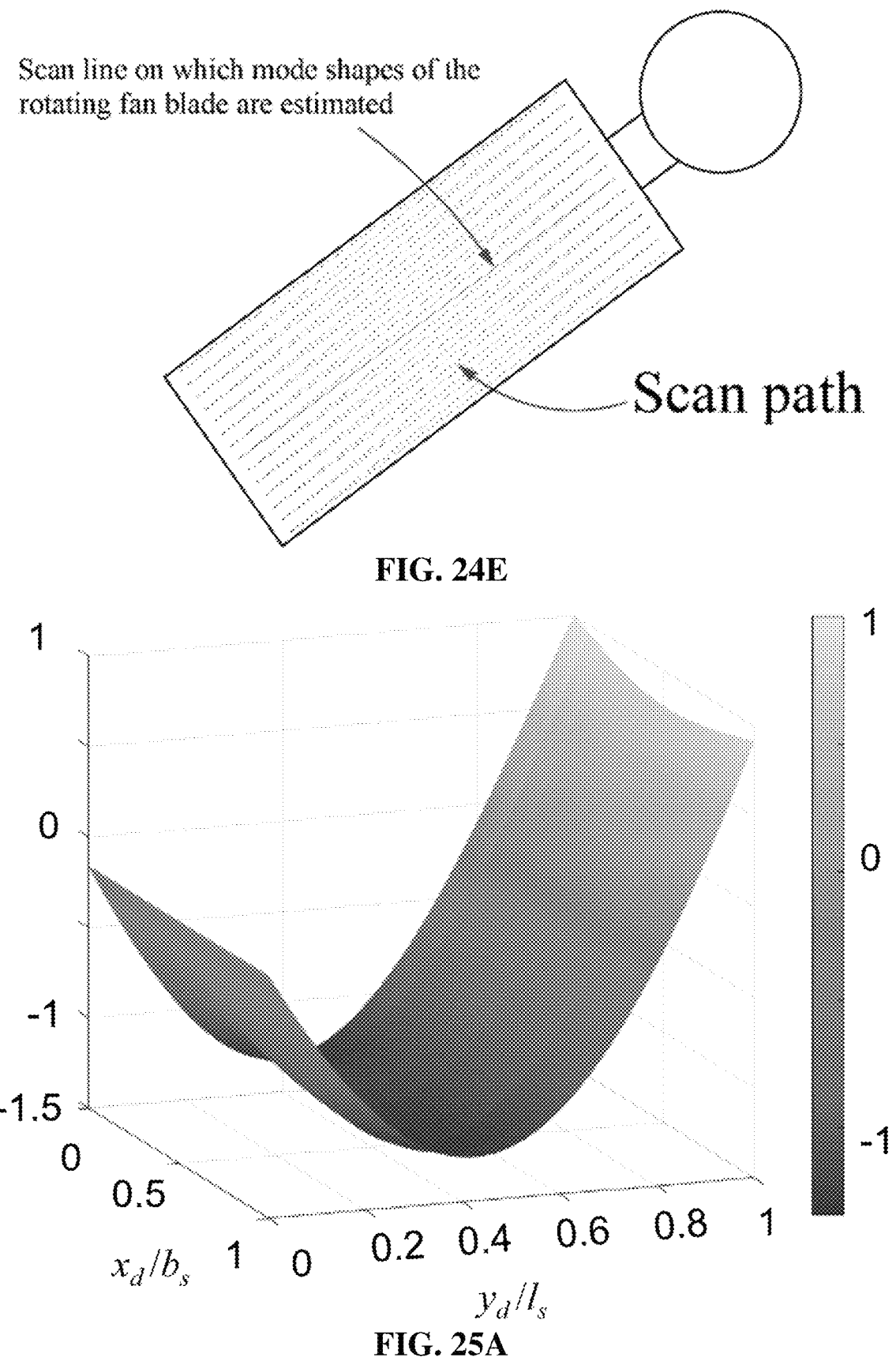
FIG. 24E is a schematic that illustrates positions of scan lines on which mode shapes in FIG. 24D and FIG. 25D are estimated.
FIG. 25A is a graph of estimated second normalized undamped full-field mode shape of the rotating fan blade with R=9.71 rpm.
Figures 25B, 25C:
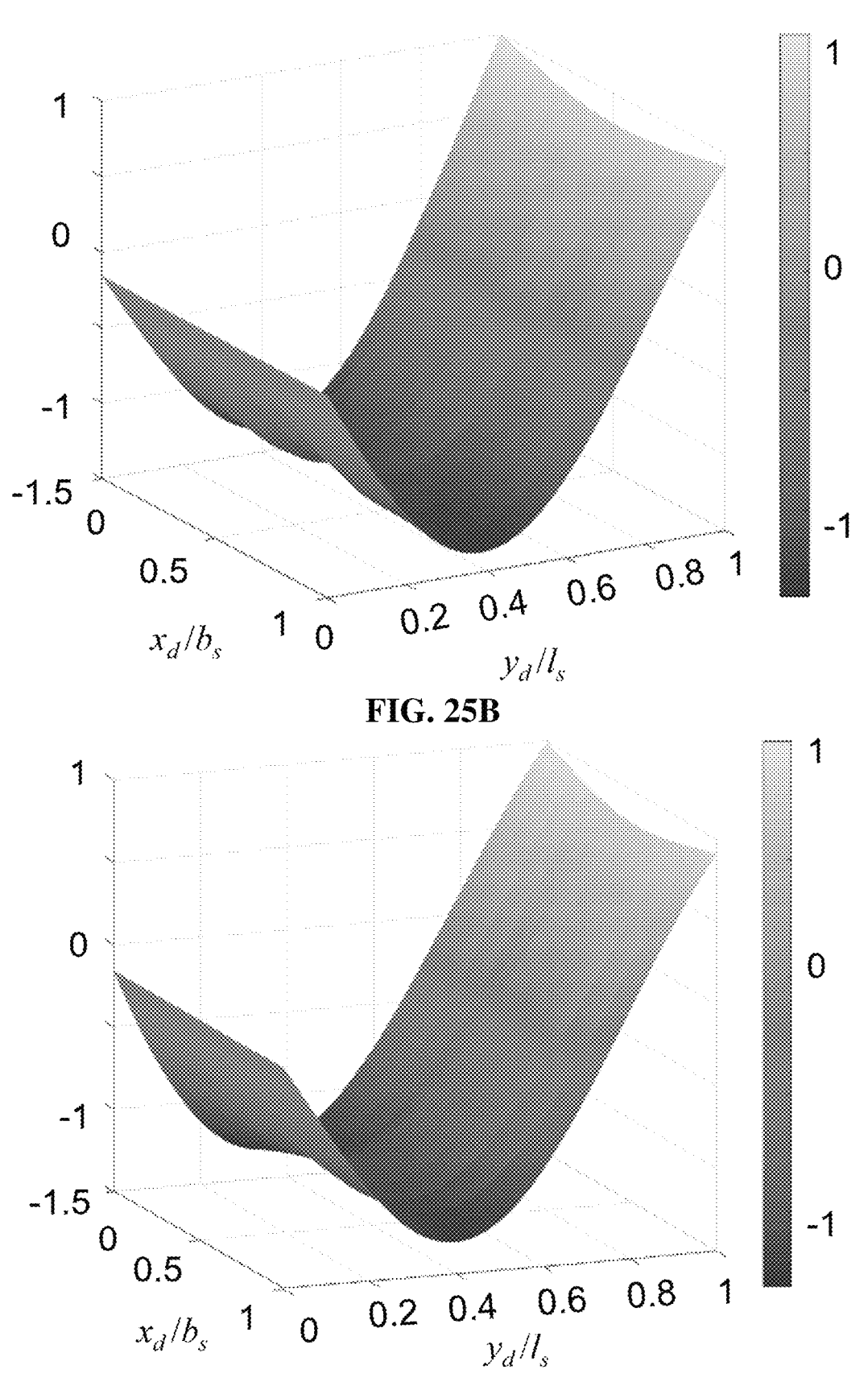
FIG. 25B is a graph of estimated second normalized undamped full-field mode shape of the rotating fan blade with R=15.34 rpm.
FIG. 25C is a graph of estimated second normalized undamped full-field mode shape of the rotating fan blade with R=22.05 rpm.
Figure 25D:
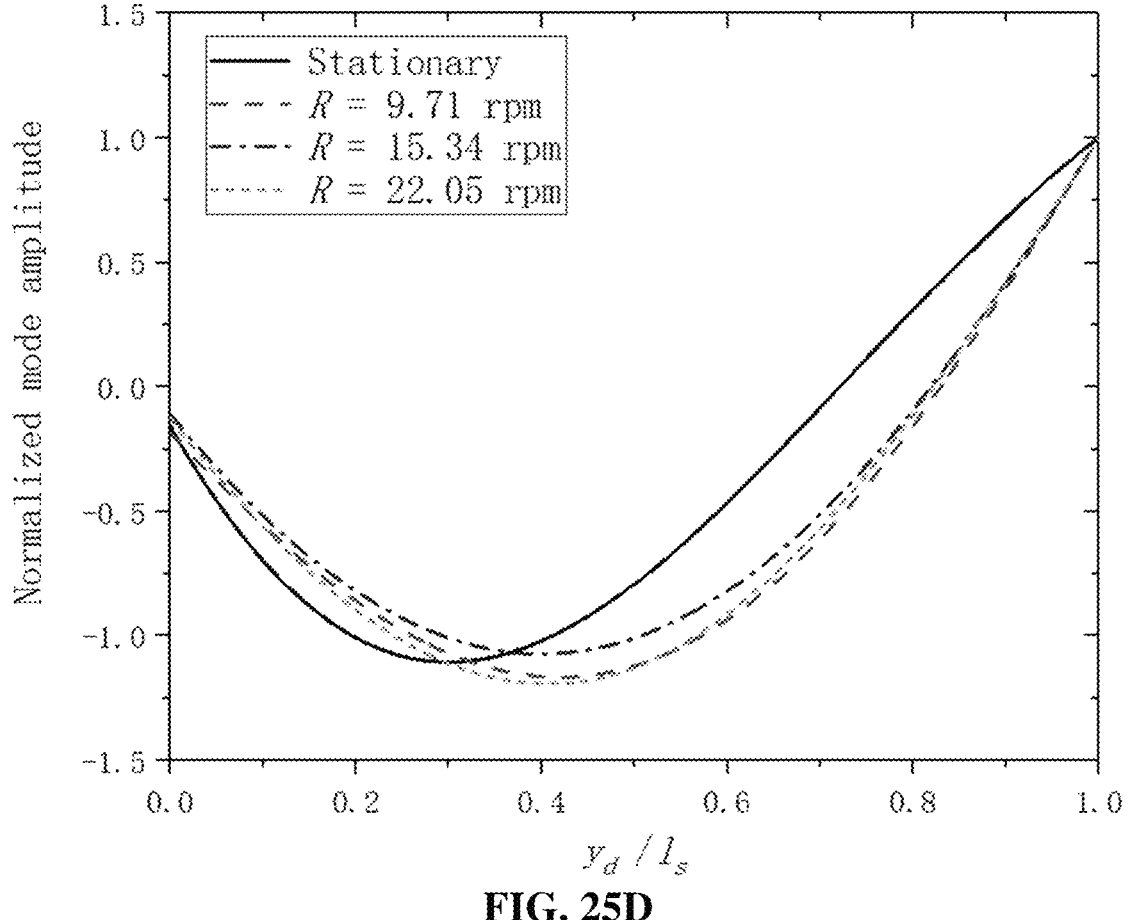
FIG. 25D is a graph of estimated second normalized undamped mode shapes of the rotating fan blade on scan lines at the same position.

| Damped natural frequencies of the fan blade with different rotation speeds | | |
|---|---|---|
| R (rpm) | First frequency (Hz) | Second frequency (Hz) |
| Stationary | 5.73 | 28.20 |
| 9.71 | 5.94 | 28.34 |
| 15.34 | 6.06 | 28.47 |
| 22.05 | 6.25 | 28.70 | speeds are shown in FIGS. 25A, 25B, and 25C, respectively. The first two undamped mode shapes of the rotating fan blade on scan lines at the same position are shown in FIG. 24D and FIG. 25D, respectively.

Estimated damped natural frequencies in Table 5 increased with the constant rotation speed of the fan blade since there is a centrifugal stiffening term in EQN. 76 which can be analytically shown. Based on EQN. 108 and EQN. 109, one has $$\int_r^{r+l} \int_{-b/2}^{b/2} \phi_i(x, y)L[\phi_i(x, y)]dxdy = \qquad (98)$$
$$\int_r^{r+l} \int_{-b/2}^{b/2} D(x, y)[\nabla^2 \phi_i(x, y)]^2 dxdy +$$
$$\Omega^2 \int_r^{r+l} \int_{-b/2}^{b/2} \left\{ \left[ \frac{\partial \phi_i(x, y)}{\partial x} \right]^2 \int_x^{\pm b/2} \rho(p, y)pdp + \left[ \frac{\partial \phi_i(x, y)}{\partial y} \right]^2 \int_y^{r+l} \rho(x, p)pdp \right\} dxdy = \omega_i^2, -b/2 \le x \le b/2, r \le y \le r + l.$$

Since $-b/2 \le x \le b/2$ and $r \le y \le r+l$, the two integrals $\int_x^{\pm b/2} \rho(p, y)pdp$ and $\int_y^{r+l} \rho(x, p)pdp$ in EQN. 98. are positive and the integral on the left-hand side of EQN. 98 increases with $\Omega$, which cause natural frequencies $\omega_i$ of the rotating fan blade to increase with its constant speed.

Estimated undamped full-field mode shapes in FIGS. 23A-B, 24A-C, 25A-C are similar to those of a cantilever beam. Note that the convex part near $x_d/b_s$=0.5 of the second mode shape in FIG. 23B is caused by the reinforced rib structure in the middle of the fan blade, as shown in FIG. 19B. Estimated undamped full-field mode shapes of the fan blade have small amplitudes at $y_d/l_s$=0, since the fan hub could have some vibration and end points $y_d/l_s$=0 of all scan lines were not exactly at the end of the fan blade that is connected to the fan hub. Generated 2D scan paths could slightly differ when the CSLDV system tracked and scanned the fan blade with different constant rotation speeds. Due to this reason, some error in the improved demodulation method, and the fact that the differential operator L changes with the rotation speed of the fan blade, there are some differences among estimated normalized mode shapes of the rotating fan blade on scan lines at the same position, as illustrated in FIG. 24E, with different speeds in FIG. 24D and FIG. 25D. Note that a real wind turbine blade can have twisted blades and their vibration modes can include flapwise bending modes, edge-wise bending modes, and torsional modes. The current tracking CSLDV system can estimate undamped flap-wise bending and torsional mode shapes of a rotating wind turbine blade. In some embodiments, a 3D tracking SLDV system is used to estimate edge-wise mode shapes of a rotating wind turbine blade.

The lifting method detailed herein uses the camera of the tracking CSLDV to have a high frame rate to measure higher 1D modes of a rotating structure: therefore only the first undamped 1D mode shape on a scan line is estimated. Modes that the improved demodulation method could estimate did not depend on the frame rate of the camera in the tracking CSLDV system, so that it could estimate the first two full-field mode shapes of the fan blade and it can estimate higher mode shapes if they are excited. On the other hand, the lifting method estimate modal damping ratios and ODSs of a rotating structure subject to random excitation, while the improved demodulation method cannot.

As detailed herein, a new 2D scan scheme and OMA method (e.g., the improved 2D demodulation method) are developed for monitoring vibration and estimating damped natural frequencies and undamped full-field mode shapes of a structure that rotates with a constant speed. The 2D scan scheme is developed for an image-based tracking CSLDV system to scan the whole surface of a rotating structure. The OMA method is based on the model of a rotating plate and an improved demodulation method. Damped natural frequencies of the rotating structure are obtained from the FFT of its measured response. The measured response can be processed by multiplying it with sinusoids whose frequencies are damped natural frequencies of the rotating structure based on the improved demodulation method. Multiplied measured responses can be processed by a low-pass filter to obtain undamped full-field mode shapes of the rotating structure. Full-field responses of a fan blade with different constant rotation speeds that was subject to random excitation were measured using the 2D scan scheme, and its damped natural frequencies and undamped full-field mode shapes were successfully estimated using the new OMA method. Estimated damped natural frequencies are experimentally and theoretically shown to increase with the constant rotation speed of the fan blade. The 2D scan scheme and improved demodulation method can monitor the vibration and estimate higher full-field modes of the rotating structure subject to random excitation, such as a horizontal-axis wind turbine blade, using a low frame-rate camera and a low scan frequency, while the lifting method cannot. The lifting method can estimate modal damping ratios and ODSs of the rotating structure subject to random excitation, while the improved demodulation method cannot.

A two-dimensional (2D) scan scheme is developed for a tracking continuously scanning laser Doppler vibrometer (CSLDV) system to scan the whole surface of a rotating structure excited by a random force. A tracking CSLDV system is developed to track a rotating structure and sweep its laser spot on its surface. The measured response of the structure using the 2D scan scheme of the tracking CSLDV system is considered as the response of the whole surface of the structure subject to random excitation. The measured response can be processed by an operational modal analysis (OMA) method called the improved demodulation method based on a rigorous nonuniform rotating plate model to obtain modal parameters of the rotating structure, such as damped natural frequencies and undamped full-field mode shapes. Damped natural frequencies of the rotating structure are estimated from the fast Fourier transform of the measured response. Undamped full-field mode shapes are estimated by multiplying the measured response using sinusoids whose frequencies are estimated damped natural frequencies. Experimental investigation of the 2D scan scheme of the tracking CSLDV system and OMA method is conducted, and damped natural frequencies and undamped full-field mode shapes of a rotating fan blade with different constant speeds are estimated. It is theoretically and experimentally shown that damped natural frequencies of the rotating fan blade increases with its rotation speed.

Example 4

The solution to the governing equation of the nonuniform rotating plate subject to a concentrated random force that is applied at the point $(x_a, y_a)$ is derived herein: Let $\dot\theta(t)=\Omega$ be a constant, one has $$\rho(x, y)u_{tt} + C(u_t) + L(u) = f(x, y, t), \qquad (99)$$

$$-b/2 \le x \le b/2, r \le y \le r+l, t > 0,$$

where L is the spatial stiffness differential operator:

$$L = \nabla^2\left[D(x, y)\nabla^2\right] - \dot\theta^2(t)\left[\frac{\partial^2}{\partial x^2}\int_x^{r+l}\rho(p, y)pdp - \right. \qquad (100)$$

$$\left. \rho(x, y)x\frac{\partial}{\partial x} + \frac{\partial^2}{\partial y^2}\int_y^{\pm b/2}\rho(x, p)pdp - \rho(x, y)y\frac{\partial}{\partial y}\right],$$

$$-b/2 \le x \le b/2, r \le y \le r+l, t > 0.$$

The term $-\dot\theta^2(t)[u_{xx}\int_x^{r+l}\rho(p, y)pdp-\rho(x, y)xu_x+u_{yy}\int_y^{\pm b/2}\rho(x, p)pdp-\rho(x, y)yu_y]$ in EQN. 99 is a centrifugal stiffness term caused by the rotation of the plate. The eigenvalue problem of the corresponding undamped rotating plate can be written as $$L[\phi] = \omega^2\rho(x, y)\phi, \qquad (101)$$

where ω is its undamped natural frequency, and φ is the corresponding eigenfunction that satisfies EQN. 100. Based on plate theory, when boundary points of the plate are considered to be free or clamped, like the rotating fan blade in the experiment, one has $$\int_r^{r+l}\int_{-b/2}^{b/2}v(x, y)\nabla^2\left[D(x, y)\nabla^2 w(x, y)\right]dxdy = \qquad (102)$$

$$\int_r^{r+l}\int_{-b/2}^{b/2}D(x, y)\nabla^2 w(x, y)\nabla^2 v(x, y)dxdy,$$

$$-b/2 \le x \le b/2, r \le y \le r+l,$$

where $v(x, y)$ and $w(x, y)$ are two comparison functions that satisfy EQN. 100. Applying integration by parts to the centrifugal stiffness term $$\int_r^{r+l}\int_{-b/2}^{b/2}-v(x, y)\Omega^2\left[\frac{\partial^2 w(x, y)}{\partial x^2}\int_x^{r+l}\rho(p, y)pdp - \rho(x, y)x\frac{\partial w(x, y)}{\partial x}\right]dxdy$$

and using boundary conditions in EQN. 100 in the resulting equation yield $$\int_r^{r+l}\int_{-b/2}^{b/2}-v(x, y) \qquad (103)$$

$$\Omega^2\left[\frac{\partial^2 w(x, y)}{\partial x^2}\int_x^{\pm b/2}\rho(p, y)pdp - \rho(x, y)x\frac{\partial w(x, y)}{\partial x}\right]dxdy =$$

$$\Omega^2\int_r^{r+l}\int_{-b/2}^{b/2}\frac{\partial w(x, y)}{\partial x}\frac{\partial v(x, y)}{\partial x}\int_x^{\pm b/2}\rho(p, y)pdpdxdy,$$

$$-b/2 \le x \le b/2, r \le y \le r+l.$$

Similarly, one has $$\int_r^{r+l}\int_{-b/2}^{b/2} -v(x, y) \tag{104}$$

$$\Omega^2\left[\frac{\partial^2 w(x, y)}{\partial y^2}\int_y^{\pm b/2}\rho(x, p)pdp - \rho(x, y)y\frac{\partial w(x, y)}{\partial y}\right]dxdy =$$

$$\Omega^2\int_r^{r+l}\int_{-b/2}^{b/2}\frac{\partial w(x, y)}{\partial x}\frac{\partial v(x, y)}{\partial x}\int_y^{r+l}\rho(p, y)pdpdxdy,$$

$$-b/2 \le x \le b/2, r \le y \le r+l.$$

Combining EQNS. 102, 103, and 104 yields $$\int_r^{r+l}\int_{-b/2}^{b/2} v(x, y)L[w(x, y)]dxdy = \tag{105}$$

$$\int_r^{r+l}\int_{-b/2}^{b/2} D(x, y)\nabla^2 w(x, y)\nabla^2 v(x, y)dxdy +$$

$$\Omega^2\int_r^{r+l}\int_{-b/2}^{b/2}\left[\frac{\partial w(x, y)}{\partial x}\frac{\partial v(x, y)}{\partial x}\int_x^{\pm b/2}\rho(p, y)pdp +\right.$$

$$\left.\frac{\partial w(x, y)}{\partial y}\frac{\partial v(x, y)}{\partial y}\int_y^{r+l}\rho(x, p)pdp\right]dxdy =$$

$$\int_r^{r+l}\int_{-b/2}^{b/2} w(x, y)L[v(x, y)]dxdy, -b/2 \le x \le b/2, r \le y \le r+l,$$

which means that L is self-adjoint. Let $v(x, y)=w(x, y)$ in EQN. 107; one has $$\int_r^{r+l}\int_{-b/2}^{b/2} w(x, y)L[w(x, y)]dxdy = \tag{106}$$

$$\int_r^{r+l}\int_{-b/2}^{b/2} D(x, y)\nabla^2 w(x, y)\nabla^2 w(x, y)dxdy +$$

$$\Omega^2\int_r^{r+l}\int_{-b/2}^{b/2}\left[\left(\frac{\partial w(x, y)}{\partial x}\right)^2\int_x^{\pm b/2}\rho(p, y)pdp +\right.$$

$$\left.\left(\frac{\partial w(x, y)}{\partial y}\right)^2\int_y^{r+l}\rho(x, p)pdp\right]dxdy \ge 0,$$

$$-b/2 \le x \le b/2, r \le y \le r+l, t > 0,$$

which means that L is positive definite. Similarly, one can show that the spatial mass operator $\rho(x, y)$ is self-adjoint and positive definite. By the expansion theorem, the solution to EQN. 99 is $$u(x, y, t) = \sum_{i=1}^{\infty}\phi_i(x, y)q_i(t), \tag{107}$$

where $q_i(t)$ is the i-th generalized coordinate. Since L and $\rho(x)$ are self-adjoint and positive definite, eigenfunctions of the corresponding undamped rotating plate are real and can be normalized to satisfy orthonormality relations $$\int_r^{r+l}\int_{-b/2}^{b/2}\phi_i(x, y)\rho(x, y)\phi_j(x, y)dxdy = \delta_{ij}, \tag{108}$$

$$\int_r^{r+l}\int_{-b/2}^{b/2}\phi_i(x, y)L[\phi_j(x, y)]dxdy = \omega_i^2\delta_{ij}, \tag{109}$$

where $\delta_{ij}$ is Kronecker delta and $\omega_i$ is the i-th real undamped natural frequency of the rotating plate. It is assumed that $C=k\rho(x, y)$, where k is a constant. Substituting EQN. 109 into EQN. 101, multiplying the resulting equation by $\phi_j(x, y)$, integrating the resulting equation from $x=-b/2$ to $x=b/2$ and $y=r$ to $y=r+l$, and applying EQN. 108 and EQN 109 and the expression $\int_r^{r+l}\int_x^{\pm b/2}\phi_i(x, y)C[\phi_j(x, y)]dxdy=k\delta_{ij}$ to the resulting equation yield $$\ddot{q}_i(t) + k\dot{q}_i(t) + \omega_i^2 q_i(t) = \int_r^{r+l}\int_{-b/2}^{b/2}\phi_i(x, y)f(x, y, t)dxdy. \tag{110}$$

Considering modes of interest of the nonuniform rotating plate are underdamped, one has $k=2\zeta_i\omega_i$ for the modes with $0<\zeta_i<1$. When $0<k\le 2\omega_i$, the modal damping ratios $\zeta_i$ satisfy $0<\zeta_i<1$. Let EQN. 99 have zero initial conditions; the solution to EQN. 110 is $$q_i(t) = \int_0^t\int_r^{r+l}\int_{-b/2}^{b/2}\phi_i(x, y)f(x, y, t - \tau)g_i(\tau)dxdyd\tau, \tag{111}$$

where $g_i(t)=(1/\omega_{d,i})e^{-\zeta_i\omega_i t}\sin(\omega_{d,i}t)$ is the unit impulse response function that corresponds to the i-th mode of the rotating plate. Substituting EQN. 111 into EQN. 107 yields $$u(x, y, t) = \tag{112}$$

$$\sum_{i=1}^{\infty}\phi_i(x, y)\int_0^t\int_r^{r+l}\int_{-b/2}^{b/2}\phi_i(x, y)f(x, y, t - \tau)g_i(\tau)dxdyd\tau.$$

If a concentrated random force $f_a(t)$ is applied on the nonuniform rotating plate at $(x_a, y_a)$, one has $$f(x, y, t) = \delta(x - x_a)\delta(y - y_a)f_a(t), \tag{113}$$

where $\delta$ is Dirac delta function. The solution in EQN. 101 can be obtained by substituting EQN. 113 into EQN. 112.

It is understood that the foregoing detailed description and accompanying examples are merely illustrative and are not to be taken as limitations upon the scope of the disclosure, which is defined solely by the appended claims and their equivalents.

Various changes and modifications to the disclosed embodiments will be apparent to those skilled in the art.

That which is claimed:

1. A system comprising:
   a laser vibrometer that produces a laser beam;
   a camera configured to capture an image of a rotating structure; and
   a scanner electrically coupled to a controller, wherein the scanner includes a first mirror and a second mirror positioned orthogonally relative to the first mirror;
   wherein the laser beam is reflected by the first mirror and the second mirror to the rotating structure; and
   wherein the scanner is controlled by the controller based on a position of the rotating structure in the image detected by the camera to move the laser beam along a path on the rotating structure; and wherein the path is two-dimensional; and
   wherein the laser vibrometer is configured to:
   measure a response of the rotating structure;

determine a Fast Fourier Transform (FFT) of the response;

apply a bandpass filter to the response with a passband that includes a damped natural frequency of the rotating structure to create a filtered response;

determine a time interval between a minimum value and a maximum value of the filtered response;

multiply the filtered response in the time interval by sinusoidal signals to create a plurality of processed responses; and apply a lowpass filter to the plurality of processed responses to obtain an end-to-end undamped mode shape of the rotating structure.

2. The system of claim 1, further comprising a tripod, wherein the laser vibrometer, the scanner, and the camera are mounted on the tripod.

3. The system of claim 1, wherein the camera includes a frame rate of at least 25 frames per second.

4. The system of claim 1, further including a reference mark positioned on the rotating structure, wherein the position of the rotating structure is determined by the reference mark in the captured image of the camera.

5. The system of claim 1, further comprising the rotating structure, wherein the rotating structure is a wind turbine blade.

6. A method comprising:

measuring a response of a rotating structure subject to random excitation with a tracking continuous scanning laser vibrometer system;

determining a Fast Fourier Transform (FFT) of the response;

applying a bandpass filter to the response with a passband that includes a damped natural frequency of the rotating structure to create a filtered response;

determining a time interval between a minimum value and a maximum value of the filtered response;

multiplying the filtered response in the time interval by sinusoidal signals to create a plurality of processed responses; and applying a lowpass filter to the plurality of processed responses to obtain an end-to-end undamped mode shape of the rotating structure.

7. The method of claim 6, wherein the sinusoidal signals include $\cos(\omega_{d,i}t)$ and $\sin(\omega_{d,i}t)$, where $\omega_{d,i}$ is the damped natural frequency of the rotating structure.

8. The method of claim 6, wherein the rotating structure is rotating at a non-constant speed.

9. The method of claim 6, wherein the rotating structure is rotating at a constant speed.

10. The method of claim 6, wherein the time interval is measured by the tracking continuous scanning laser vibrometer system from a first end of a scan path to a second end.

11. The method of claim 6, further including determining end-to-end undamped mode shapes of the structure.

12. A method comprising:

measuring a response of a structure subject to an arbitrary excitation with a tracking continuous scanning laser vibrometer system;

interpolate positions of the response on a grid to generate a plurality of interpolated positions;

rectifying the plurality of interpolated positions to create a plurality of rectified interpolated positions;

identifying a plurality of zero-crossings from the plurality of rectified interpolated positions;

determine a portion of the plurality of zero-crossings with a time increment; and interpolate and lift measurements at the portion of the plurality of zero-crossings.

13. The method of claim 12, wherein the structure is rotating.

14. The method of claim 13, wherein the method includes capturing images of the rotating structure.

15. The method of claim 13, wherein the rotating structure is a wind turbine blade.

16. The method of claim 12, wherein rectifying the plurality of interpolated positions includes determining negative absolute values of differences between the plurality of interpolated positions and a position of a virtual measurement point on a scan path.

17. The method of claim 12, wherein the time increment is equal to the inverse of a scan frequency.

18. The method of claim 12, further including determining a damped natural frequency, a damping ratio, and/or an undamped mode shape of the rotating structure.

19. A system comprising:

a laser vibrometer that produces a laser beam;

a camera configured to capture an image of a rotating structure; and a scanner electrically coupled to a controller, wherein the scanner includes a first mirror and a second mirror positioned orthogonally relative to the first mirror;

wherein the laser beam is reflected by the first mirror and the second mirror to the rotating structure; and wherein the scanner is controlled by the controller based on a position of the rotating structure in the image detected by the camera to move the laser beam along a path on the rotating structure; and wherein the path is two-dimensional; and wherein the laser vibrometer is configured to:

measure a response of the rotating structure;

interpolate positions of the response on a grid to generate a plurality of interpolated positions;

rectify the plurality of interpolated positions to create a plurality of rectified interpolated positions;

identify a plurality of zero-crossings from the plurality of rectified interpolated positions;

determine a portion of the plurality of zero-crossings with a time increment; and interpolate and lift measurements at the portion of the plurality of zero-crossings.

20. The system of claim 19, further comprising a tripod, wherein the laser vibrometer, the scanner, and the camera are mounted on the tripod; wherein the camera includes a frame rate of at least 25 frames per second.

21. The system of claim 19, further including a reference mark positioned on the rotating structure, wherein the position of the rotating structure is determined by the reference mark in the captured image of the camera.

\* \* \* \* \*